US007963020B2

(12) United States Patent
De Luca et al.

(10) Patent No.: US 7,963,020 B2
(45) Date of Patent: Jun. 21, 2011

(54) APPARATUS AND METHOD FOR MANUFACTURING FOAM PARTS

(75) Inventors: Nicholas P. De Luca, Washington, DC (US); Andrew B. Perkins, Berkeley, CA (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 942 days.

(21) Appl. No.: 11/846,147

(22) Filed: Aug. 28, 2007

(65) Prior Publication Data

US 2009/0061153 A1 Mar. 5, 2009

(51) Int. Cl.
*B23P 23/00* (2006.01)

(52) U.S. Cl. ........ 29/564.2; 29/564.6; 29/33 Q; 29/445; 156/510; 156/538; 156/556

(58) Field of Classification Search ................. 29/564.8, 29/567.7, 564.6, 564.1, 564, 33 Q, 33 S, 29/564.2, 445, 525.13, 428; 156/510, 538, 156/556, 578
See application file for complete search history.

(56) References Cited

U.S. PATENT DOCUMENTS

| | | | |
|---|---|---|---|
| 1,938,484 | A | 12/1933 | Clarin |
| 3,565,243 | A | 2/1971 | Freeman |
| 3,695,421 | A | 10/1972 | Wood |
| 3,799,820 | A | 3/1974 | Sollerud |
| 3,854,650 | A | 12/1974 | Hanaue |
| 4,253,351 | A | 3/1981 | Allen |
| 4,323,756 | A | 4/1982 | Brown et al. |
| 4,413,735 | A | 11/1983 | Little |
| 4,575,330 | A | 3/1986 | Hull |
| 4,637,283 | A | 1/1987 | Bertram et al. |
| 4,730,761 | A | 3/1988 | Spano |
| 4,752,352 | A | 6/1988 | Feygin |
| 4,766,780 | A | 8/1988 | Sechen |
| 4,840,277 | A | 6/1989 | Waldner |
| 4,929,402 | A | 5/1990 | Hull |
| 4,955,261 | A | 9/1990 | Chiang |
| 4,972,954 | A | 11/1990 | Dickie |
| 4,996,010 | A | 2/1991 | Modrek |
| 4,999,143 | A | 3/1991 | Hull et al. |

(Continued)

FOREIGN PATENT DOCUMENTS

DE 91 16 568 3/1993

(Continued)

OTHER PUBLICATIONS

Form PCT/ISA/206 —Results of Partial International Search for corresponding International Application No. PCT/US2008/010108.

(Continued)

*Primary Examiner* — Erica E Cadugan
(74) *Attorney, Agent, or Firm* — Alston & Bird LLP

(57) ABSTRACT

A method and machine for manufacturing foam parts are provided. The method generally includes cutting a plurality of sections across the width of the base sheet, engaging and reorienting at least one portion of each section, and joining the portions of each section in a desired configuration to thereby form a plurality of parts. The portions can be engaged by actuator assemblies operating in successively adjacent work spaces across the width of the base sheet to simultaneously produce a plurality of similar parts. In some cases, each part includes at least one portion that is reoriented relative to another portion, such as by rotating one of the portions or adjusting one of the portions to a position that is offset from the plane of the section.

13 Claims, 47 Drawing Sheets

U.S. PATENT DOCUMENTS

| | | | | |
|---|---|---|---|---|
| 5,015,424 | A | 5/1991 | Smalley | |
| 5,079,975 | A | 1/1992 | Spencer, Jr. | |
| 5,092,028 | A * | 3/1992 | Harnden | 29/709 |
| 5,095,778 | A | 3/1992 | Bocsi et al. | |
| 5,130,064 | A | 7/1992 | Smalley et al. | |
| 5,145,732 | A | 9/1992 | Grey et al. | |
| 5,174,943 | A | 12/1992 | Hull | |
| 5,182,055 | A | 1/1993 | Allison et al. | |
| 5,192,559 | A | 3/1993 | Hull et al. | |
| 5,226,557 | A | 7/1993 | Nelson | |
| 5,236,637 | A | 8/1993 | Hull | |
| 5,322,181 | A | 6/1994 | Nelson | |
| 5,351,579 | A | 10/1994 | Metz et al. | |
| 5,372,054 | A | 12/1994 | Federighi, Sr. | |
| 5,462,623 | A | 10/1995 | Day | |
| 5,469,691 | A | 11/1995 | Grey et al. | |
| 5,503,047 | A | 4/1996 | Brockington | |
| 5,630,981 | A | 5/1997 | Hull | |
| 5,637,169 | A | 6/1997 | Hull et al. | |
| 5,637,175 | A | 6/1997 | Feygin et al. | |
| 5,638,565 | A | 6/1997 | Pekar | |
| 5,688,095 | A * | 11/1997 | Knudson | 414/12 |
| 5,711,911 | A | 1/1998 | Hull | |
| 5,724,869 | A | 3/1998 | May | |
| 5,730,817 | A | 3/1998 | Feygin et al. | |
| 5,779,967 | A | 7/1998 | Hull | |
| 5,814,265 | A | 9/1998 | Hull | |
| 5,876,550 | A | 3/1999 | Feygin et al. | |
| 5,876,813 | A | 3/1999 | Bambara et al. | |
| 5,897,825 | A | 4/1999 | Fruth et al. | |
| 5,899,122 | A | 5/1999 | Court | |
| 5,904,889 | A | 5/1999 | Serbin et al. | |
| 6,036,911 | A | 3/2000 | Allison et al. | |
| D423,023 | S | 4/2000 | Strong et al. | |
| 6,045,106 | A | 4/2000 | Henley | |
| 6,066,158 | A | 5/2000 | Engelson et al. | |
| 6,084,980 | A | 7/2000 | Nguyen et al. | |
| 6,101,899 | A | 8/2000 | Nikolic | |
| 6,102,204 | A | 8/2000 | Castleberry | |
| 6,131,376 | A | 10/2000 | Grey et al. | |
| 6,167,790 | B1 | 1/2001 | Bambara et al. | |
| 6,241,934 | B1 | 6/2001 | Everett et al. | |
| 6,261,506 | B1 | 7/2001 | Nguyen et al. | |
| 6,261,507 | B1 | 7/2001 | Gigl et al. | |
| 6,264,873 | B1 | 7/2001 | Gigl et al. | |
| 6,321,620 | B1 | 11/2001 | Fabbro | |
| 6,357,855 | B1 | 3/2002 | Kerekes et al. | |
| 6,427,556 | B2 | 8/2002 | Fabbro | |
| 6,432,512 | B1 | 8/2002 | Brandolini | |
| 6,520,332 | B1 | 2/2003 | Barmore et al. | |
| 6,622,860 | B2 | 9/2003 | Horbal | |
| 6,840,372 | B2 | 1/2005 | Giles et al. | |
| 6,868,965 | B2 | 3/2005 | Miller et al. | |
| 6,915,903 | B2 | 7/2005 | Manuel et al. | |
| 7,114,618 | B2 | 10/2006 | Arnold | |
| 7,201,958 | B2 | 4/2007 | Stimler et al. | |
| 7,234,375 | B1 | 6/2007 | Wang Wu | |
| 7,249,746 | B2 | 7/2007 | Awalt | |
| 7,654,391 | B2 * | 2/2010 | Langer et al. | 206/523 |
| 2002/0100856 | A1 | 8/2002 | Hatton | |
| 2002/0166860 | A1 | 11/2002 | Giles et al. | |
| 2002/0178867 | A1 | 12/2002 | Lun | |
| 2003/0019779 | A1 | 1/2003 | Horbal | |
| 2003/0029276 | A1 | 2/2003 | Falcone | |
| 2004/0226851 | A1 | 11/2004 | Manuel et al. | |
| 2005/0210788 | A1 | 9/2005 | Giles et al. | |
| 2005/0241979 | A1 | 11/2005 | Manuel et al. | |
| 2006/0052816 | A1 | 3/2006 | Bates et al. | |
| 2006/0060295 | A1 | 3/2006 | Hsu | |
| 2006/0112788 | A1 | 6/2006 | Cheung | |
| 2006/0127648 | A1 | 6/2006 | De Luca | |
| 2007/0038280 | A1 | 2/2007 | Bodner et al. | |
| 2007/0089570 | A1 | 4/2007 | Vitrac et al. | |
| 2007/0090236 | A1 | 4/2007 | Awalt | |

FOREIGN PATENT DOCUMENTS

| | | |
|---|---|---|
| DE | 298 04 746 | 6/1998 |
| DE | 100 49 599 | 5/2002 |
| EP | 0 736 278 | 10/1996 |
| FR | 2 791 918 | 10/2000 |
| GB | 2 332 641 | 6/1999 |
| WO | WO 00/27905 | 5/2000 |
| WO | WO 01/34497 | 5/2001 |

OTHER PUBLICATIONS

"Company About 3D Systems," 3D Systems Corporation Solid Imaging (printed from internet Oct. 21, 2002).

"Helisys Inc." entry for European Medical Manufacturing Supplier Director (printed from internet Oct. 21, 2002).

The RP&T Centre: Helisys LOM 2030 E; http://www.warwick.ac.uk/atc/rpt/Facilities/lom2030.htm (printed from internet Oct. 21, 2002).

Stratocell® Plus: Special Density Foam and Film Laminates, Product Brochure, Sealed Air Corporation, Dec. 1997.

* cited by examiner

APPARATUS AND METHOD FOR MANUFACTURING FOAM PARTS

BACKGROUND OF THE INVENTION

The present invention generally relates to a system and method for automatically forming foam parts from a base sheet of material.

Foam inserts or cushions are commonly used to protect packaged goods. For example, a laptop computer or other consumer device can be packaged in a cardboard box for protection during storing, delivery, and the like. The box chosen for packaging the device typically defines an interior space that is larger than the dimensions of the device. In some cases, the extra space can be filled with foam peanuts, air filled bags, or other cushioning materials that can be arranged according to the dimensions of the box and the space that results around the packaged device in the box. However, in other cases, the device requires the use of foam inserts or cushions that can support the device in a particular position in the box, prevent movement of the device in the box, and/or provide particular cushioning characteristics. For example, a laptop computer is commonly packaged using foam inserts such as end caps. The end caps can be specially designed to correspond to the shape of the device so that the end caps can be fitted on the opposite ends of the device. In this way, the device can be supported or braced in the box and protected. In the example of the laptop computer, each end cap can define an inner surface that defines a cavity for receiving one of the opposite ends of the computer. The inner surface of the end cap is designed to correspond to the shape of the computer, and the outer surface of the end cap is designed to correspond to the shape of the box. Thus, when the computer is fitted between the end caps in the box, the end caps can support the computer in a particular position and prevent movement of the computer within the box. Any shocks to the box are transmitted to the computer by way of the end caps, which provide a cushioning effect to dampen the shocks and protect the computer. A variety of end caps and other foam inserts are known and commonly used in such applications.

Foam inserts often require a complex, three-dimensional shape in order to properly correspond to the products being packaged. These shapes are typically achieved by cutting polyethylene foam sheets to form different shapes of foam pieces that are then reoriented in a stacked configuration to build up the desired three-dimensional shape. While the foam sheets can be cut by machine, the assembly of the foam pieces is conventionally performed manually. In other words, a worker organizes the cut pieces of foam by hand, then joins the pieces, typically using an adhesive or heat, e.g., by heating the contacting surfaces with a hair dryer and pressing the pieces together by hand. This manual process, which is typically relatively disorganized and requires multiple successive operations for organizing and assembling the cut pieces, is labor intensive and limited in speed and quality by the speed and ability of the worker.

Foam inserts can also be manufactured using an automated method, such as is described in U.S. Patent Application Publication No. 2006/0127648, in which the insert is formed by stacking a plurality of sheets. In that case, the thickness of the insert is determined by the number of stacked sheets, and thick inserts generally require the use of much foam. For example, if one-inch thick foam is to be used to form an insert with a thickness of six inches, six layers of the foam are stacked. In addition, the cutting of holes in the various sheets results in wasted scrap material.

Thus, there exists a continued need for improved methods and machines for forming parts, such as end caps and other foam inserts. The method should be capable of being automated and capable of being used to form multiple inserts at a time. Further, the method should reduce the amount of material used and/or the amount of scrap produced.

BRIEF SUMMARY OF THE INVENTION

The present invention provides a method and machine for manufacturing a plurality of similar foam parts that each include a plurality of portions joined in a desired configuration. The parts can be formed by an automatic method in a machine that produces a plurality of similar parts at a time. The machine can form the parts from sections of a base sheet of foam that are successively adjacent along the width and/or length of the sheet, e.g., with one or more actuator mechanisms that operate in close proximity to one another. The reorientation of the portions can include rotating one or more portions out of the plane of the base sheet, or adjusting one or more portions to offset positions parallel to the plane of the respective section. The method and machine can reduce the cost and time required for producing the parts and, in some cases, the amount of scrap material can be reduced, e.g., by reorienting material in each part to a desired configuration.

According to one embodiment of the present invention, the method includes providing a base sheet of foam that extends in a longitudinal direction and defines a width in a transverse direction perpendicular to the longitudinal direction. The base sheet is cut to define a plurality of sections across the width and/or length of the base sheet. Each section includes at least first and second portions for manufacturing a respective one of the foam parts, e.g., so that each second portion is defined in an aperture of the first portion. The first and second portions of each section are cut in a first configuration, typically a planar configuration while supported by a support member. The second portions are engaged in the first configuration with engagement tools so that the second portion of each section is engaged by a respective one of the engagement tools. For example, an actuator can be energized to thereby rotate a helical pin in a first direction so that the rotating helical pin is advanced into the second portion to engage the second portion, or an actuator can be energized to thereby advance at least two pins in nonparallel directions so that the pins are advanced into the second portion to engage the second portion. With the second portion of each section engaged by the respective engagement tool, the engagement tools can be automatically actuated to thereby reorient the second portion of each section relative to the first portion so that the portions of each section are supported in a second, desired configuration, which is different from the first configuration. The engagement tools can be disengaged from the second portions, e.g., by retracting the pins from the second portion or by rotating each helical pin in an opposite direction so that the rotating helical pin is retracted from the second portion.

The engagement tools for each section across the width of the sheet can be actuated at the same time so that each second portion is reoriented during the reorienting of the second portions of the other sections. In some cases, each of the engagement tools is actuated to move through a similar motion, e.g., so that the portions of the different sections that are being reoriented are maintained substantially parallel to one another. The second portion of each respective section can be rotated relative to the first portion of the respective section, e.g., to a configuration that is nonparallel relative to the first portion of the respective section, or the second portion can be reoriented to a second configuration in which the second portion is substantially parallel to the first portion and offset from a plane defined by the first portion. In some cases, each of the engagement tools is extended through one of the sections with the tool engaged to one of the second portions, e.g., to reorient the second portion while the actuator mechanism extends through the section. The first and second portions of each section are joined in the desired configuration to thereby form the plurality of parts. In some cases, the base sheet is cut to define at least three portions in each section, and the engaging, actuating, and joining steps are repeated to thereby engage the third portion of each respective section, reorient the third portion relative to the first portion of the respective section, and join the third portion to at least one of the first and second portions in the desired configuration. Thereafter, the plurality of parts can be dispensed, the base sheet can be fed or adjusted in the longitudinal direction, and the cutting, engaging, actuating, and joining operations can be repeated to form another plurality of parts from the base sheet.

According to one aspect of the invention, each section is cut to define the second portion in an aperture of the first portion, and the second portion of each section is joined in a telescopic configuration relative to the first portion. Each section of the base sheet can be cut to define a third portion in an aperture of the second portion, and the engaging, actuating, and joining steps can be repeated to engage the third portion of each respective section, reorient the third portion relative to the first and second portions of the respective section such that the third portion is substantially parallel to the second portion and offset from a plane defined by the second portion, and join the third portion to the second portion in a telescopic configuration relative to the second portion. In some embodiments, a plurality of slits are provided in one or more of the portions, and each portion defining the slits can be expanded to thereby open the slits to define apertures, e.g., after the portions are joined to form the part.

One machine according to the present invention includes a support member that is configured to support a base sheet of foam, which extends in a longitudinal direction and defines a width in a transverse direction perpendicular to the longitudinal direction. A cutting device of the machine is configured to cut the base sheet into a plurality of sections defined across the width of the base sheet and cut each section into at least first and second portions for manufacturing a respective one of the foam parts. The cutting device is configured to cut the first and second portions of each section while the portions are disposed in a first configuration, typically while the sections are disposed on the support member in a flat configuration. A plurality of engagement tools are disposed across the width of the base sheet, and each tool is configured to engage the second portion of a respective one of the sections in the first configuration. Each of a plurality of actuator mechanisms is configured to adjust a respective one of the engagement tools with the second portion of each section engaged by the respective engagement tool to thereby reorienting the second portion of each section relative to the first portion so that the portions of each section are supported in a second, desired configuration that is different from the first configuration. A joining device of the machine is configured to join the first and second portions of each section in the desired configuration to thereby form the plurality of parts. A feed mechanism can be configured to adjust the base sheet in the longitudinal direction toward the engagement tools.

The actuator mechanisms can be configured to adjust the engagement tools at the same time so that each second portion is reoriented during the reorienting of the second portions of the other sections. The actuator mechanisms can also be configured to adjust the engagement tools to move through similar motions, such as to maintain the second portions substantially parallel while reorienting the second portions to the desired configuration of each section. In some cases, the actuator mechanisms are spaced transversely along the width of the base sheet and the support member in successive work areas along the width of the base sheet and the support member such that each actuator mechanism is configured to rotate the respective engagement tool within a respective one of the work area.

According to one embodiment, each actuator mechanism includes a first member defining an end extending from a frame of the machine, and a second member that is adjustably connected to the end of the first member and configured to be adjusted along a longitudinal direction defined by the first and second members. A head member is connected to the second member by two links. Each link is rotatably connected to the second member and the head member so that the head member is configured to be rotated relative to the second member about an axis perpendicular to the longitudinal direction of the members. The engagement tool is adjustably mounted to the head member. The links can be configured so that the axis perpendicular to the longitudinal direction of the members about which the head member is configured to rotate is offset from a longitudinal axis defined by the first and second members and so that the engagement tool is configured to be disposed substantially along the longitudinal axis when the head member is rotated about the axis perpendicular to the longitudinal direction to each of two perpendicular positions of the head member. One or both of the members can also define a rotary joint so that the head member is configured to rotate about a longitudinal axis of the members.

Each engagement tool can include one or more helical pins, and each actuator mechanism can include an actuator that is configured to rotate the helical pin in a first direction to thereby advance the pin into a respective second portion to engage the second portion. The actuator can also rotate the pin in a second, opposite direction to thereby retract the pin from the respective second portion. Alternatively, the engagement tool can include at least two pins, such as two straight diverging pins, that are configured to be adjusted in nonparallel directions. That is, each actuator mechanism can include an actuator that is configured to advance the pins in nonparallel directions such that the pins are advanced into a respective second portion to engage the second portion and to retract the pins from the second portion. Vacuum suction cups may also be used to hold portions or parts instead of or in addition to using pins.

In some embodiments, the machine can include a mandrel that defines first and second surfaces corresponding to the first and second portions of each section in the second, desired configuration of the finished part. The first and second surfaces can be parallel and offset in different planes.

The actuator mechanisms can engage and reorient the foam portions. According to one method, a head member of each mechanism is disposed proximate to one of the foam portions. The head member extends from at least a first member, and at least one pin is adjustably mounted to the head. The pin is advanced into the foam portion to engage the foam portion to the head, e.g., by rotating a helical pin in a first direction to advance the pin into the foam portion or advancing two or more pins from the head member in nonparallel directions into the foam portion. The head member is then rotated relative to the first member to adjust the foam member to a desired position, and the pin is retracted from the foam portion to thereby disengage the foam portion. For example, the head member can be connected to the first member via a second member, and the position of the head member can be adjusted by adjusting the second member relative to the first member along a longitudinal direction of the first member. The head member can also be rotated about an axis parallel to the longitudinal direction of the first member by adjusting a rotary joint defined by at least one of the members. In some cases, the head member is connected to the first member via first and second links, e.g., first and second links that are rotatably connected to each of the head member and the second member, and the head member can be rotated about an axis perpendicular to a longitudinal direction of the first member. In particular, the head member can be rotated about an axis perpendicular to the longitudinal direction of the at least first member and offset from a longitudinal axis defined by the at least first member so that the engagement tool is configured to be disposed substantially along the longitudinal axis when the head is rotated about the axis perpendicular to the longitudinal direction to each of two perpendicular positions of the head member. With the head member engaged to the foam portion, the head member can be rotated while the head member is extended through the sheet.

According to another method of the invention for manufacturing a foam part, a plurality of portions are offset and joined in a desired configuration. A base sheet is cut to define at least first and second portions in a first configuration, e.g., by cutting in the first portion a polygonal shape defining the perimeter of the second portion so that the first portion defines the entire perimeter of the second portion. In the first configuration, the second portion is defined in an aperture of the first portion so that the first portion at least partially defines a perimeter of the second portion. The second portion is reoriented relative to the first portion to a second configuration so that the second portion is offset from a plane defined by the first portion. For example, the second portion can be reoriented by adjusting the second portion only in a direction perpendicular to the plane defined by the first portion. The first and second portions are joined in the second configuration, e.g., with the second portion disposed parallel to the first portion and/or with the second portion disposed at least partially in the aperture of the first portion in the second configuration. The reorientation of the portions can be performed using a mandrel that defines parallel and offset first and second surfaces corresponding to the first and second portions, e.g., by disposing the portions of the base sheet in the first configuration against the mandrel. In the second configuration, the joined portions can define a telescopic shape such that the part is nestable with another identical part.

In some cases, the base sheet is cut to define a third portion, which, in the first configuration, is defined in an aperture of the second portion so that the second portion at least partially defines a perimeter of the third portion. The third portion is reoriented relative to the second portion so that the third portion is substantially parallel to the second portion and offset from a plane defined by the second portion in the second configuration. The second and third portions are joined in the second configuration.

The base sheet can be cut to define a plurality of second portions, and each second portion can be defined in a respective aperture of the first portion so that the first portion at least partially defines a perimeter of each second portion. Each of the second portions can be reoriented relative to the first portion to the second configuration so that the second portions are substantially parallel to the first portion and each second portion is coplanar with the other second portions, and each of the second portions can be joined to the first portion in the second configuration. Slits can be provided in one or more of the portions so that the portion(s) defining the slits can be expanded to thereby open the slits to define apertures. Further, according to one embodiment, an area of the one or more second portions is determined according to a desired shock absorption characteristic of the part.

The foam parts formed according to one embodiment include a first portion that defines a first plane and an aperture. At least one second portion is joined to the first portion. The second portion has an outer perimeter corresponding in size and position to the aperture of the first portion, and the second portion is offset from a plane defined by the first portion. The first and second portions can be parallel, and the second portion can be disposed at least partially in the aperture of the first portion. A third portion can be joined to the second portion, and the third portion can have an outer perimeter that corresponds in size and position to an aperture of the second portion, with the third portion being offset from a plane defined by the second portion. The part can defines a contour on a first side that corresponds to a contour on an opposite second side so that the part is nestable with another identical part. In some cases, the part defines a plurality of the second portions, each second portion joined to the first portion, having an outer perimeter corresponding in size and position to a respective aperture of the first portion, and being offset from the plane defined by the first portion. Further, at least one of the portions can define a plurality of slits so that the portion defining the slits is structured to be expanded.

BRIEF DESCRIPTION OF THE SEVERAL VIEWS OF THE DRAWINGS

Figure 1:
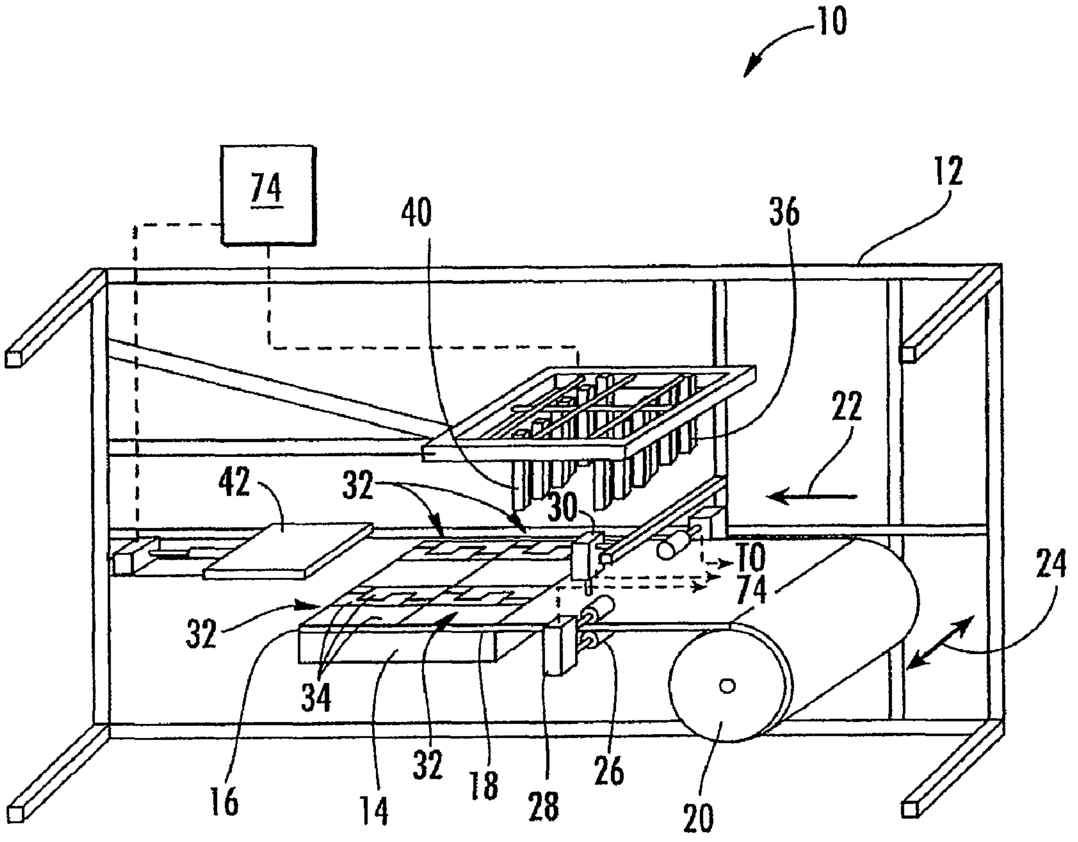
Figure 2:
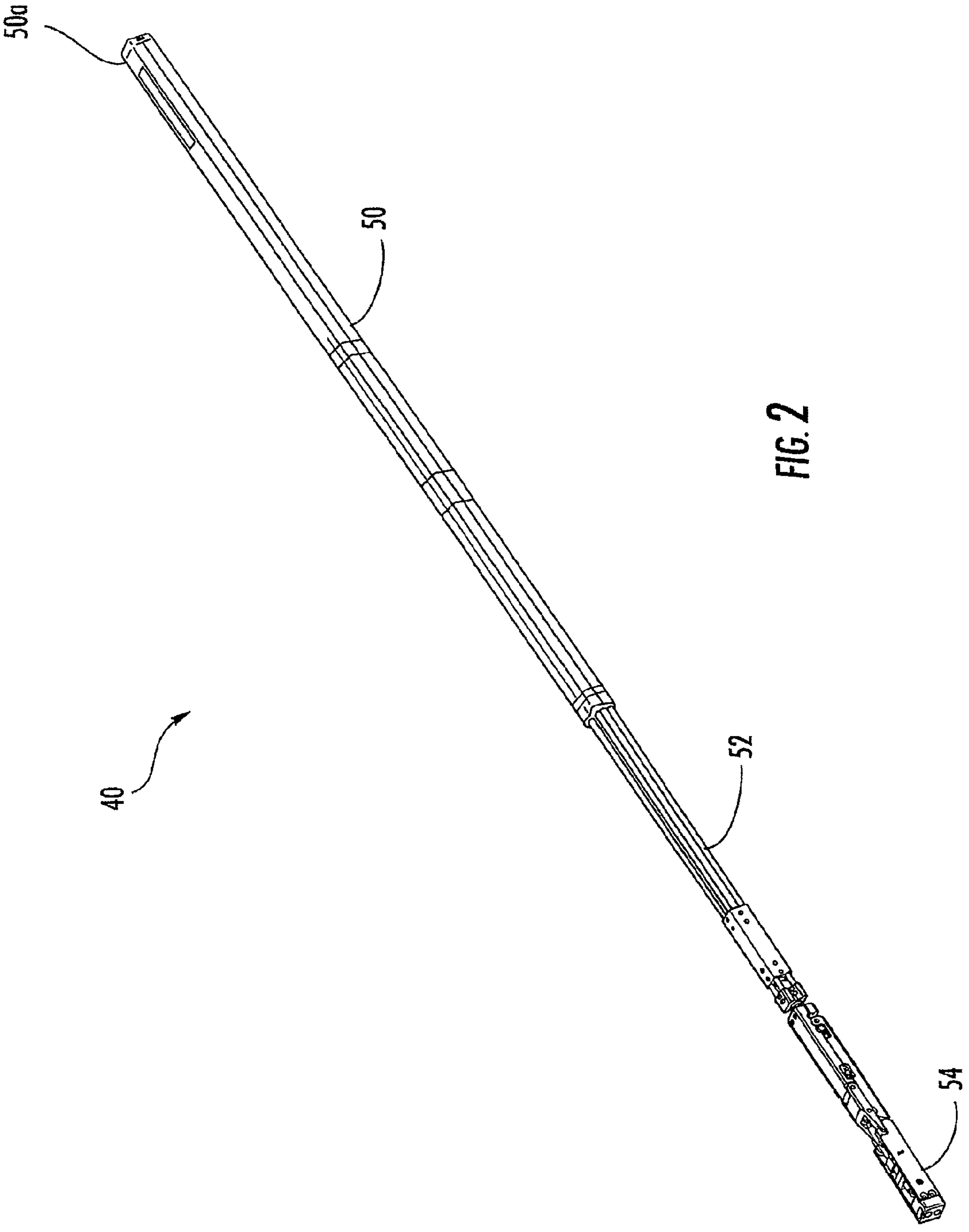
Figure 3:
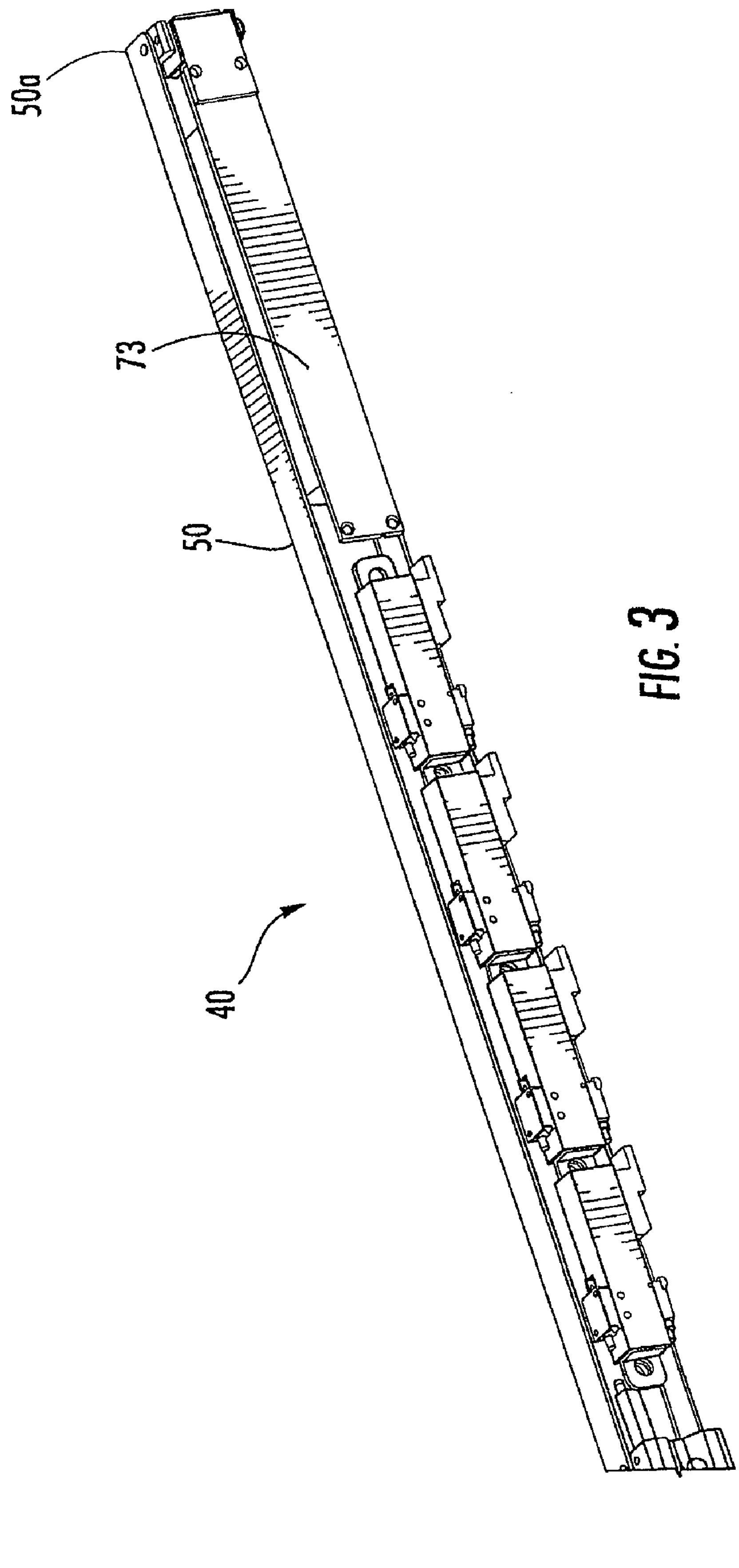
Figure 4:
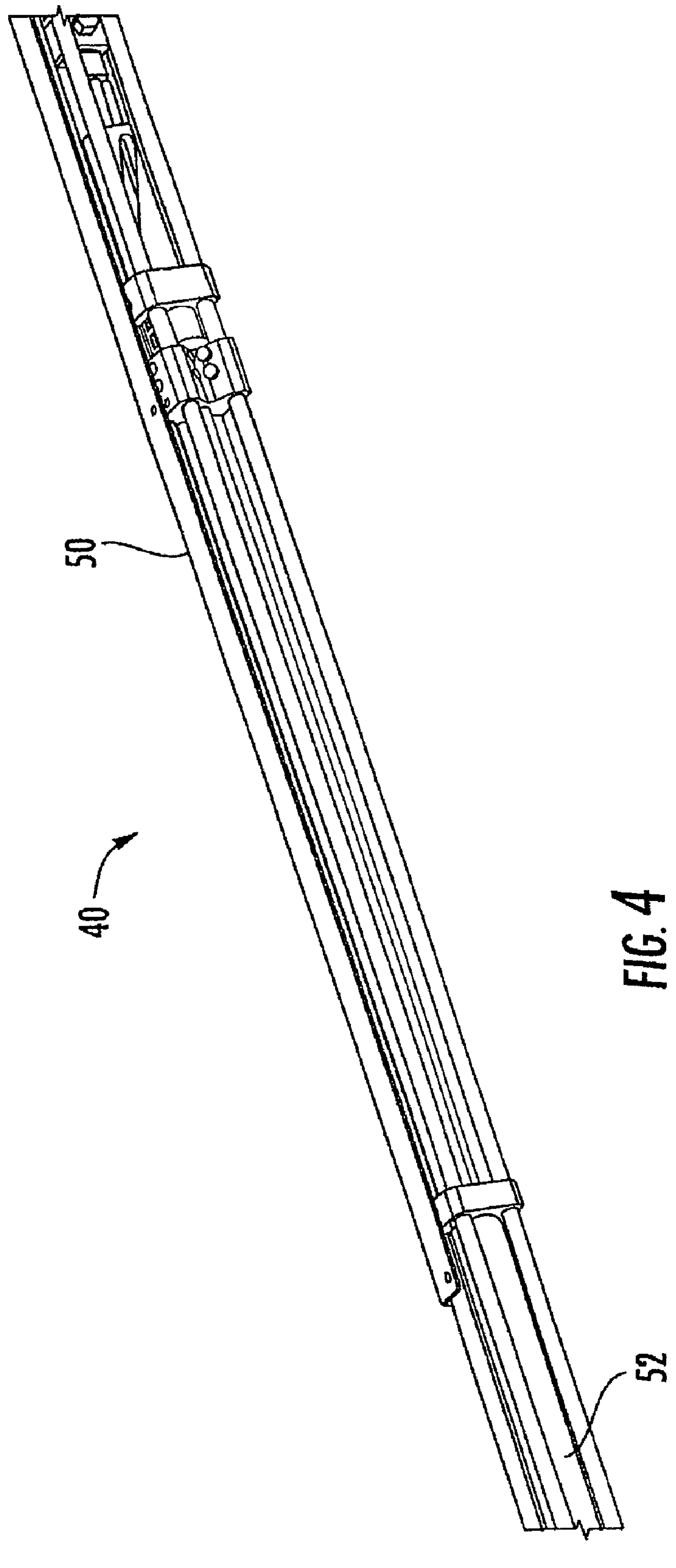
Figure 5:
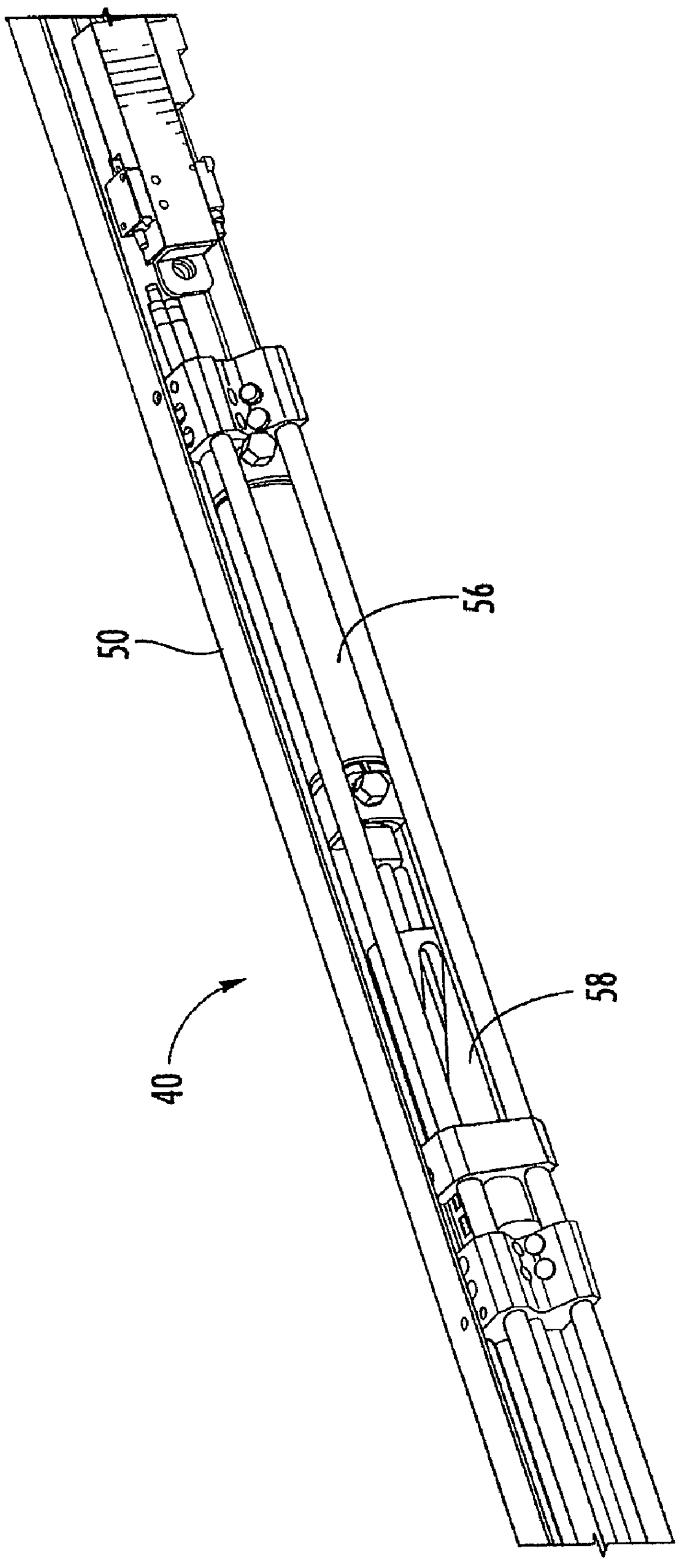
Figure 6:
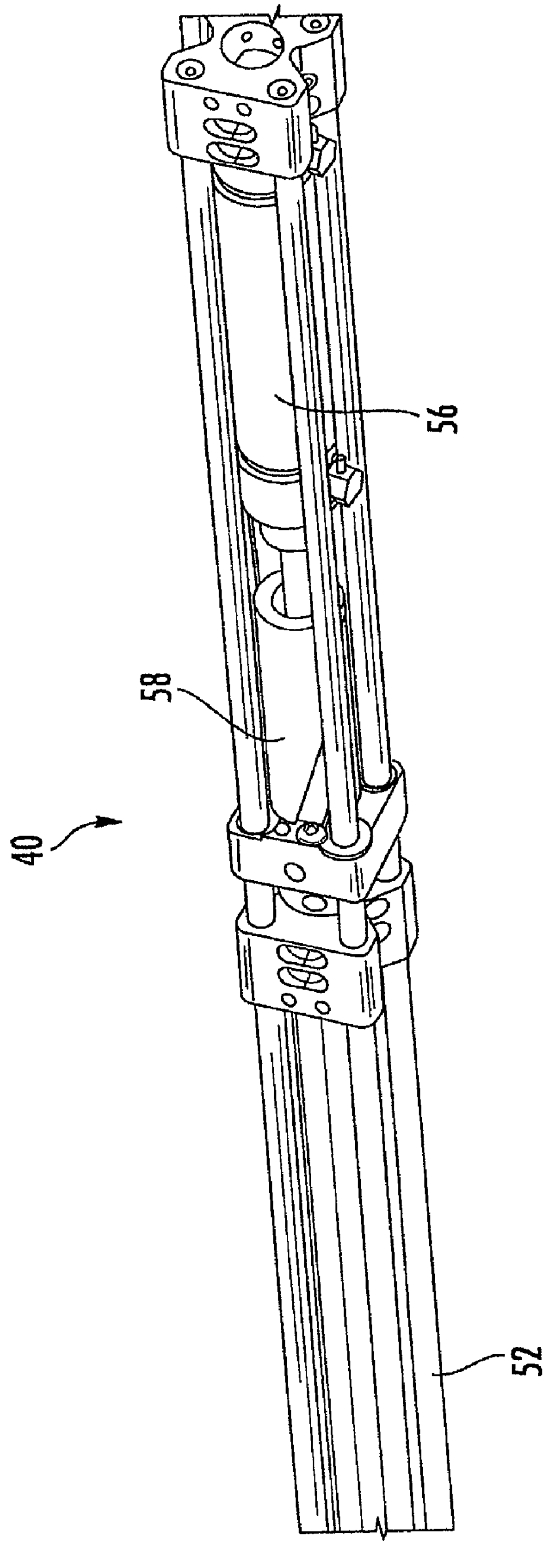
Figure 7:
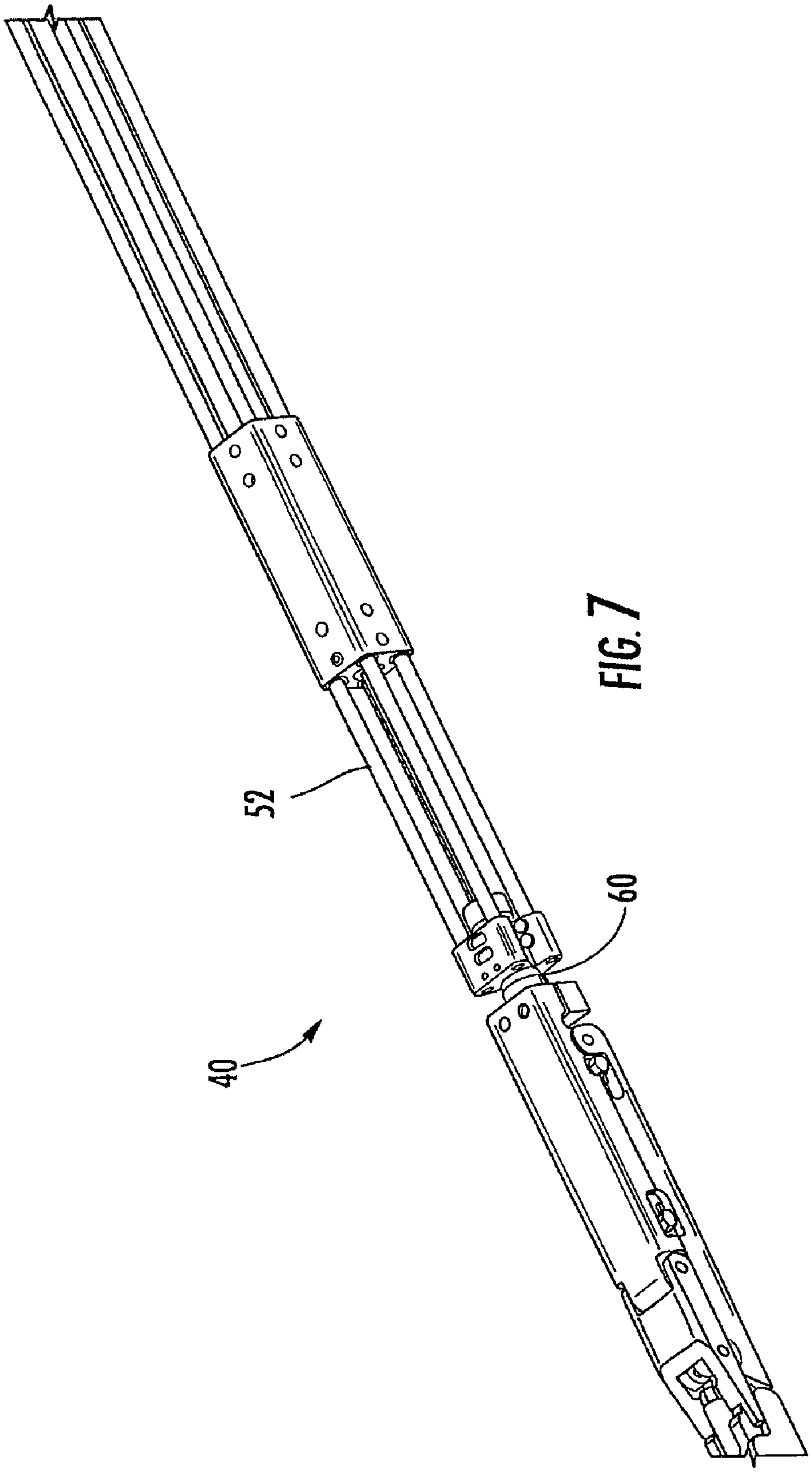
Figure 8:
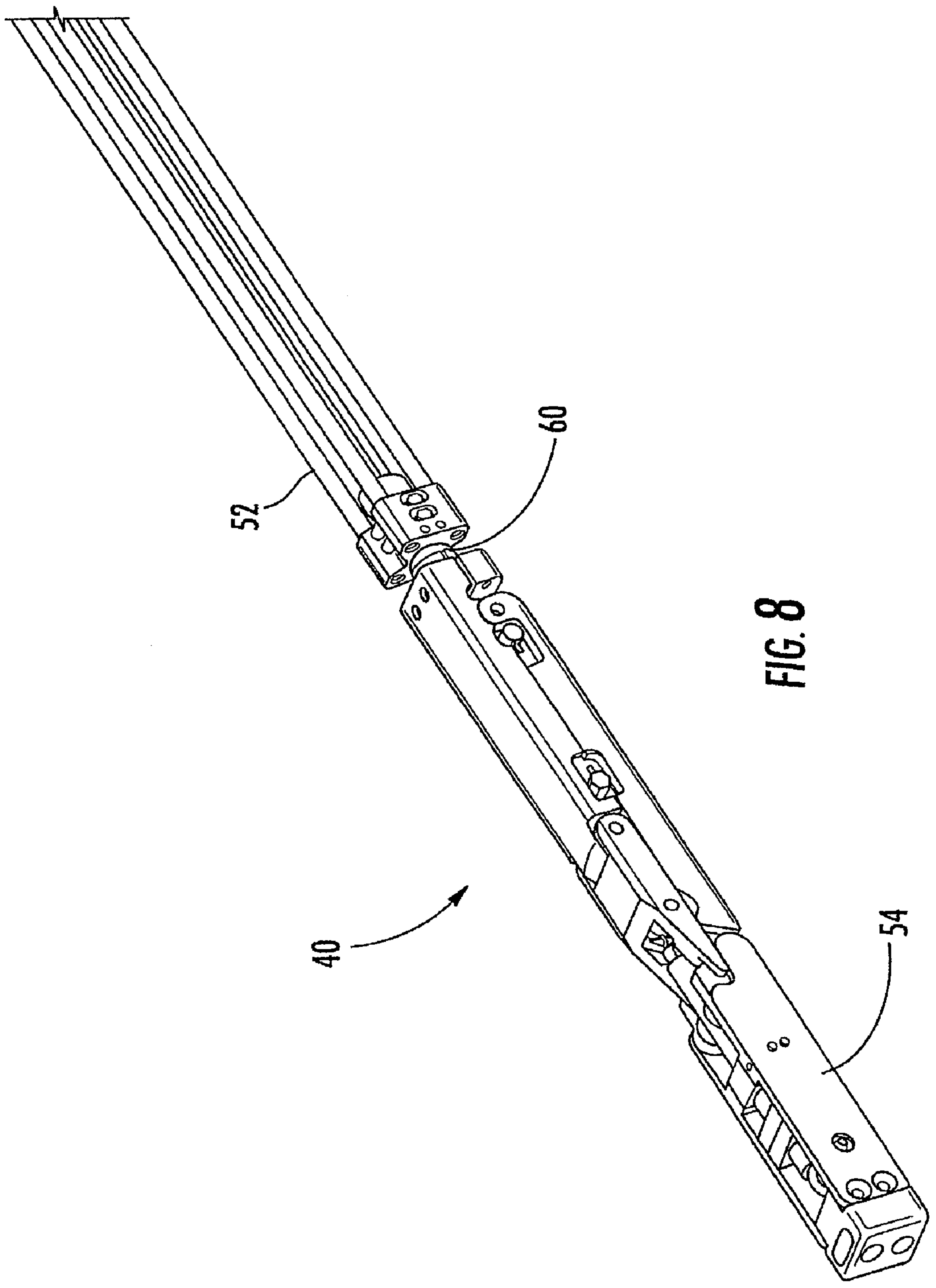
Figure 9:
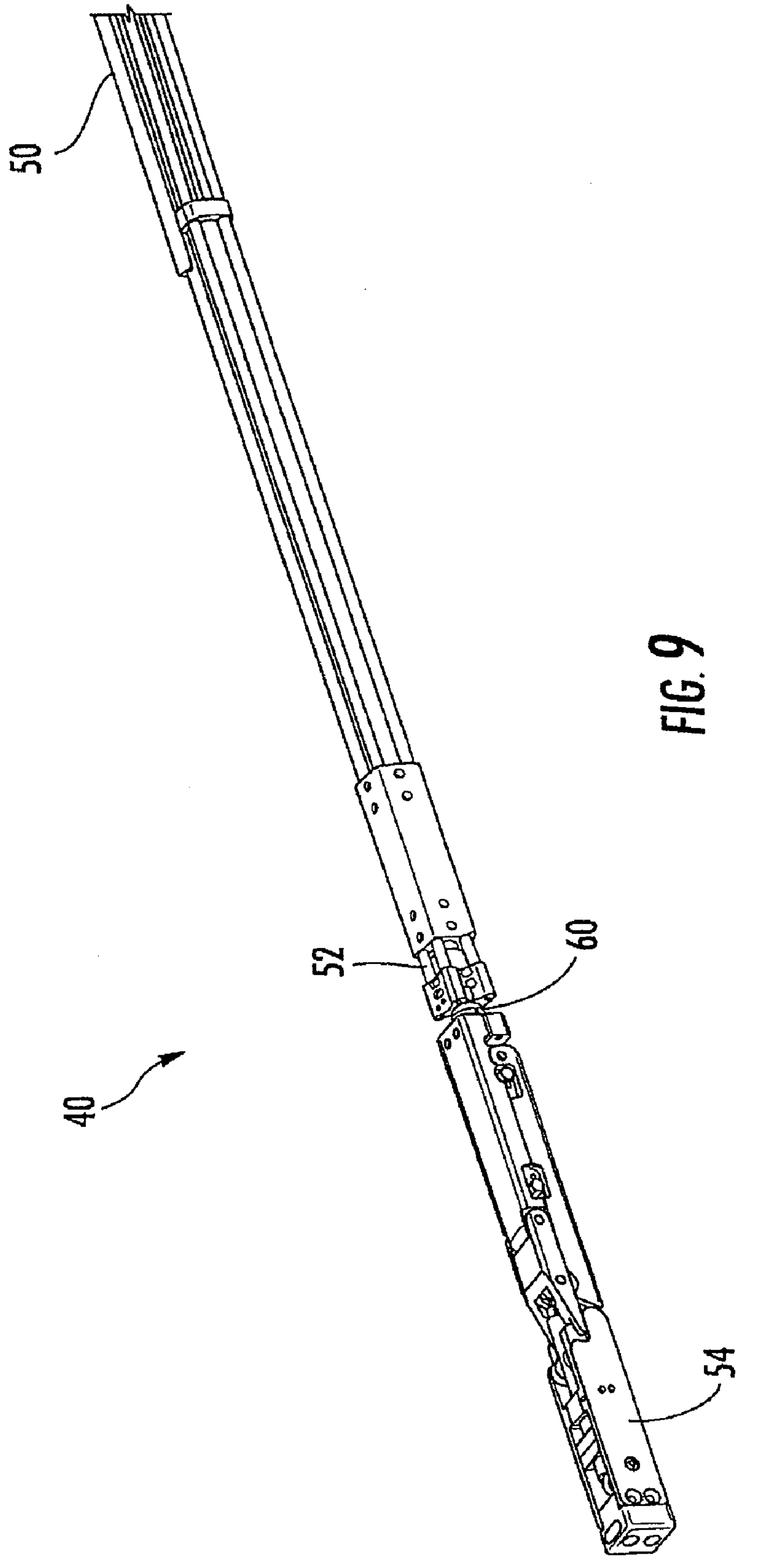
Figure 10:
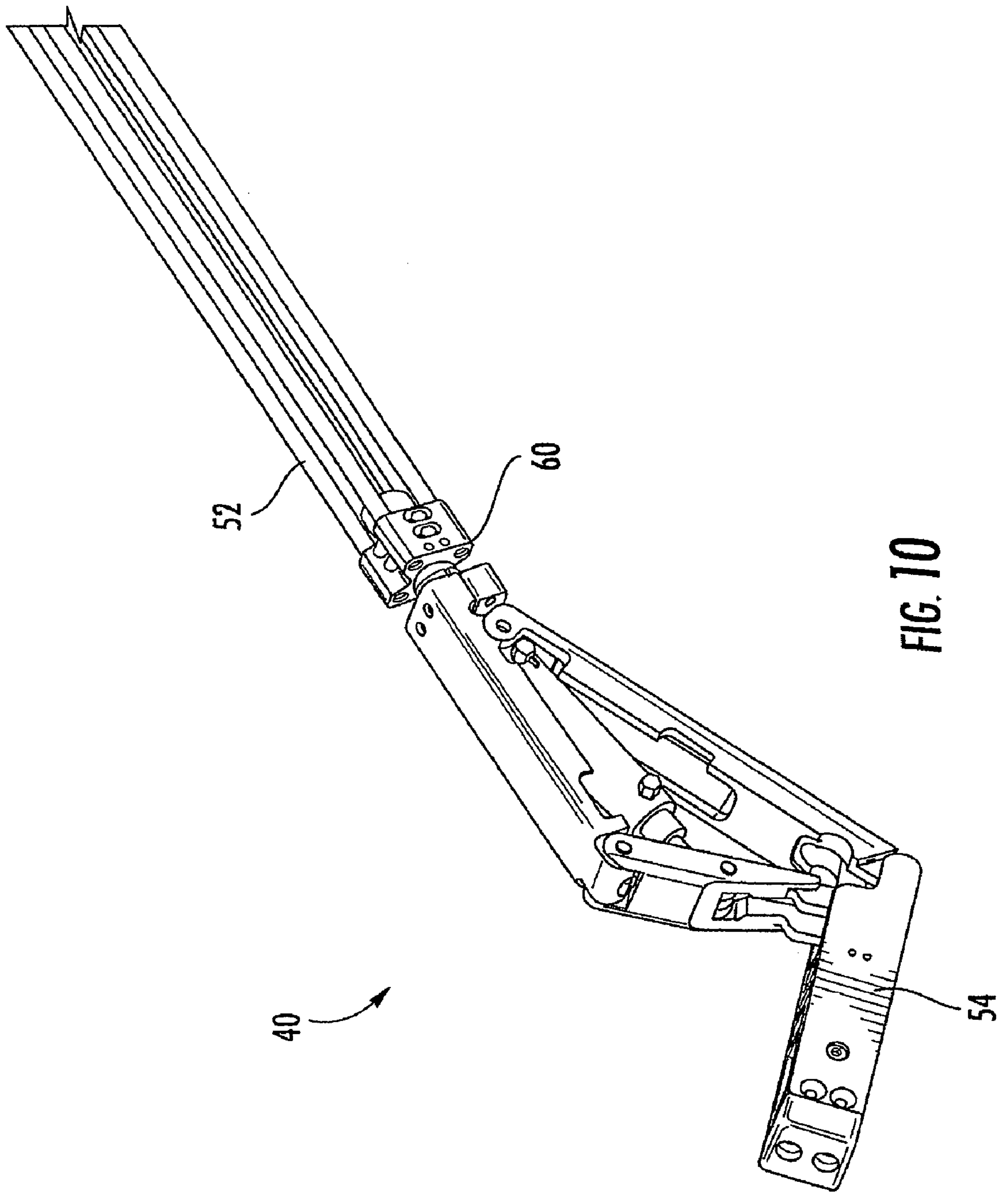
Figure 11:
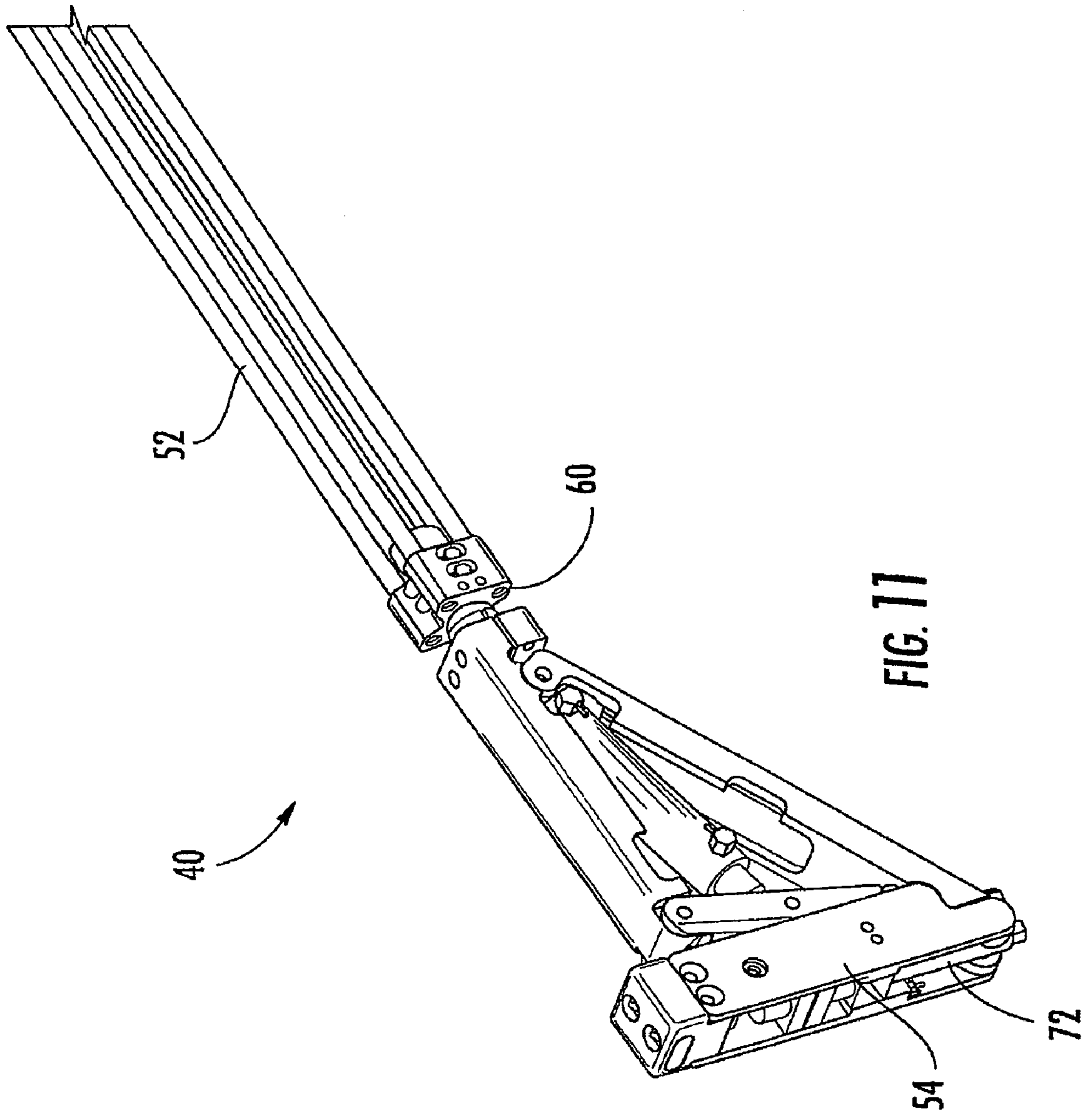
Figure 12:
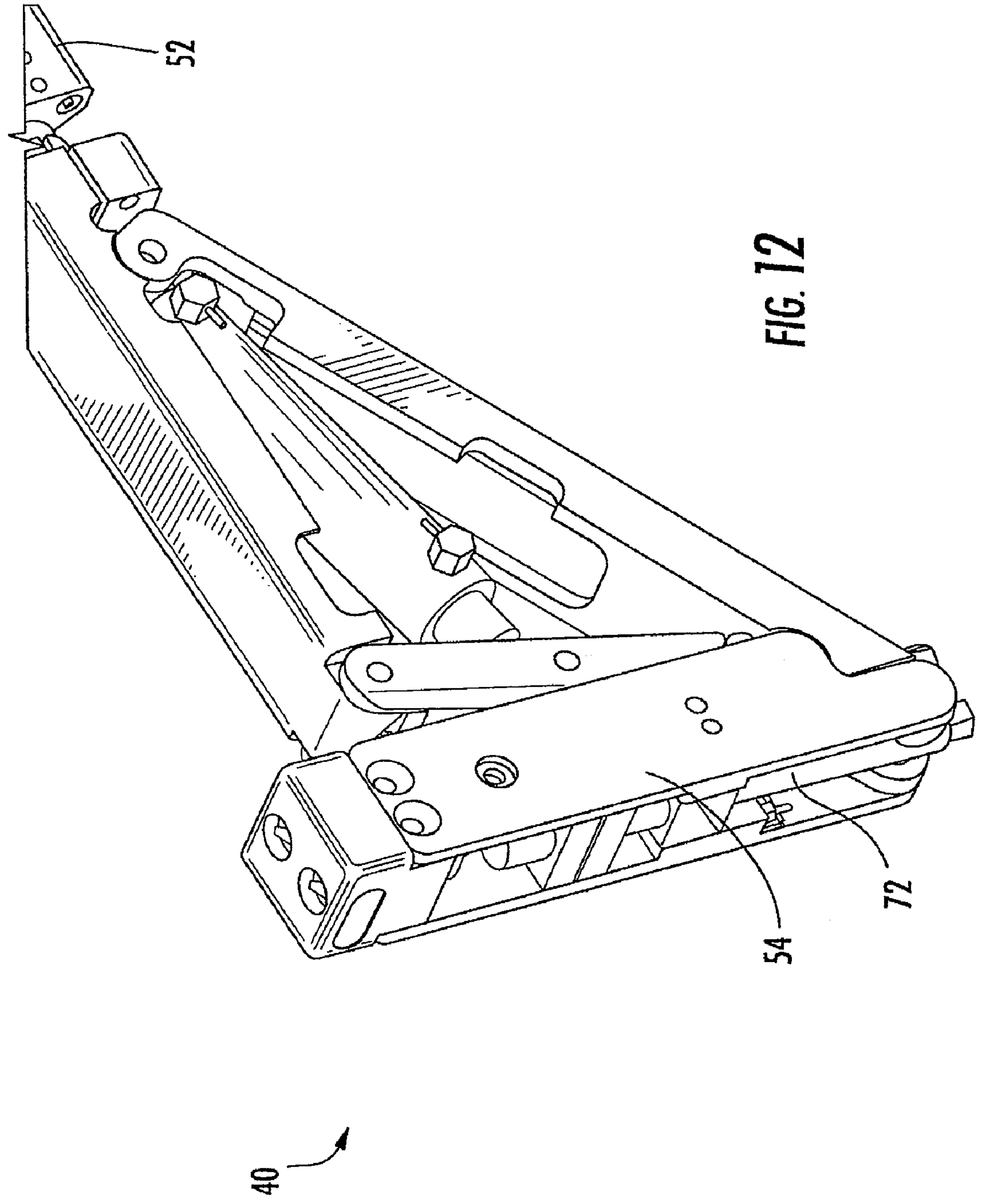
Figure 18A:
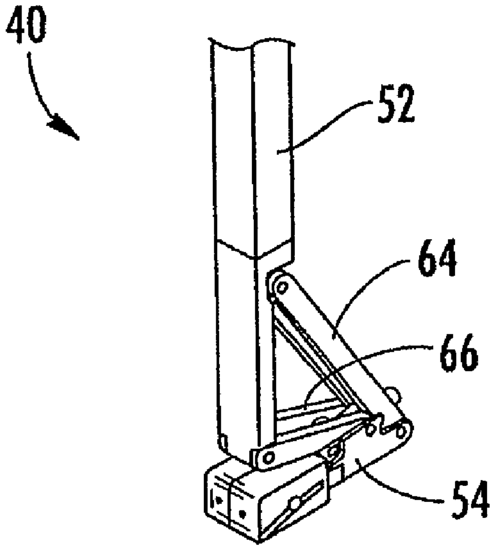
Figure 18B:
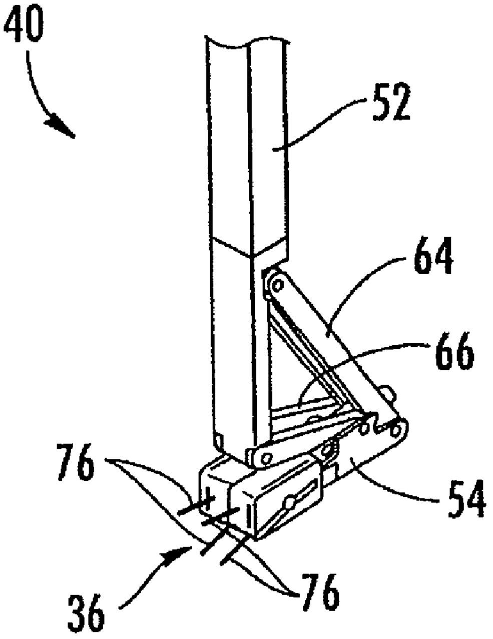
Figure 18C:
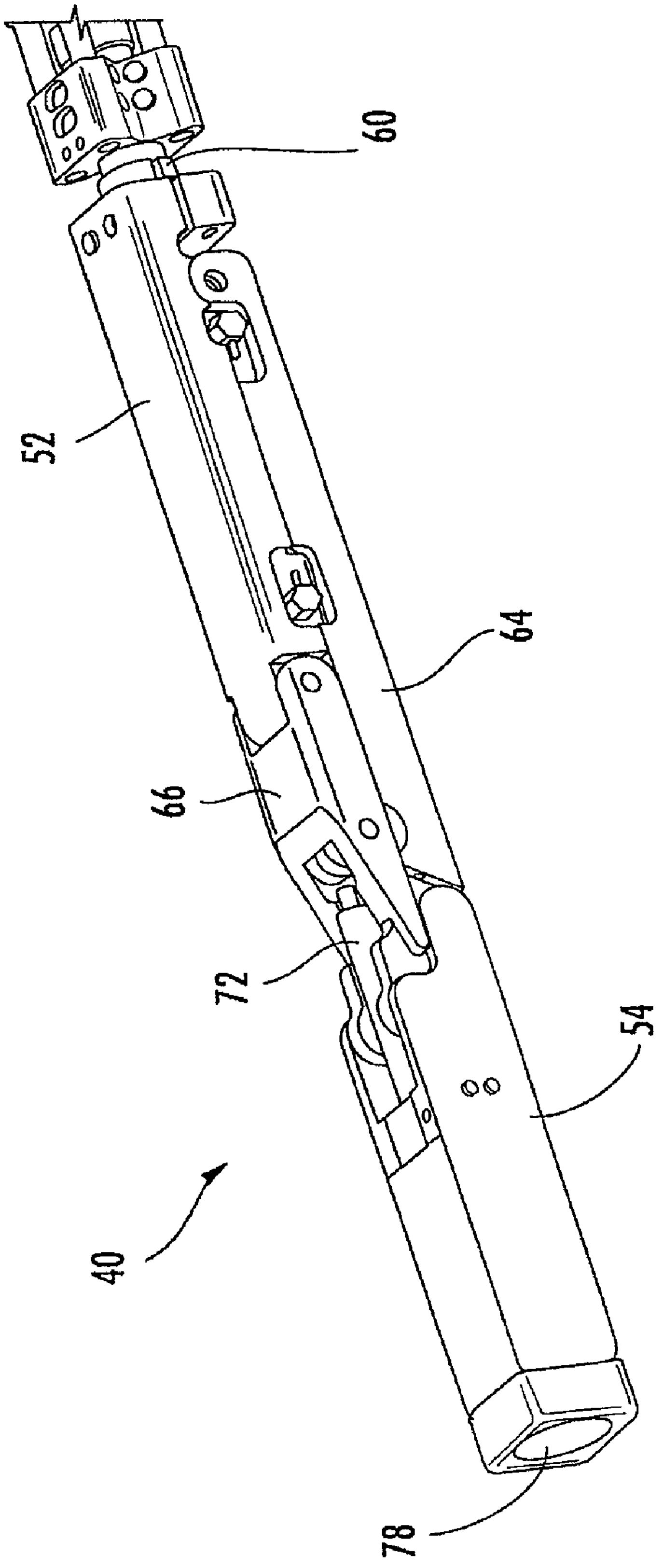
Figure 36:
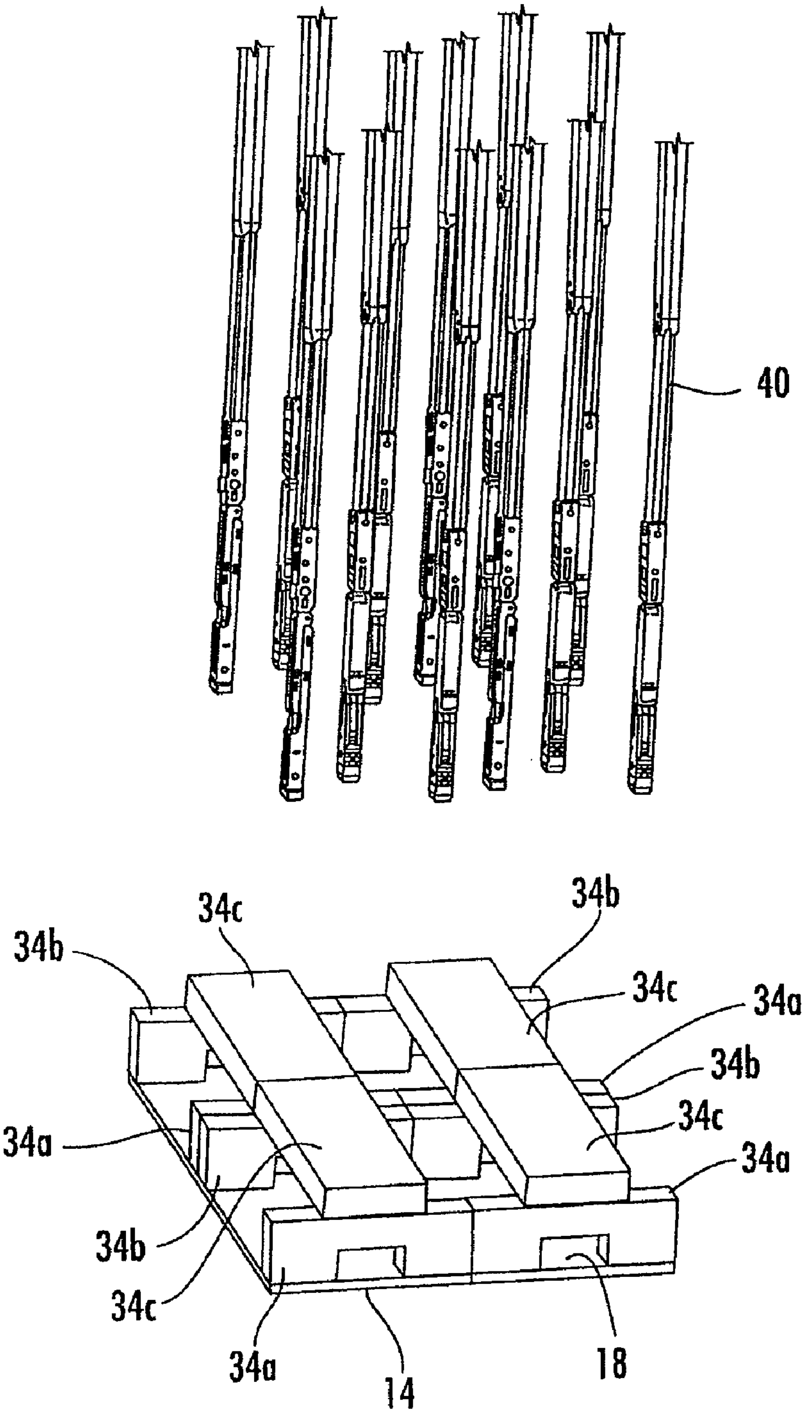
Figure 37:
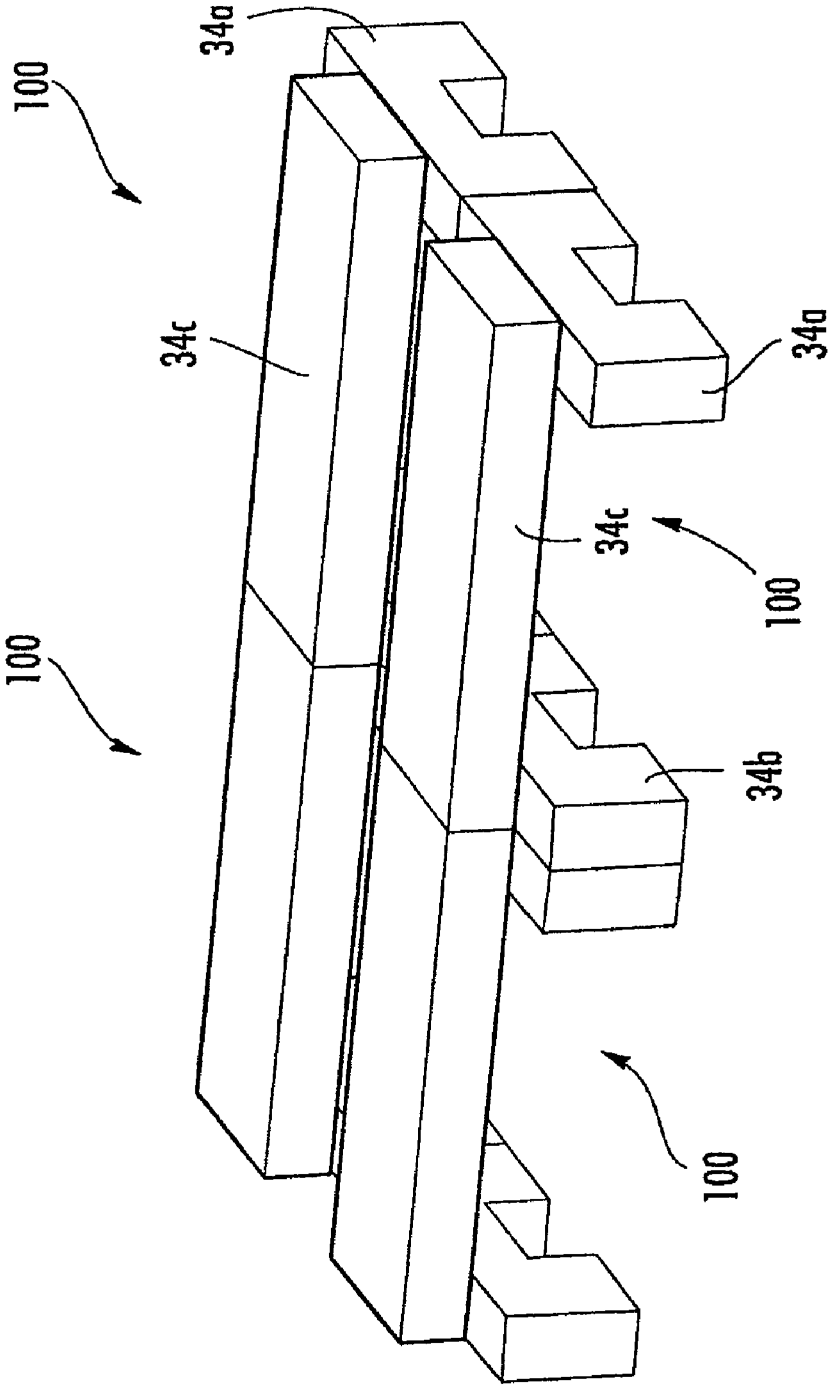
Figure 50:
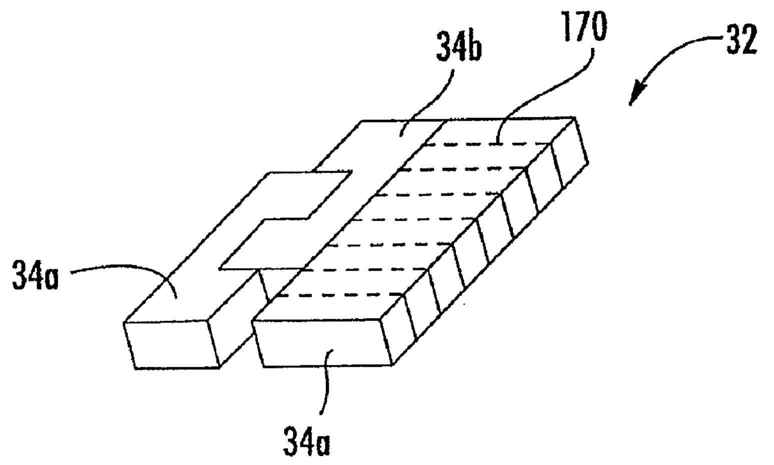
Figure 51:
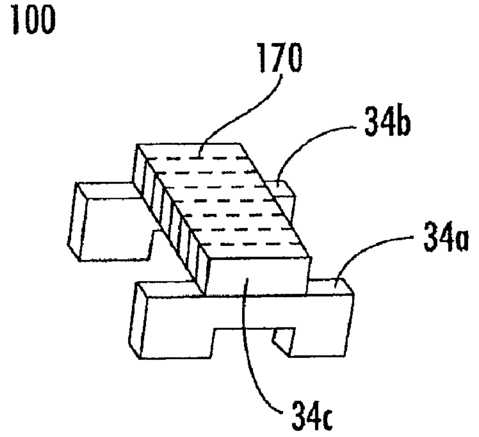
Figure 52:
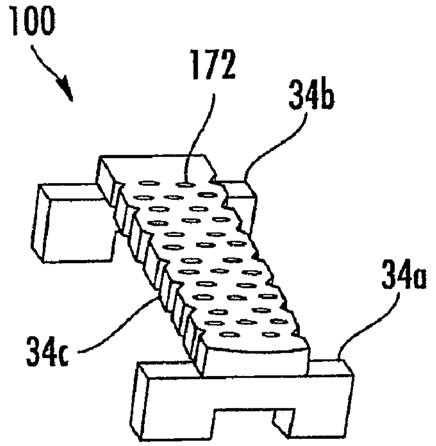
Figure 53:
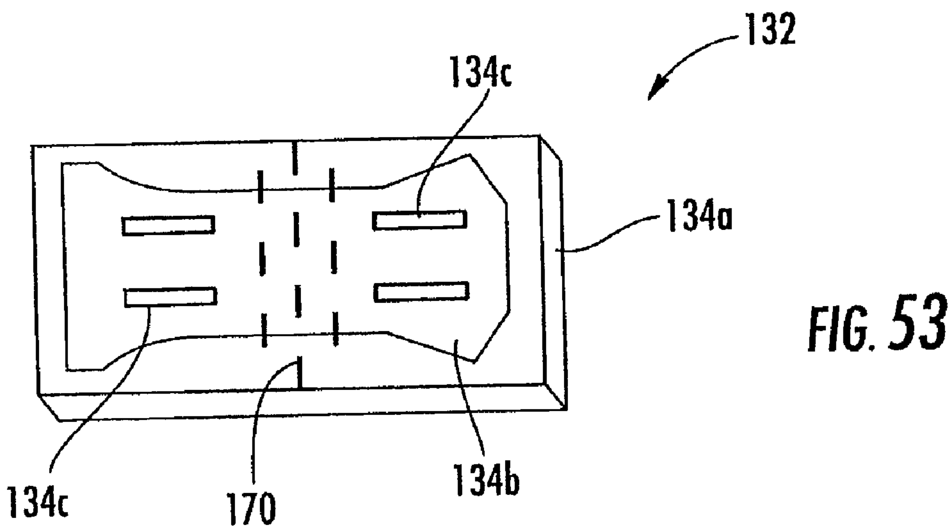
Figure 54:
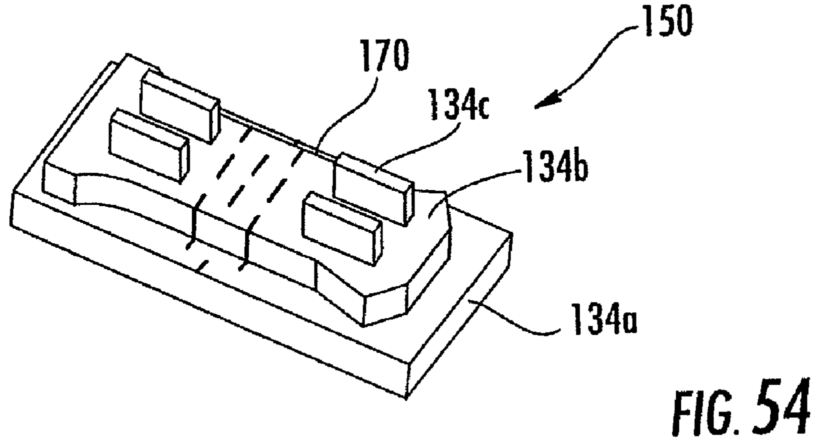
Figure 55:
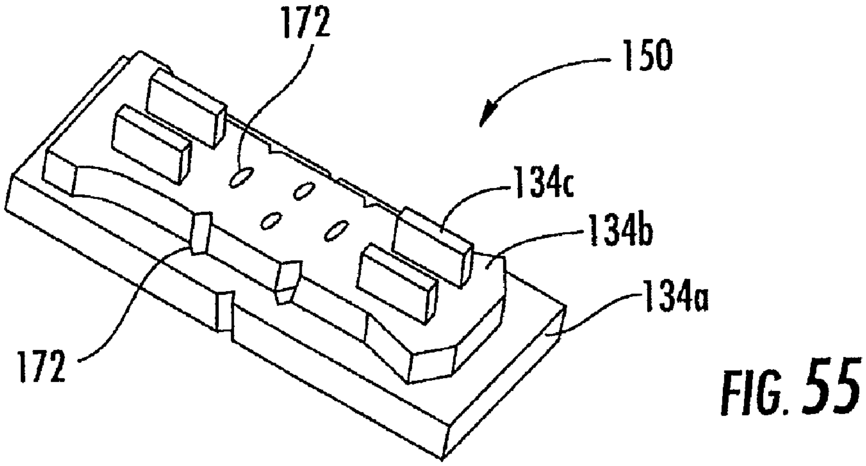
Figure 56:
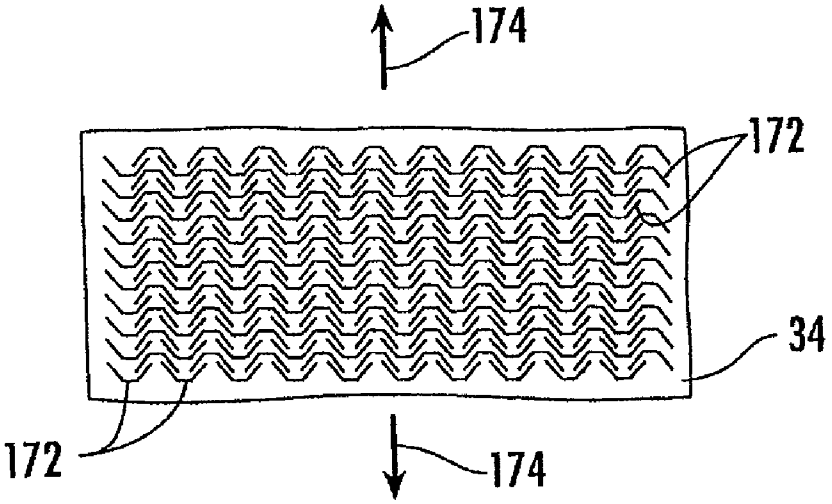
Figure 57:
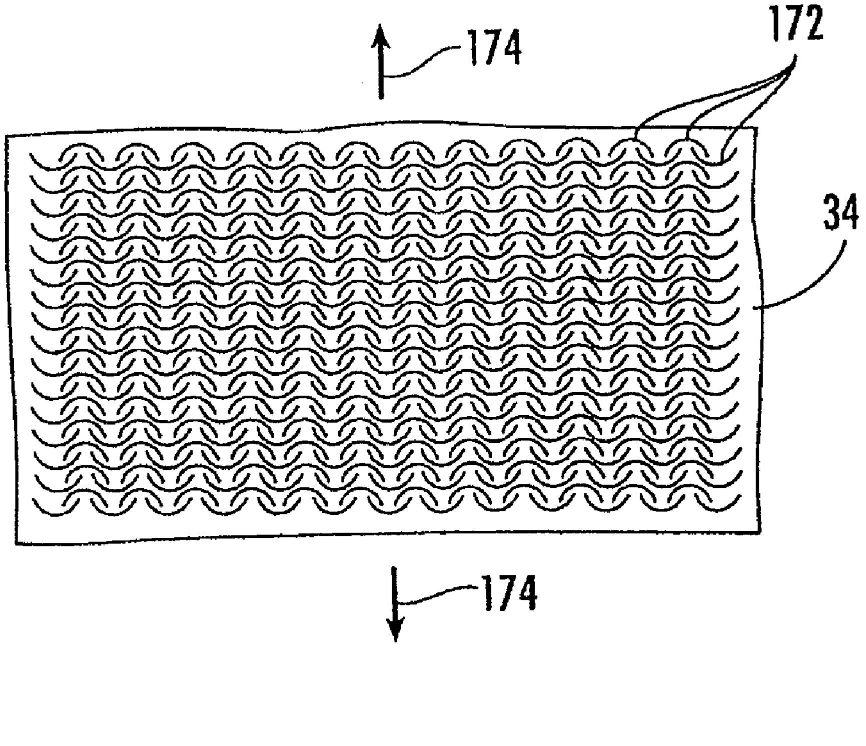

Having thus described the invention in general terms, reference will now be made to the accompanying drawings, which are not necessarily drawn to scale, and wherein:

FIG. 1 is a perspective view illustrating a machine for manufacturing foam parts according to one embodiment of the present invention;

FIG. 2 is a perspective view illustrating an actuator mechanism according to one embodiment of the present invention for engaging and reorienting a foam portion, shown with the first and second members of the mechanism in a retracted configuration and with the head member generally parallel to the longitudinal direction of the first and second members;

FIGS. 3-9 are perspective views partially illustrating the mechanism of FIG. 2;

FIG. 10-17 are perspective views partially illustrating the mechanism of FIG. 2 and illustrating the operation of the head member;

FIG. 18A is a perspective view partially illustrating an actuator mechanism according to another embodiment of the present invention, shown with the engagement tool in a retracted position;

FIG. 18B is a perspective view partially illustrating the actuator mechanism of FIG. 18A, shown with the engagement tool in an extended position;

FIG. 18C is a perspective view partially illustrating the actuator mechanism according to another embodiment of the present invention;

FIG. 19-36 are perspective views partially illustrating the machine of FIG. 1 during successive operations for manufacturing a plurality foam parts according to another embodiment of the present invention;

FIG. 37 is a perspective view illustrating four of the foam parts formed by the machine shown in FIGS. 19-36;

FIGS. 38-45 are perspective views illustrating successive operations for manufacturing a foam part according to another embodiment of the present invention;

FIGS. 46-49 are perspective views illustrating a mandrel and a plurality of foam parts formed against the mandrel according to another embodiment of the present invention;

FIG. 50 is a perspective view illustrating a section cut from a base sheet for manufacturing an expandable foam part according to another embodiment of the present invention;

FIG. 51 is a perspective view illustrating the foam part manufactured from the base sheet of FIG. 50 before expansion thereof, FIG. 52 is a perspective view illustrating the foam part of FIG. 51 after the foam part has been expanded;

FIG. 53 is a perspective view illustrating a section cut from a base sheet for manufacturing an expandable foam part according to another embodiment of the present invention;

FIG. 54 is a perspective view illustrating the foam part manufactured from the base sheet of FIG. 53 before expansion thereof, FIG. 55 is a perspective view illustrating the foam part of FIG. 54 after the foam part has been expanded; and FIGS. 56 and 57 are plan views illustrating portions of foam defining slits for forming expandable parts according other embodiments of the present invention.

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, to FIG. 1, there is shown a machine 10 for manufacturing assembled foam parts 100 (e.g., as shown in FIG. 37) according to one embodiment of the present invention. The parts 100 can be formed in many sizes and configurations and with a variety of materials for use in various applications. In particular, the parts 100 can be formed of foam, such as low density polyethylene foams typically having a weight between about 1 to 4 pounds per cubic foot, and can be formed to configurations that correspond to the shape of a packaged product and/or a box or other packages so that the parts 100 can be used as foam inserts or cushions, such as end caps, that support and protect the packaged product, e.g., during shipping, handling, storage, and the like. Other materials and different material densities can alternatively be used. As described below, the machine 10 can be used to manufacture a plurality of the foam parts 100 simultaneously, each of the foam parts 100 being the same as, or similar to, the other foam parts 100 formed at the same time.

The machine 10 generally includes a frame 12 (shown only partially in FIG. 1 for purposes of illustrative clarity) to which is mounted a support member 14 that is configured to support a base sheet 16 of foam. As illustrated, the support member 14 can define a generally horizontal support surface 18 on which the base sheet 16 can rest during manufacture. In other embodiments, the machine 10 can be otherwise configured, e.g., by turning the illustrated machine 10 on its side so that the support surface 18 is vertical. The base sheet 16 can be provided to the support member 14 from a source 20, e.g., as one of a plurality of discrete flat sheets or panels of foam material or as a continuous sheet from a roll of foam material. In either case, the base sheet 16 is typically advanced through the machine 10 in a longitudinal direction 22 of the sheet 16 and support member 14. The base sheet 16 defines a width in a transverse direction 24 that is generally perpendicular to the longitudinal direction 22. A feed mechanism, such as an arrangement of rollers 26 driven by actuators 28, can be provided for advancing the base sheet 16, i.e., adjusting the base sheet 16 into the machine 10 in the longitudinal direction 22.

A cutting device 30 is configured to cut the base sheet 16. For example, the cutting device 30 can include one or more knives, blades, cutting dies, or other cutting tools. Alternatively, the cutting device 30 can include one or more fluid cutting systems, e.g., for directing a stream of water onto the base sheet 16 to cut the base sheet 16. In any case, the cutting device 30 is typically configured to cut the support member 14 into a plurality of sections defined across the width of the base sheet 16 and/or along the length of the base sheet 16. For example, if the base sheet 16 is provided with a width of 48 inches, the machine 10 could cut the base sheet 16 into six 8-inch sections across the width of the sheet 16 (e.g., using six cutting heads that operate simultaneously to maximize throughput) and simultaneously form six of the foam parts 100.

Further, the cutting device 30 can cut each section into multiple portions, which can then be reoriented to form one of the foam parts 100. That is, each section can be cut into at least first and second portions which are then used to manufacture a respective one of the foam parts 100. As shown in FIG. 1, the base sheet 16 is cut to define four sections 32 in a 2×2 grid pattern, and each section 32 includes three separate portions 34. The cutting device 30 typically cuts the portions 34 of each section 32 while the portions 34 are disposed in a first configuration, e.g., while the portions 34 are disposed in a planar configuration against the support surface 18 of the support member 14 of the machine 10. Each cut made by the cutting device 30 typically extends through the entire thickness of the foam material of the sheet 16.

The machine 10 also includes a plurality of engagement tools 36 that are disposed across the width of the base sheet 16. Each tool 36 is configured to selectively grip or engage one or more of the portions 34 of each section 32 so that the tool 36 can be used to reorient the portions 34. For example, as discussed below in connection with FIGS. 19-36, each engagement tool 36 can be configured to grip or otherwise engage one of the portions 34 of each section 32 while other portions 34 of the same section 32 are disposed in the first configuration so that the gripped portion 34 can be reoriented relative to the other portion(s) 34 of each section 32 to achieve a desired, second configuration of the portions 34 in which the portions 34 can be joined.

A plurality of actuator mechanisms 40 are provided for adjusting the engagement tools 36. Each actuator mechanism 40 can be configured to adjust a respective one of the engagement tools 36. In particular, with a respective one of the engagement tools 36 engaged to one of the portions 34, the actuator mechanism 40 can adjust the position of the respective engagement tool 36 and thereby reorient the portion 34 to the desired configuration. It is appreciated that each of the actuator mechanisms 40 can be configured to adjust a different one of the engagement tools 36 and, further, that the actuator mechanisms 40 can adjust the different engagement tools 36 simultaneously to form multiple foam parts 100 across the width of the base sheet 16 simultaneously.

The machine 10 can join the foam portions 34 of each section 32 in the desired configuration so that each section 32 of the base sheet 16 is used to manufacture one of the foam parts 100. The foam portions 34 can be joined by a joining device 42, which can apply an adhesive to the contacting surfaces of the portions 34 or provide a heater that heats the contacting surfaces of the portions 34 so that the foam at the interface is melted, plasticized, or otherwise configured for joining. The joining device 42 can be adjustably mounted on the frame 12 and adjusted by one or more actuators to provide heat or adhesive to particular surfaces of the portions 34, as further described below in connection with FIGS. 30 and 31.

The cutting, reorienting, and/or joining operations can be performed successively in the same machine 10, and the movement of the foam portions 34 can be controlled throughout the various operations. In particular, each foam portion 34 can be moved through a predetermined path from the time that the portion 34 is cut from the base sheet 16 until the portion 34 is incorporated into a finished parts 100. Further, the machine 10 can operate automatically and relatively continuously to manufacture successive batches of the parts 100. For example, subsequent to the joining of the portions 34 of the sections 32 for forming a first batch of parts 100 in a first cyclic operation, the machine 10 can dispense the parts 100 therefrom and continue with a second operation for manufacturing a second batch of the parts 100. In the second operation, the feed mechanism 26, 28 of the machine 10 can adjust the base sheet 16 in the longitudinal direction 22, i.e., to advance the base sheet 16 into the machine 10 toward the engagement tools 36 and then repeat the various operations for cutting the portions 34 from the base sheet 16, engaging the foam portions 34 with the actuator mechanisms 40 via the engagement tools 36, actuating the actuator mechanisms 40 to thereby reorient the foam portions 34 to the desired configuration, and joining the foam portions 34 in the desired configuration to manufacture the second batch of parts 100 from the base sheet 16. Thereafter, the machine 10 can continue to automatically operate to manufacture subsequent batches of parts 100 in the same manner.

FIGS. 2-17 further illustrate one of the actuator mechanisms 40 of the machine 10 of FIG. 1 for engaging, or gripping, one of the foam portions 34 and reorienting the foam portion 34 to a desired configuration. It is appreciated that the machine 10 can include any number of the actuator mechanisms 40, such that one or more of the actuator mechanisms 40 are arranged for reorienting the foam portions 34 of each section 32. Each actuator mechanism 40 can be configured to operate in a relatively small space to avoid interfering with the motion of the other actuator mechanisms 40. In this way, the actuator mechanisms 40 can operate simultaneously so that the machine 10 can produce more than one of the foam parts 100 at a time. In particular, in addition to having a relatively long, slim configuration, each actuator mechanism 40 can be configured to grip a foam portion 34 and move the foam portion 34 through a range of motion while the actuator mechanism 40 remains in a relatively small work area to avoid interference with the adjacent mechanisms 40. The size of the work area of the actuator mechanism 40 is typically defined in a plane that is perpendicular to the longitudinal axis of the mechanism 40. For example, if the actuator mechanisms 40 are arranged to extend generally normal to the working surface (e.g., support surface 18 of FIG. 1), each mechanism 40 can typically operate in a relatively small work area defined in a plane parallel to the surface 18 (i.e., horizontal as shown in FIG. 1) to avoid interference between adjacent mechanisms 40 along the width and/or length of the base sheet 16 and support member 14. In some cases, each work space extends no further in the transverse direction 24 than the width of one of the sections 32 of the base sheet 16.

As shown in FIGS. 2-7, the mechanism 40 generally includes first and second members 50, 52 that extend along a longitudinal direction. A first end 50a of each first member 50 can be mounted to the frame 12 (FIG. 1) so that the members 50, 52 are cantilevered to extend from the frame 12, and the mechanism 40 can be configured to adjust in a variety of motions to reorient a head member 54 having at least one of the engagement tools 36 that can be engaged to the foam portion 34. For example, as illustrated, the first and second members 50, 52 can be telescopically adjustable relative to one another. In particular, the first member 50 can be configured to receive at least a part of the second member 52 so that the second member 52 can be selectively inserted into or retracted from the first member 50, thereby adjusting the length of the mechanism 40 and the position of the head member 54 in the longitudinal direction of the members 50, 52 relative to the frame 12. One or more actuators 56 can be provided in, or otherwise connected to, the actuator mechanism 40 for selectively adjusting the length of the mechanism 40. Actuators 56 may also be controlled using signals from an electronic board or other controller device 73, which can work communicate and work in conjunction with a controller 74 (FIG. 1). In this way, the head member 54 extends from the one or more members 50, 52 of the actuator mechanism 40, e.g., such that the head member 54 extends from and is connected to the first member 50 via the second member 52, and is adjustable by the mechanism 40.

Figure 13:
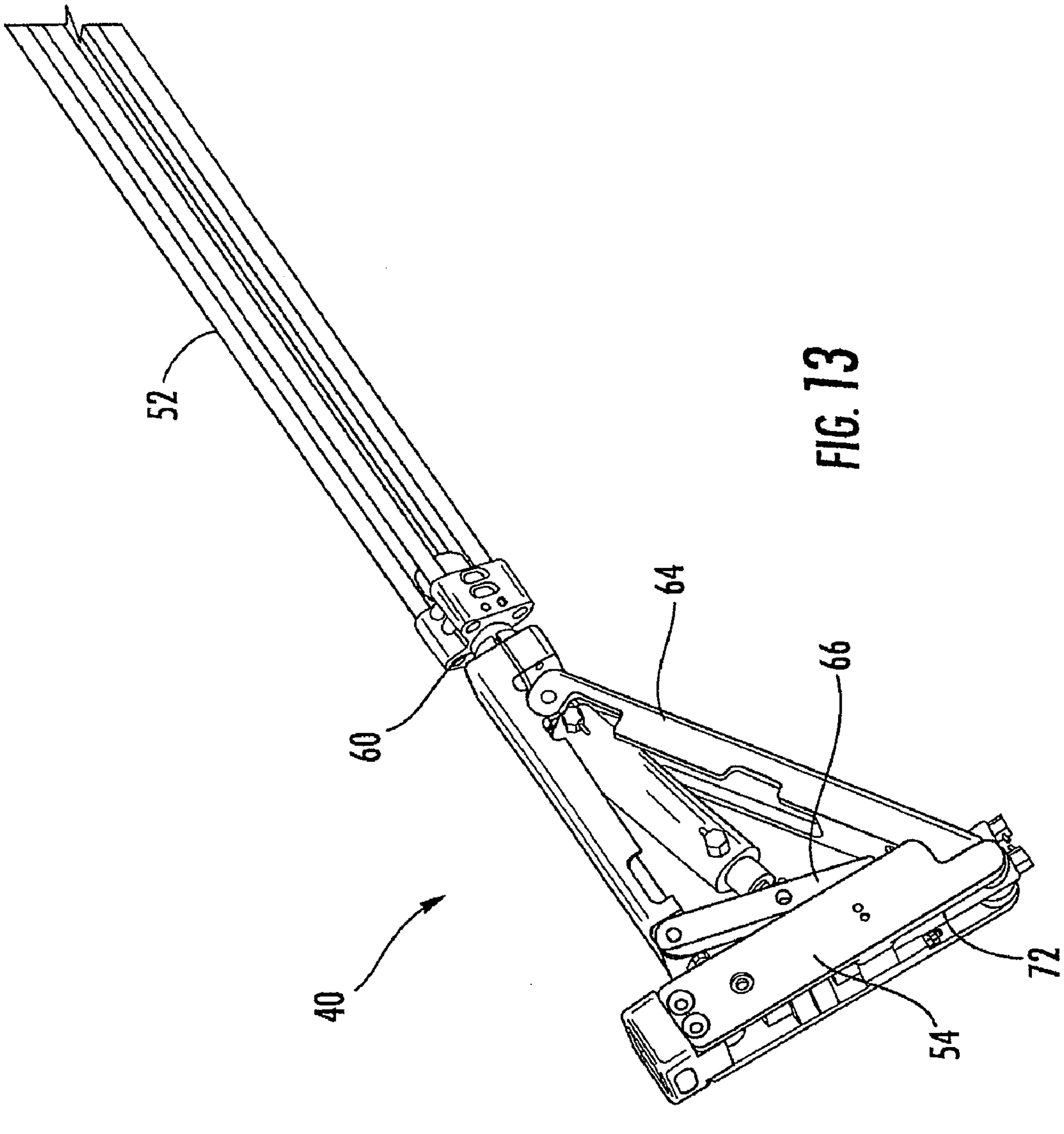
Figure 14:
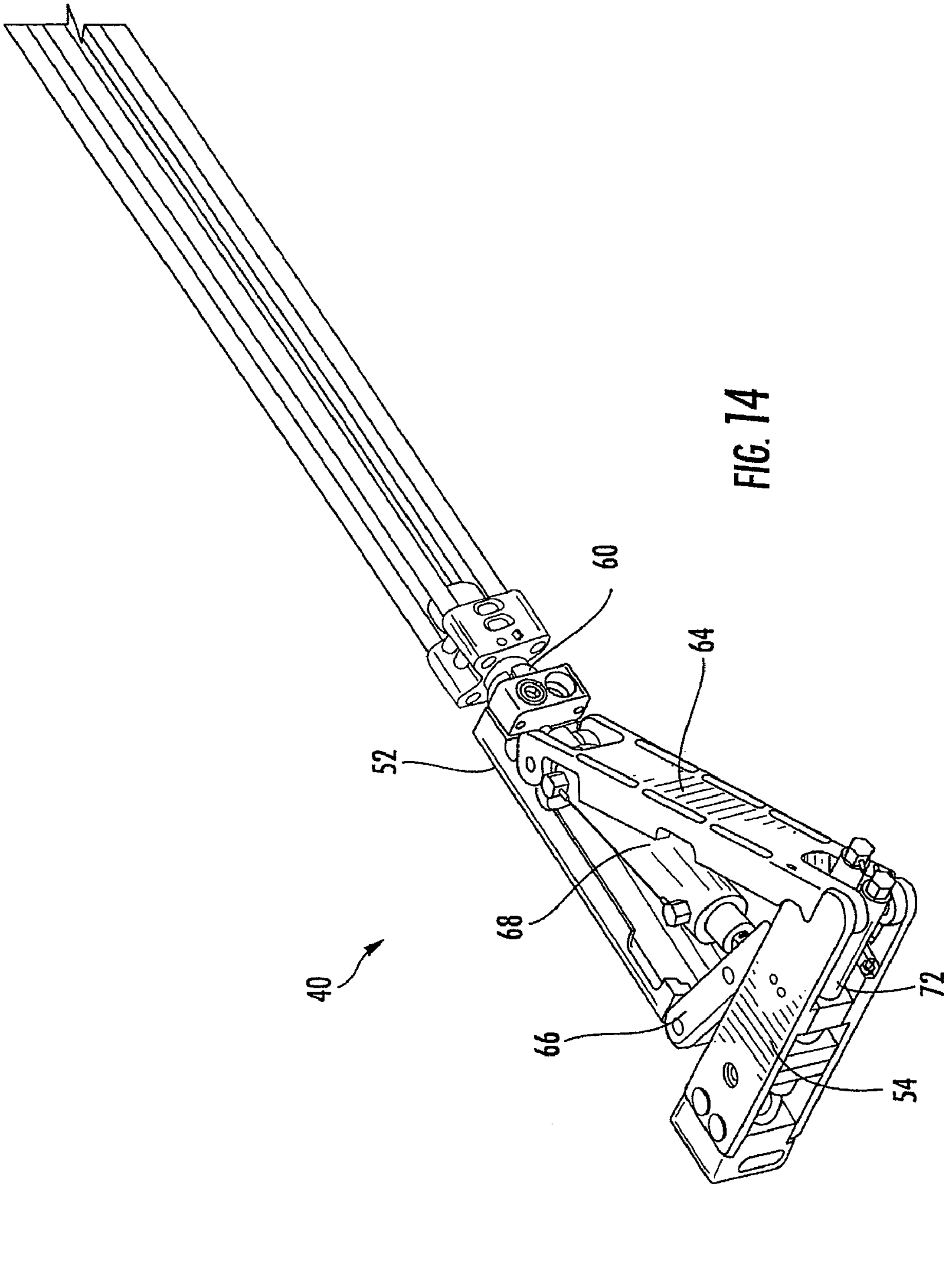
Figure 15:
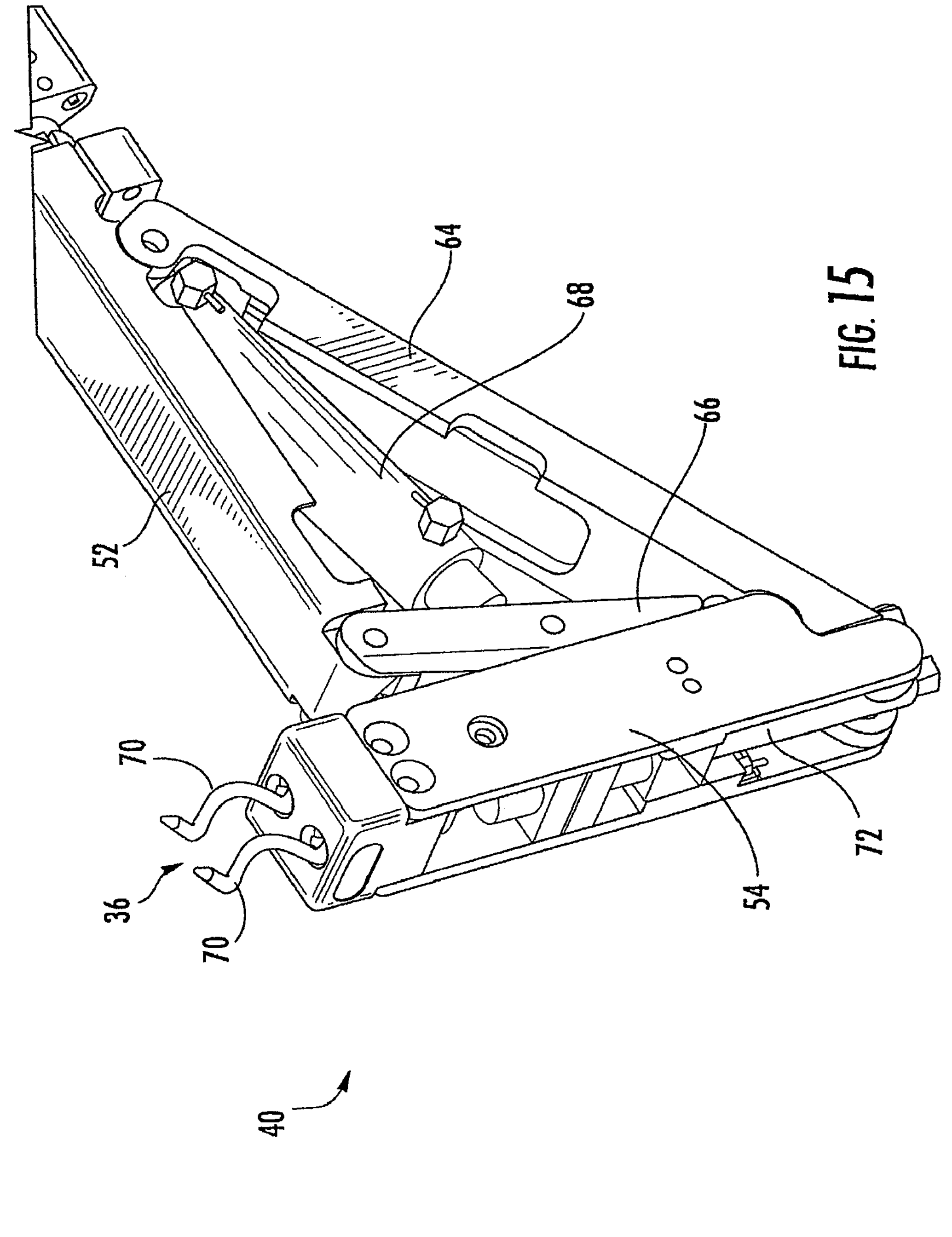
Figure 16:
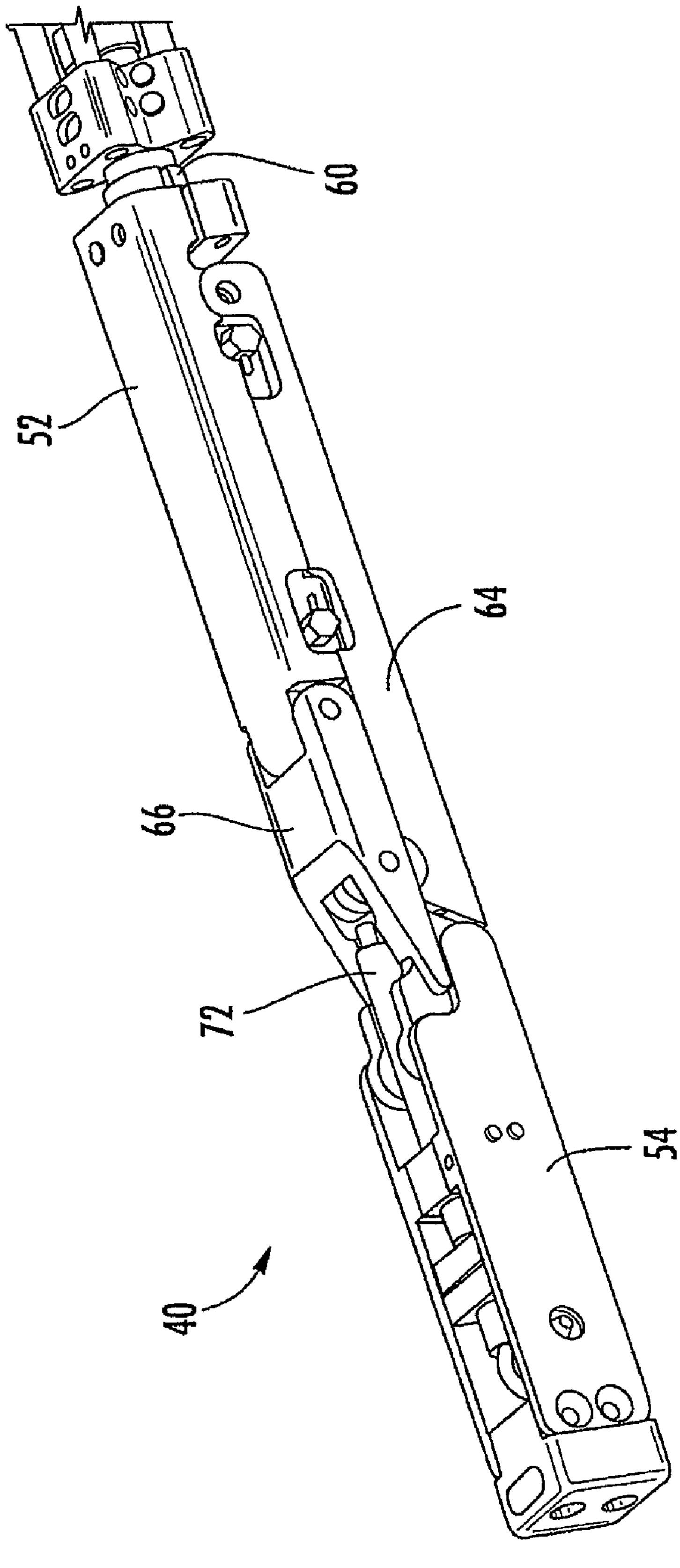

The members 50, 52 can also define a rotary joint 60 that is rotatable about the longitudinal axis of the members 50, 52, as shown in FIGS. 8-14. In the illustrated embodiment, the rotary joint 60 is defined by the second member 52, but the rotary joint 60 can alternatively be defined by the first member 50 or at an interface of the members 50, 52. The head member 54 can be automatically rotated about the longitudinal axis of the members 50, 52 by an actuator that rotates the joint 60 as shown in FIGS. 13 and 14, e.g., using actuator 56 and a cam member 58 defining a spiral guide.

The head member 54 can also be rotatably connected to the second member 52 so that the head member 54 can be rotated about another axis. In particular, the head member 54 can be structured to rotate about an axis that is generally perpendicular to the longitudinal direction of the first and second members 50, 52. Various types of rotatably connections can be provided between the head member 54 and the second member 52. In some cases, the axis about which the head member 54 rotates can be offset from the longitudinal axis defined by the first and second members 50, 52.

For example, the head member 54 can be connected to the second member 52 via first and second links 64, 66, as shown in FIGS. 10-14. A first end of each link 64, 66 can be rotatably connected to the second member 52 (and, hence, rotatably connected to the first member 50 via the second member 52), and an opposite end of each link 64, 66 can be rotatably connected to the head member 54. In this way, the second member 52, links 64, 66, and the head member 54 can together define a four-bar linkage, and the position of the head member 54 relative to the second member 52 can be controlled by an actuator 68 positioned between two or more of the members of the linkage. Thus, the actuator 68 can selectively extend or retract to thereby rotate the links 64, 66 so that the head member 54 is rotated about an axis perpendicular to a longitudinal axis of the first and/or second members 50, 52. Further, with the rotational axis of the head member 54 offset from the longitudinal axis of the members 50, 52, the engagement tool 36 can be configured to be disposed substantially along the longitudinal axis regardless of the rotation of the head member 54. That is, the engagement tool 36 can be substantially along the longitudinal axis of the members 50, 52 when the head member 54 is rotated to a first position in which the head member 54 is parallel to the members 50, 52

(FIGS. 16 and 17) and to a second position in which the head member 54 is perpendicular to the members 50, 52 (FIGS. 11-15). In this way, the actuator mechanism 40 can rotate the respective engagement tool 36 in one of a plurality of relatively small work areas successively defined along the width and/or length of the base sheet 16 and support member 14 to avoid interfering with other actuator mechanisms 40, engagement tools 36, and/or foam portions 34 in successively adjacent work areas across the width or length of the machine 10.

Figure 17:
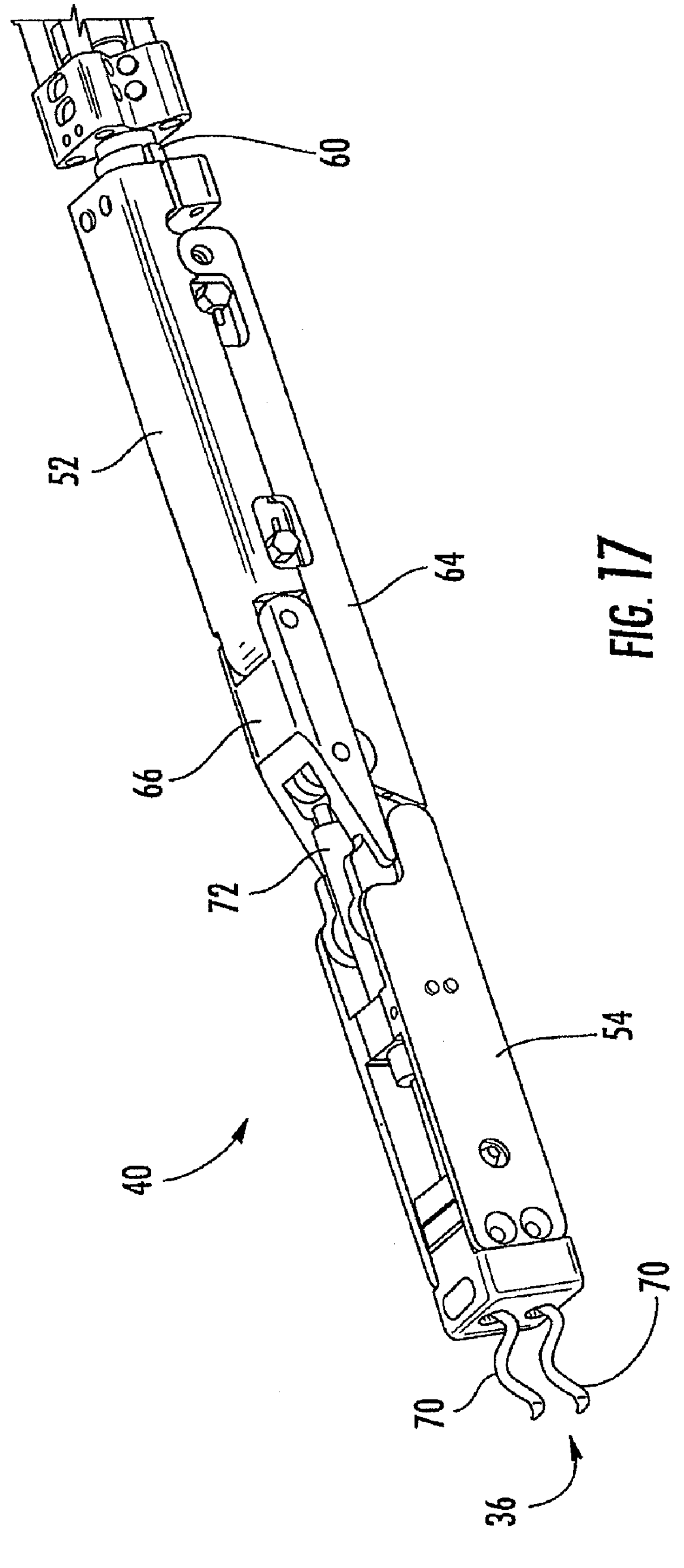

The engagement tool 36 is adjustably mounted to the head member 54 so that the tool 36 can be selectively engaged with and disengaged from the foam portion 34, typically by advancing the tool 36 into the foam portion 34 to thereby engage the portion 34 and retracting the tool 36 from the foam portion 34 to thereby disengage the portion 34. In one embodiment, the engagement tool 36 includes one or more helical pins 70, such as corkscrews. Each helical pin 70 can be connected to an actuator 72 that selectively rotates the pin 70 in opposite directions and thereby adjusts the pins 70 from a retracted position (FIG. 16) to an extended position (FIG. 17). Thus, with the head member 54 disposed proximate the foam portion 34, e.g., with the one or more helical pins 70 pressed against the foam portion 34, the actuator 72 can rotate the helical pin 70 in a first direction so that the pin 70 is advanced and driven into the foam portion 34 to engage the foam portion 34. The helical pin 70 can be rotated until the foam portion 34 is secured against the head member 54. With the head member 54 so engaged with the foam portion 34, the foam portion 34 can be reoriented by the mechanism 40. Then, with the foam portion 34 in a desired configuration, the actuator 72 can rotate the pin 70 in a second, opposite direction so that the pin 70 is retracted from the foam portion 34. The actuators 72 for operating the engagement tools 36 are selectively energized, typically by a controller 74 (FIG. 1) that operates automatically, e.g., according to a predetermined list of instructions such as a software program, or activated by sensors, including laser sensors and camera-vision algorithm-based sensors and software.

Other engagement tools 36 can alternatively be used to engage the foam portion 34. For example, in another embodiment, shown in FIGS. 18A and 18B, the engagement tool 36 includes two or more pins 76 that are configured to be advanced into the foam portion 34 in nonparallel directions. In particular, as illustrated in FIG. 18B, the engagement tool 36 includes two pairs of pins 76. Each pair includes two pins 76 that are slidably extendable from the head member 54 along nonparallel directions from a retracted position (FIG. 18A) to an extended position (FIG. 18B). In the illustrated embodiment, the pins 76 of each pair are disposed along diverging directions so that the extended ends of the pins 76 of each pair are spread to increasing divergent positions as the pins 76 are advanced or extended from the head member 54. Alternatively, the pins 76 can instead be configured along converging directions so that the extended ends are moved to increasingly closer positions as the pins 76 are advanced from the head member 54. In either case, the pins 76 can be advanced or extended by an actuator from the head member 54 and into the foam portion 34. Thus, with the head member 54 disposed proximate the foam portion 34, e.g., against the foam portion 34, the actuator 72 can advance the pins 76 in a first direction so that the pins 76 are extended from the head member 54 and into the foam portion 34 to engage the foam portion 34, typically with the foam portion 34 held against the head member 54. The nonparallel configuration of the pins 76 can increase the security of the engagement with the foam member. With the head member 54 so engaged with the foam portion 34, the foam portion 34 can be reoriented by the mechanism 40. Then, with the foam portion 34 in a desired configuration, the actuator 72 can retract the pins 76 in a second, opposite direction so that the pins 76 are retracted from the foam portion 34 and the foam portion 34 is disengaged from the head member 54. The pins 70, 76 can have sharp ends to facilitate the entry thereof into the foam portions 34. Vacuum cups, which may be connected to the end of members 52 or 50, may also be used to hold any of the portions or parts. For example, as shown in FIG. 18C, each head member 54 can include a vacuum device 78 that is configured to evacuate a cup or other cavity disposed proximate to one of the foam portions or parts to thereby engage the head member 54 thereto.

Figure 19:
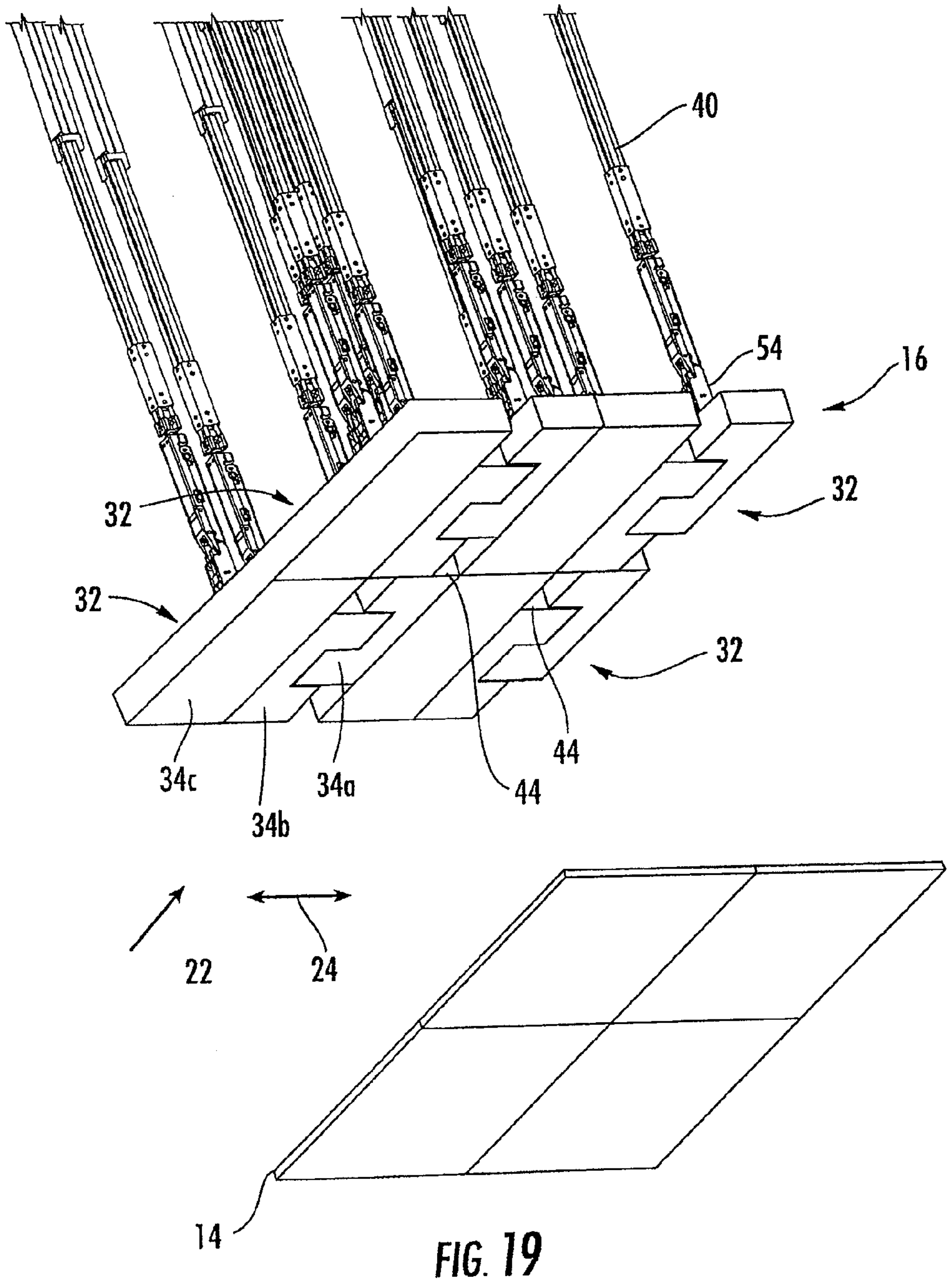

The operation of the actuator mechanisms 40 is further shown in FIG. 19-36, which partially illustrate the machine 10 of FIG. 1 during successive operations for manufacturing a plurality foam parts 100 according to another embodiment of the present invention. More particularly, FIGS. 19-36 illustrate the operation of four groups of the actuator mechanisms 40 for forming four foam parts 100. Each group of actuator mechanisms 40 includes three of the actuator mechanisms 40*a*, 40*b*, 40*c* that are used to reorient the foam portions 34 of one section 32 to form one of the foam parts 100. As shown in FIG. 19, the illustrated base sheet 16 defines four sections 32, and each section 32 of the base sheet 16 defines three foam portions 34, also referred to individually with reference numerals 34*a*, 34*b*, 34*c*. That is, the base sheet 16 is shown after having been cut into the twelve portions 34 for forming four of the foam parts 100. In particular, the base sheet 16 is cut to define two of the sections 32 across the width of the sheet 16 (i.e., in the transverse direction 24), and two of the sections 32 along the length of the sheet 16 (i.e., in the longitudinal direction 22). In other embodiments, the sheet 16 can be cut to define any number of sections 32 across the width of the sheet 16 and any number of sections 32 along the length of the sheet 16, such as one. Holes 44 can be defined by the section 32 where scrap material has been removed therefrom.

As shown in FIG. 19, the actuator mechanisms 40 are engaged to the cut sections 32 of the base sheet 16, typically with one or more of the actuator mechanisms 40 engaged to each of the foam portions 34. That is, the head member 54 of each actuator mechanism 40 is disposed proximate a respective one of the foam portions 34, and the at least one pin or other engagement tool 36 adjustably mounted to the head member 54 is advanced into the foam portion 34 to engage the foam portion 34 to the head member 54. The mechanisms 40 can be used to lift the foam portions 34 from the support member 14 so that the foam portions 34 are held in the first (planar) configuration above the support member 14. The motion of each actuator mechanism 40 can be automatically controlled, e.g., by the controller 74, which can provide electrical signals to the actuator mechanisms 40 according to a predetermined list of instructions such as a software program for automatic operation.

Figure 20:
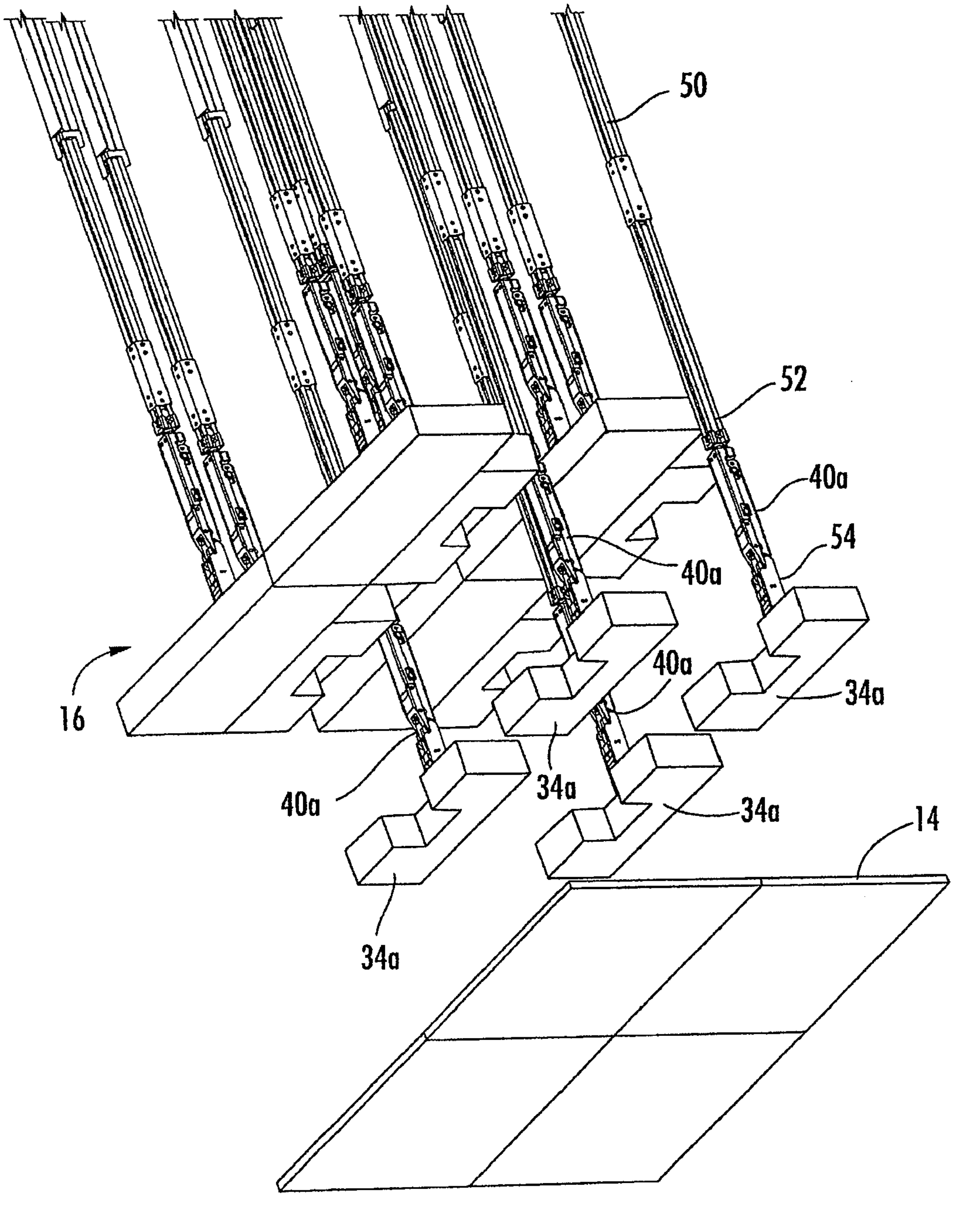
Figure 21:
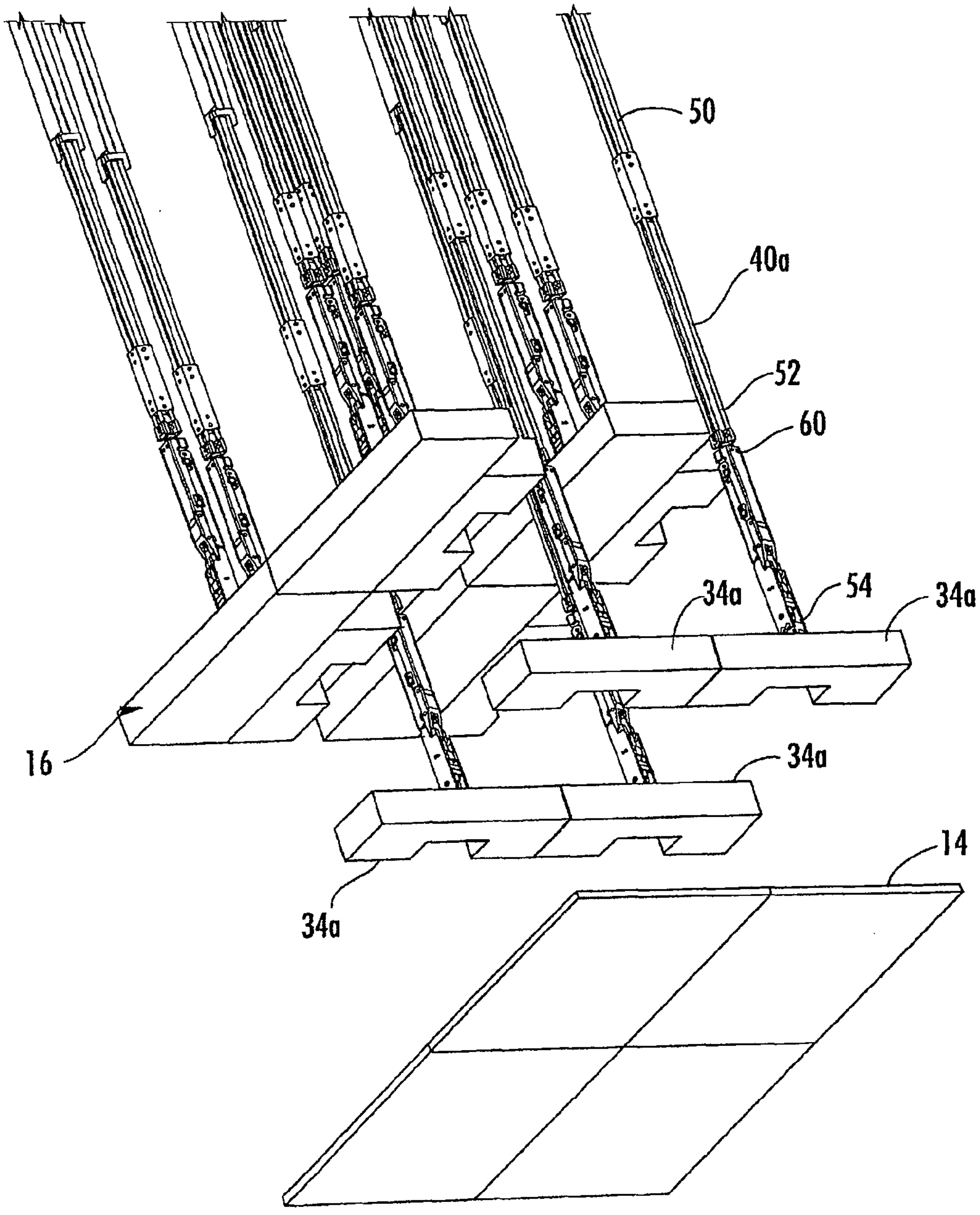
Figure 22:
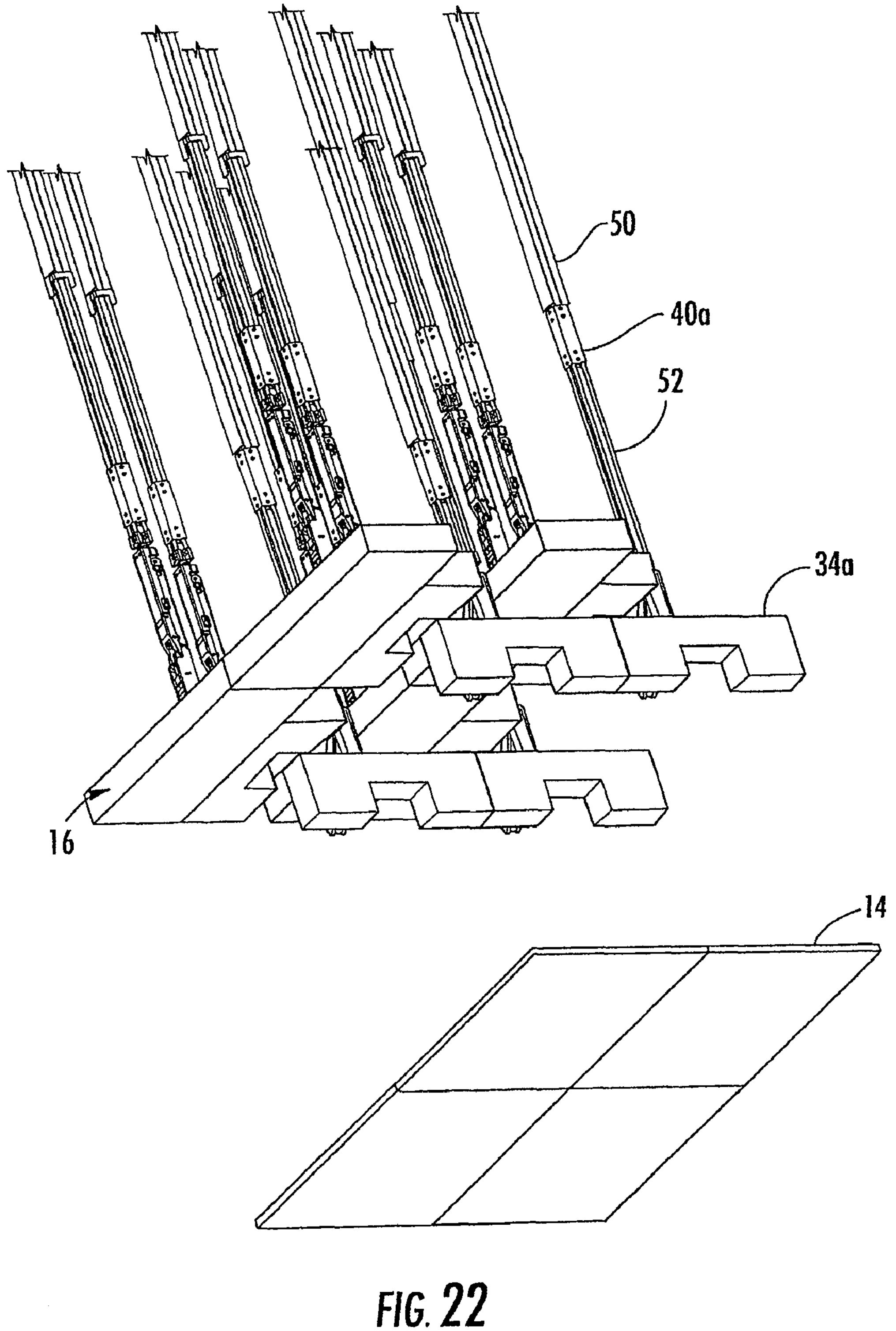

In FIG. 20, a first actuator mechanism 40*a* of each group is extended, i.e., by telescopically or otherwise adjusting the first and second members 50, 52 of the mechanism 40*a* along the longitudinal direction of the members 50, 52 so that the head member 54 thereof is extended through a plane defined by the respective section 32. In this regard, each actuator mechanism 40 can have a cross-sectional profile that is sufficiently small to allow the head member 54 to be advanced through the section 32 of the base sheet 16 and rotated to reorient the foam portion 34 while the head member 54 is extended through the sheet 16 and the mechanism 40 is disposed through the plane of the sheet 16. In this way, a first c-shaped portion 34a of each section 32 is moved from the first configuration and out of the plane of the section 32. The first c-shaped portion 34*a* of each section 32 is then rotated about a longitudinal axis defined by the respective actuator mechanism 40*a* engaged thereto, i.e., by rotating the joints 60 of the actuator mechanisms 40*a*, as shown in FIG. 21, such that the head member 54 is rotated about the longitudinal axis of the members 50, 52 and the first c-shaped portion 34*a* of each section 32 is still disposed in a plane parallel to the plane of the section 32. That is, the actuator mechanism 40*a* rotates the head member 54 relative to the first member 50 and/or the frame 12 of the machine 10, thereby adjusting the foam portion 34*a* to a desired position. In FIG. 22, each of the first c-shaped portions 34*a* is rotated about an axis that is perpendicular to the longitudinal axis of the actuator mechanisms 40*a*, i.e., by rotating the head member 54 of each mechanism 40*a* about an axis perpendicular to the longitudinal direction of the first and/or second member 52, thereby rotating the first c-shaped portion 34*a* of each section 32 to a configuration that is perpendicular to the plane of the section 32.

Figure 23:
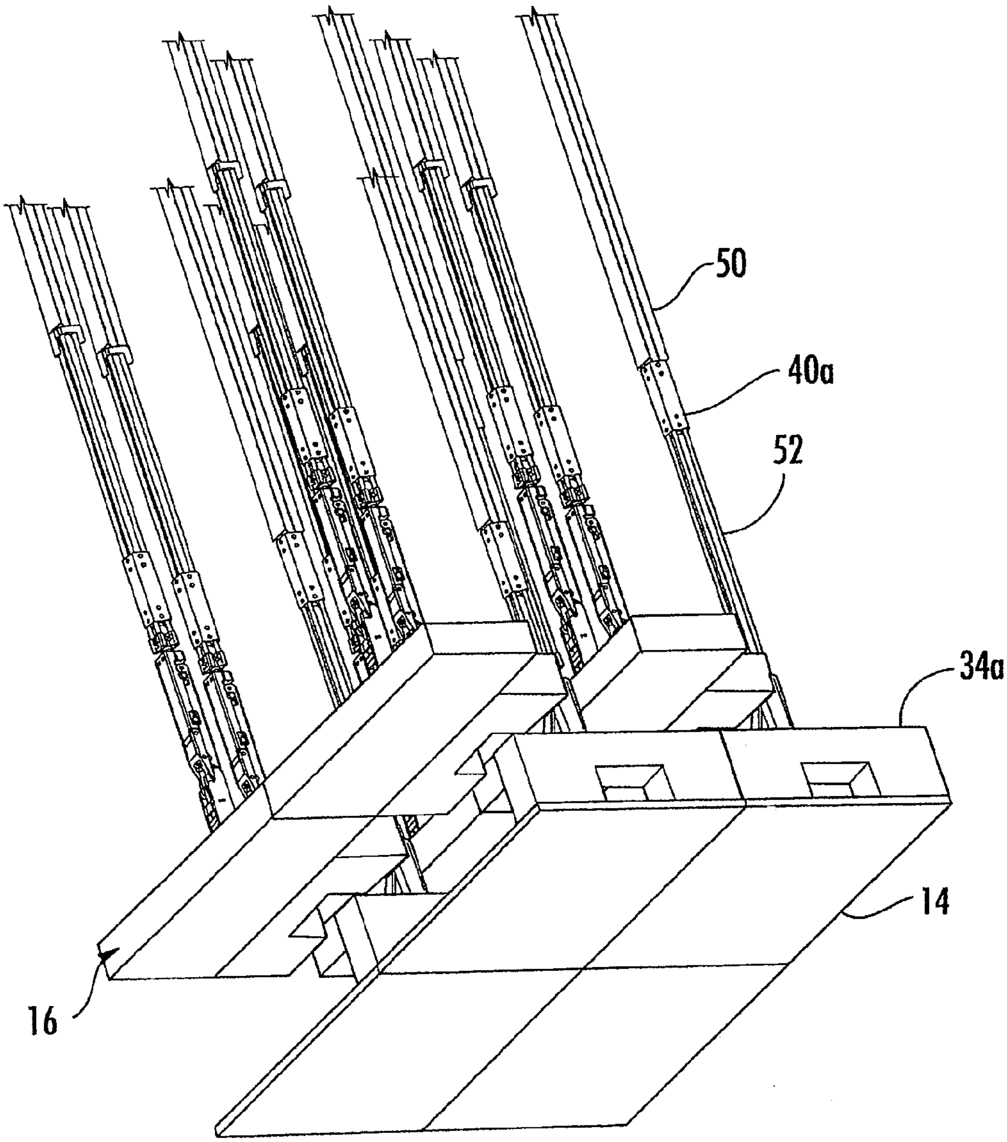
Figure 24:
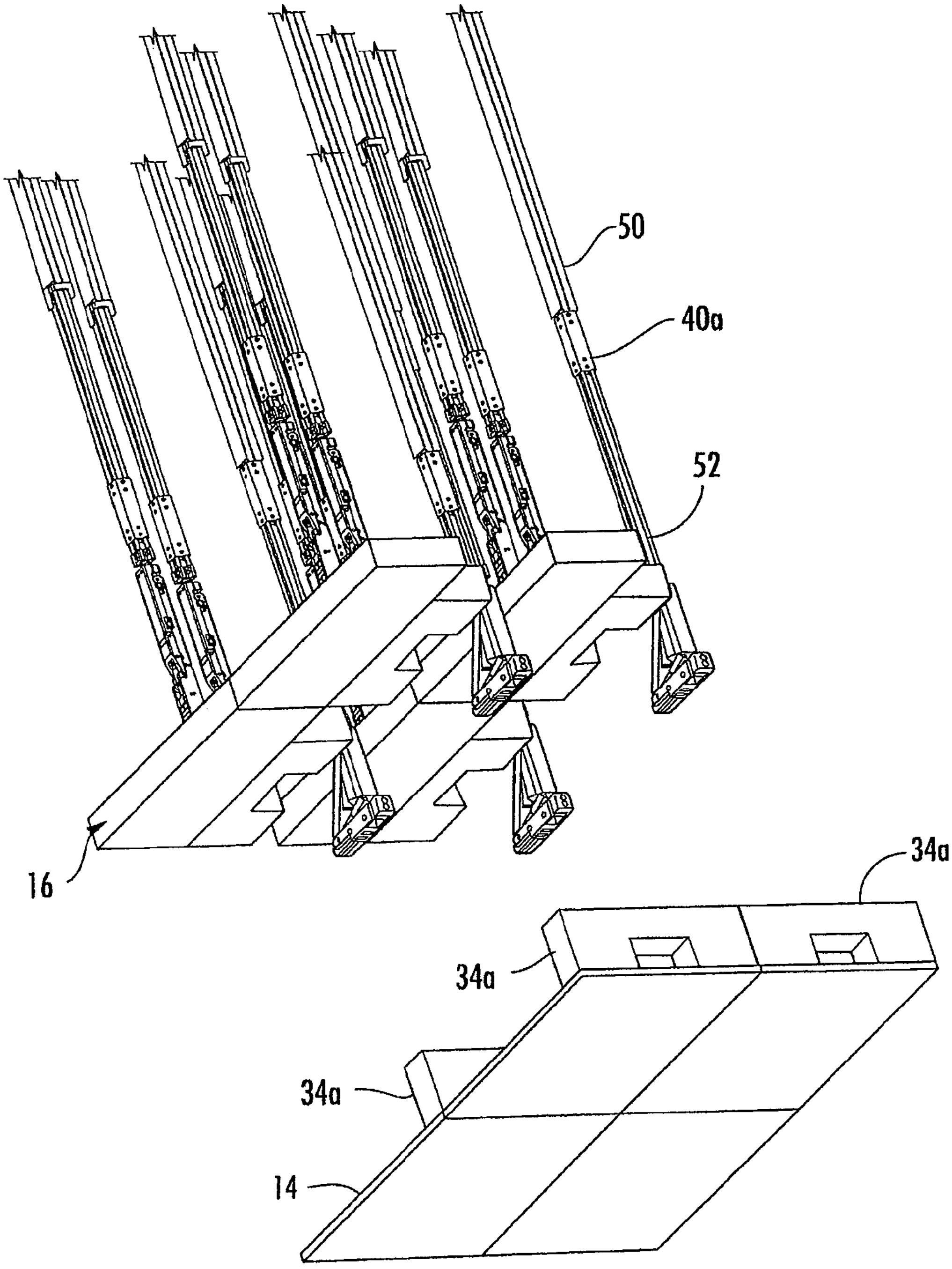
Figure 25:
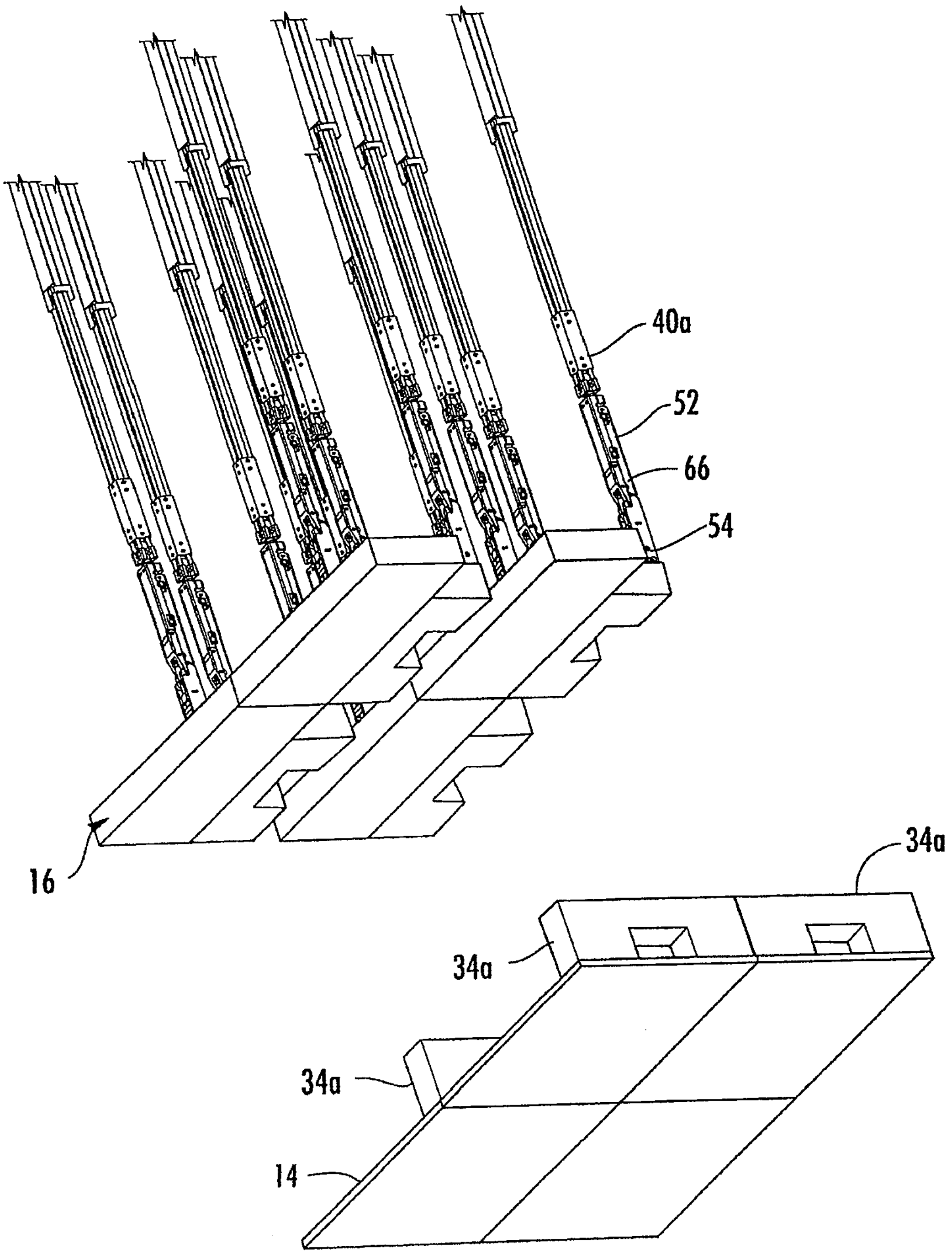

As shown in FIG. 23, the first c-shaped portion 34*a* of each section 32 is then disposed on the support member 14, e.g., by advancing the head members 54 of the respective actuator mechanisms 40*a* toward the support member 14 and/or by moving the support member 14 toward the actuator mechanisms 40*a*. With the first c-shaped portions 34*a* disposed on the support member 14, the actuator mechanisms 40*a* engaged to the portions 34*a* can be disengaged, e.g., by retracting the engagement tools 36 of the respective mechanisms 40*a* from the foam portions 34*a* to thereby disengage the foam portions 34*a*, as shown in FIG. 24, and the head members 54 of the respective actuator mechanisms 40 can be retracted from the support member 14. In FIG. 25, the actuator mechanisms 40*a* used to dispose the first c-shaped portions 34*a* are retracted so that the head members 54 are retracted through the plane of the section 32.

Figure 26:
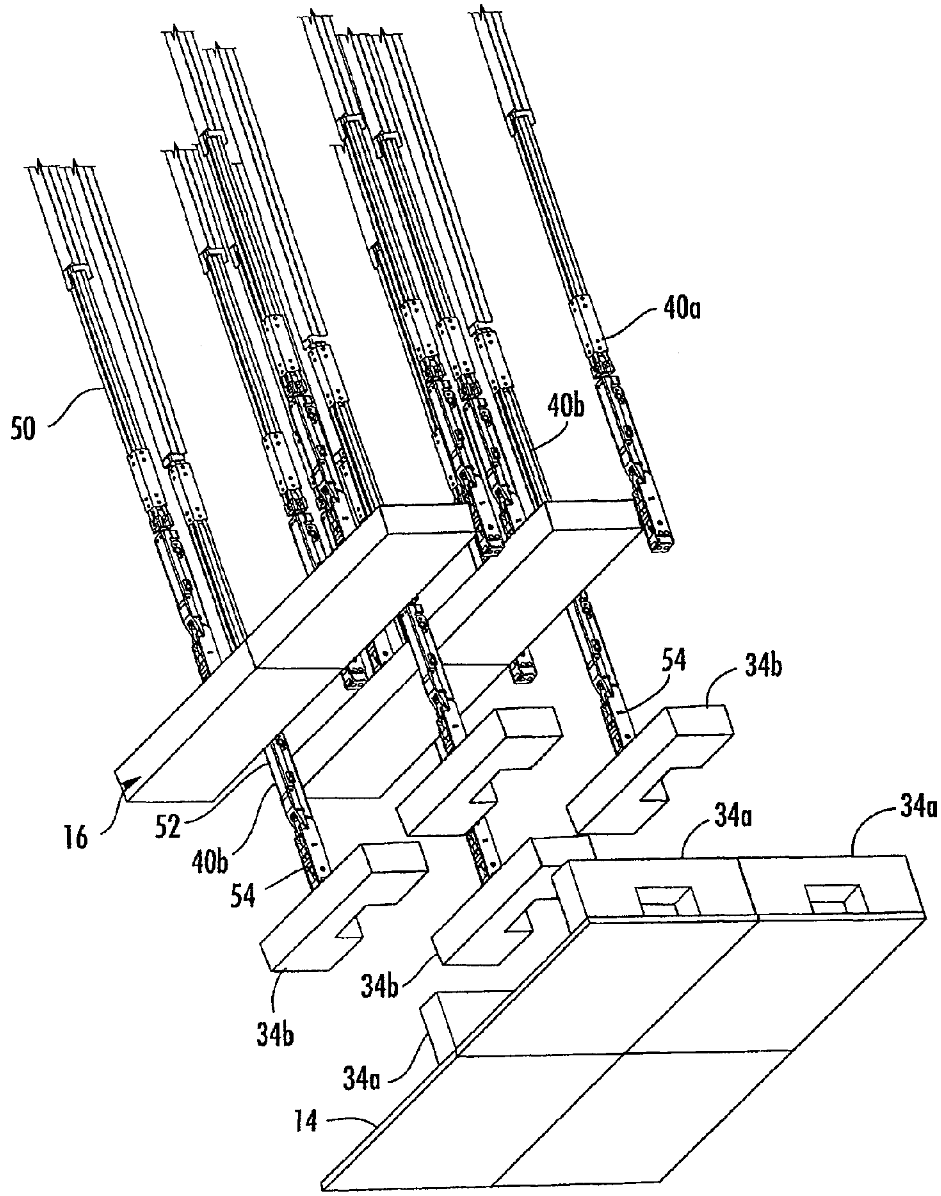
Figure 27:
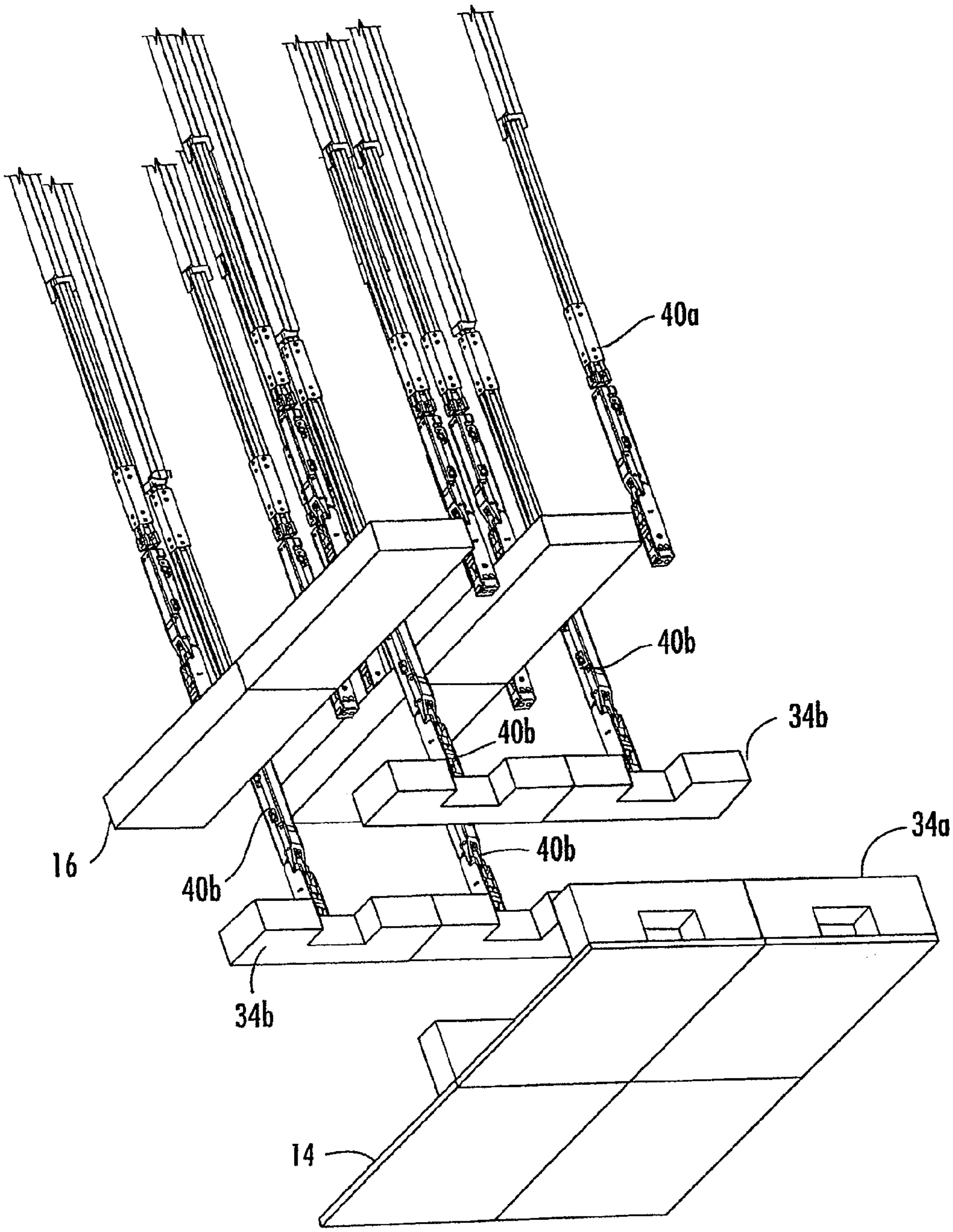
Figure 28:
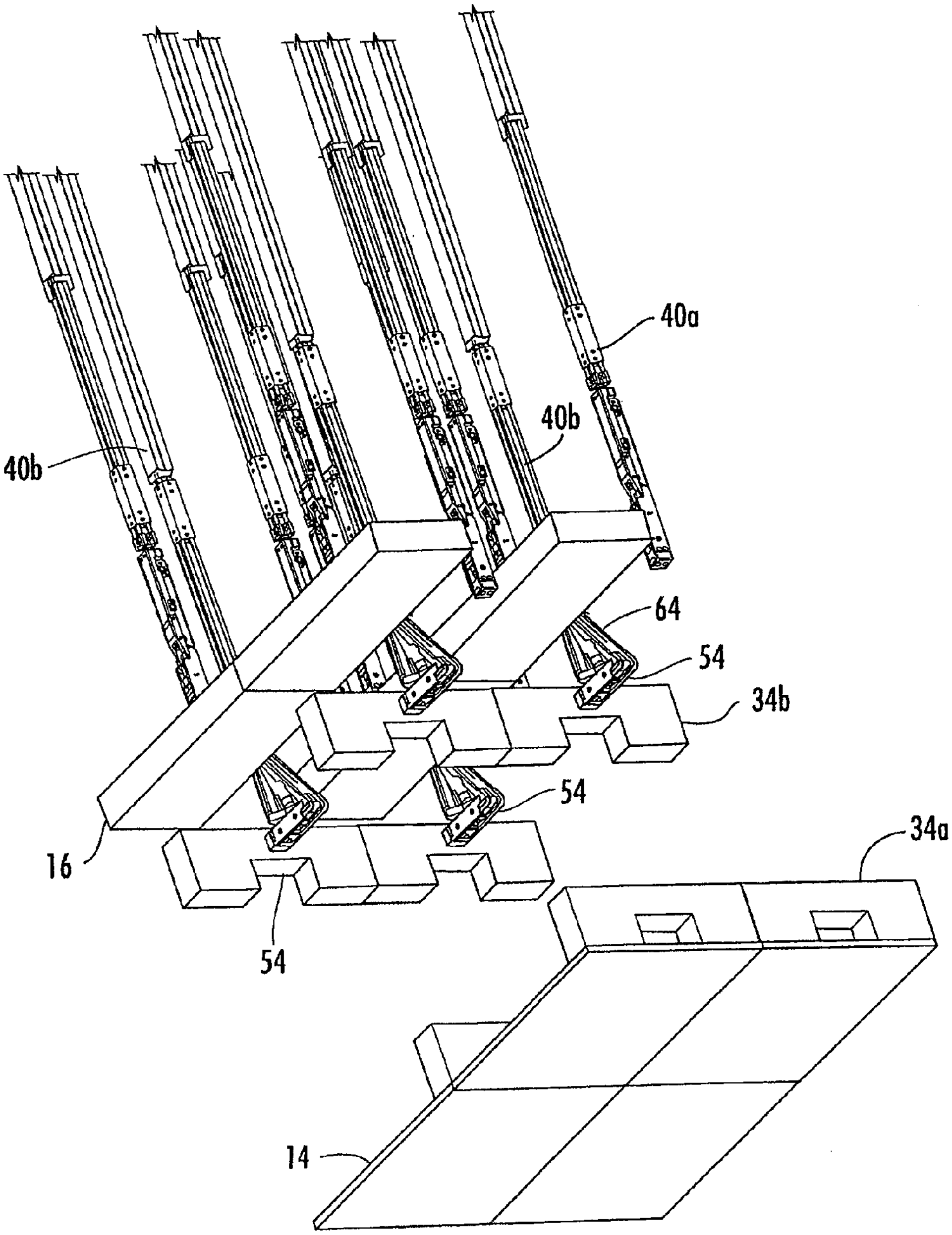

As shown in FIG. 26, four other actuator mechanisms 40*b* that are engaged to second c-shaped portions 34*b* of each section 32 are advanced by extension of the mechanisms 40*b* so that the second c-shaped portion 34*b* of each section 32 is advanced from the first configuration and out of the plane of the section 32. Each of the second c-shaped portions 34*b* is then rotated about a longitudinal axis defined by the respective actuator mechanism 40*b* engaged thereto, i.e., by rotating the joints 60 of the actuator mechanisms 40*b*, as shown in FIG. 27, such that the second c-shaped portion 34*b* of each section 32 is still disposed in a plane parallel to the plane of the section 32. In FIG. 28, each of the second c-shaped portions 34*b* is rotated about an axis that is perpendicular to the longitudinal axis of the actuator mechanisms 40*b*, i.e., by rotating the head member 54 of each mechanism 40*b*, thereby rotating the second c-shaped portions 34*b* to configurations perpendicular to the plane of the section 32 and parallel to the first c-shaped portion 34*a* of each section 32.

Figure 29:
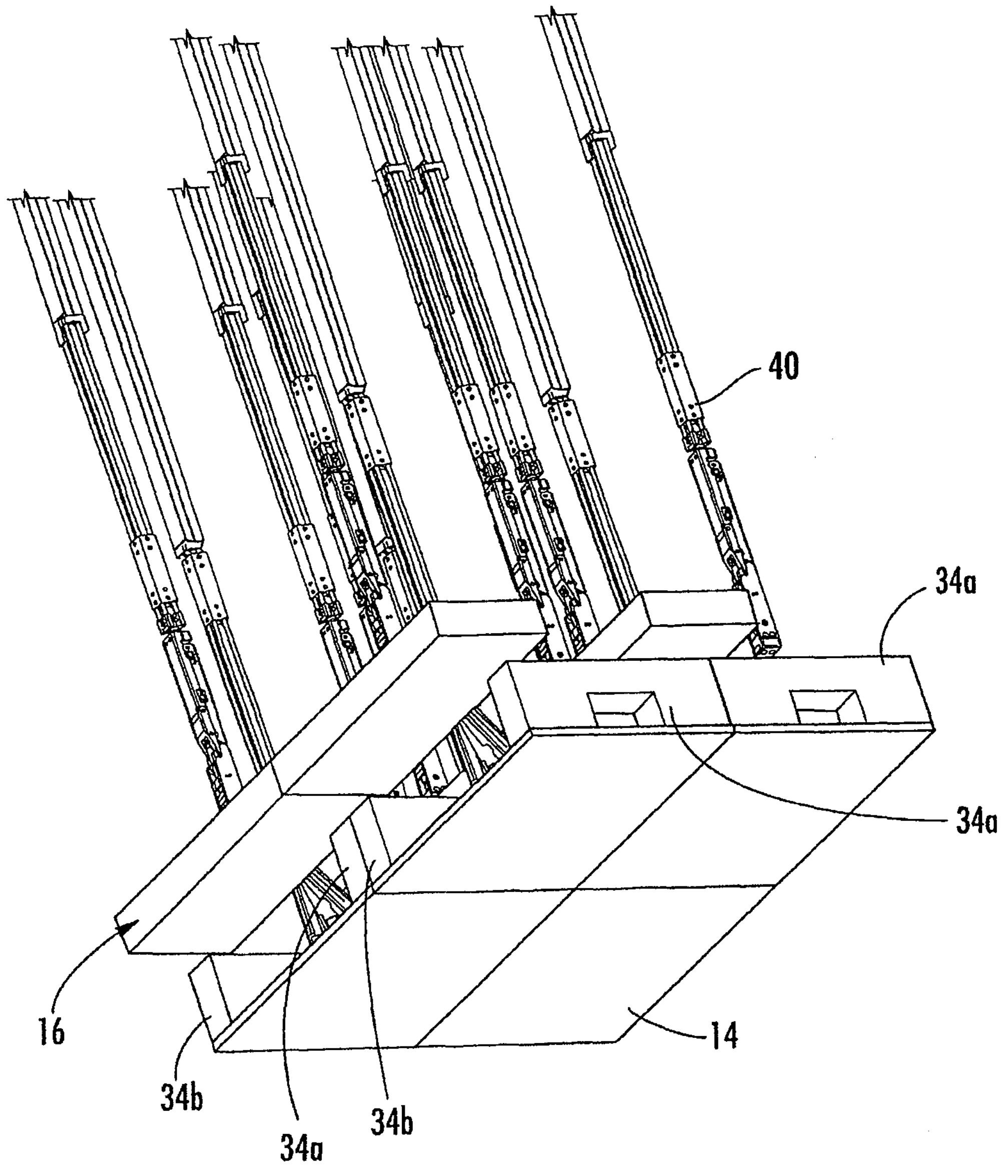
Figure 30:
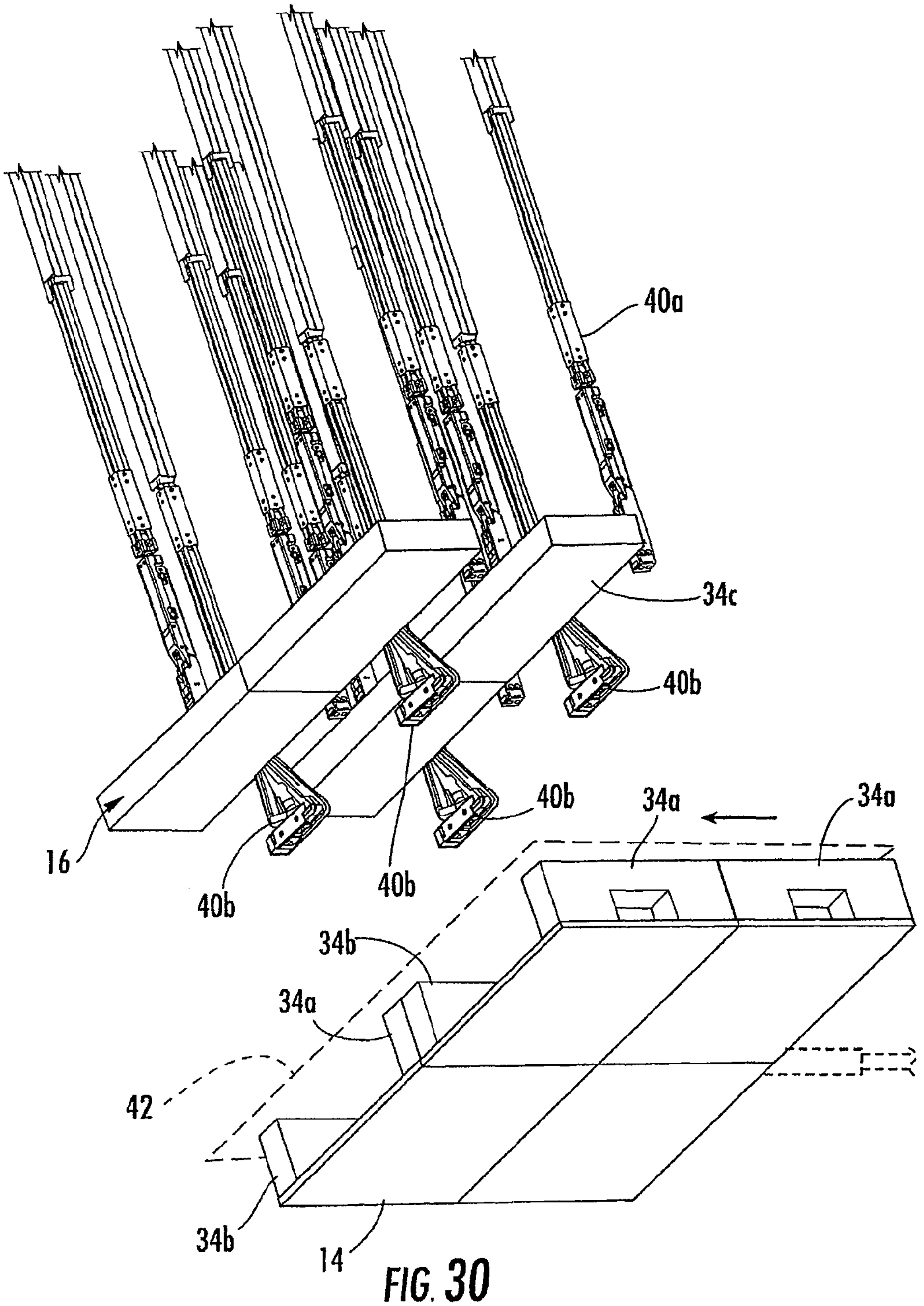
Figure 31:
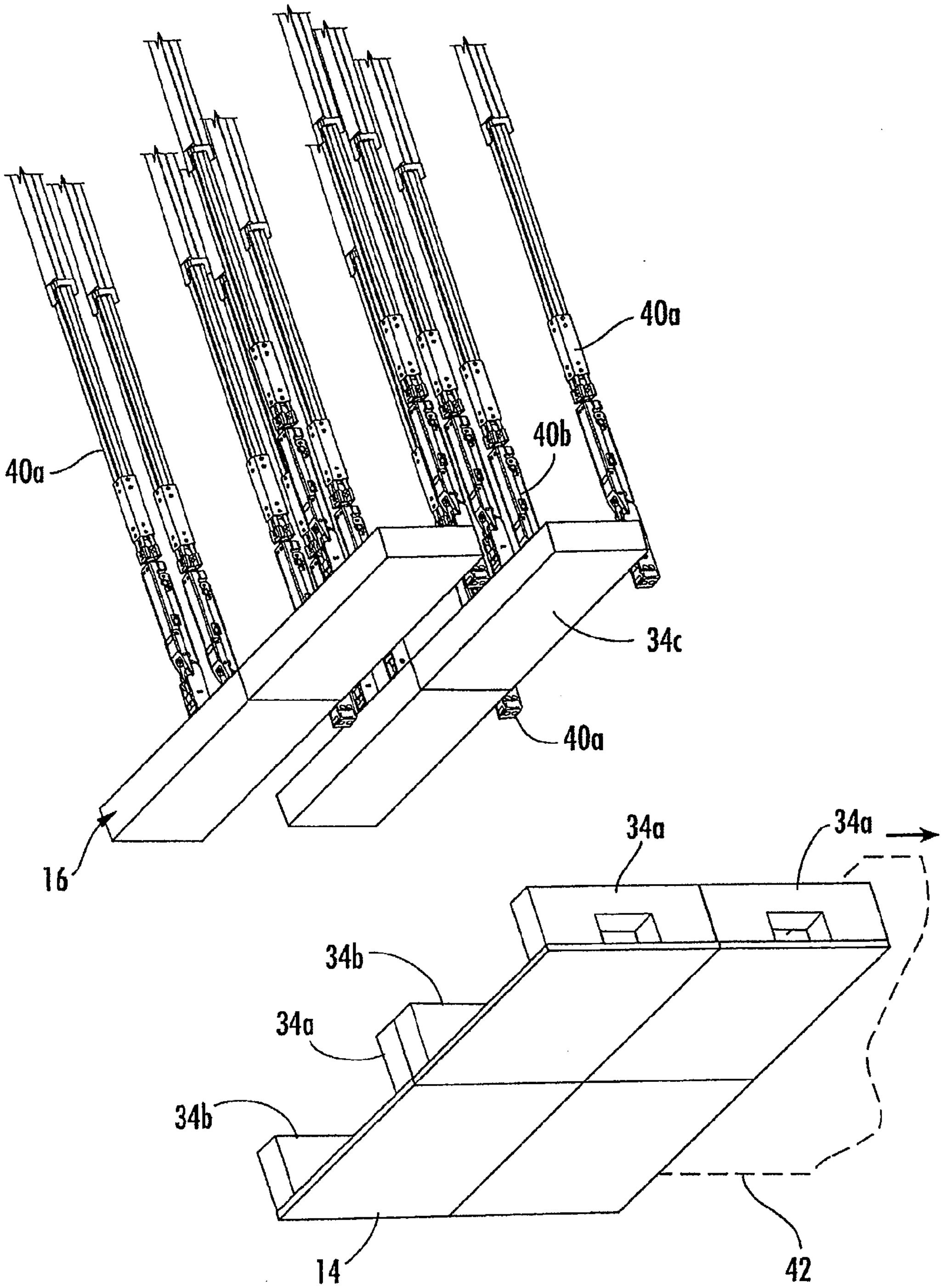

As shown in FIG. 29, the second c-shaped portion 34*b* of each section 32 is then disposed on the support member 14, e.g., by advancing the heads of the respective actuator mechanisms 40*b* toward the support member 14 and/or by moving the support member 14 toward the actuator mechanisms 40*b*, so that the second portion 34*b* of each section 32 is disposed on the support member 14 in a predetermined configuration with the first portion 34*a* of each section 32. The actuator mechanisms 40*b* engaged to the second portions 34*b* can be disengaged, e.g., by retracting the engagement tools 36 of the respective mechanisms 40, as shown in FIG. 30, and retracted from the support member 14. In FIG. 31, the actuator mechanisms 40*b* used to dispose the second c-shaped portions 34*b* are retracted so that the head members 54 are retracted through the plane of the section 32.

Figure 32:
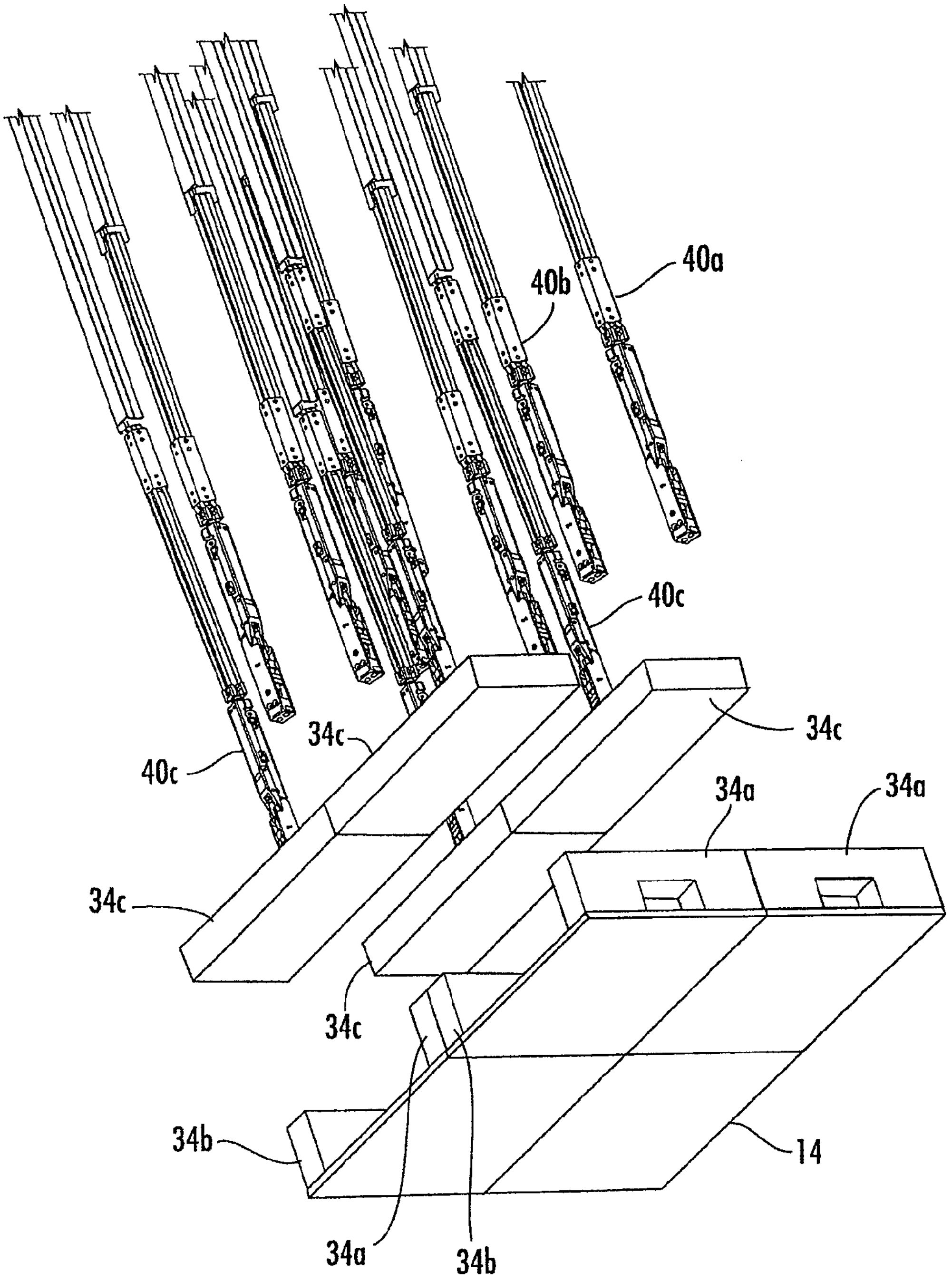
Figure 33:
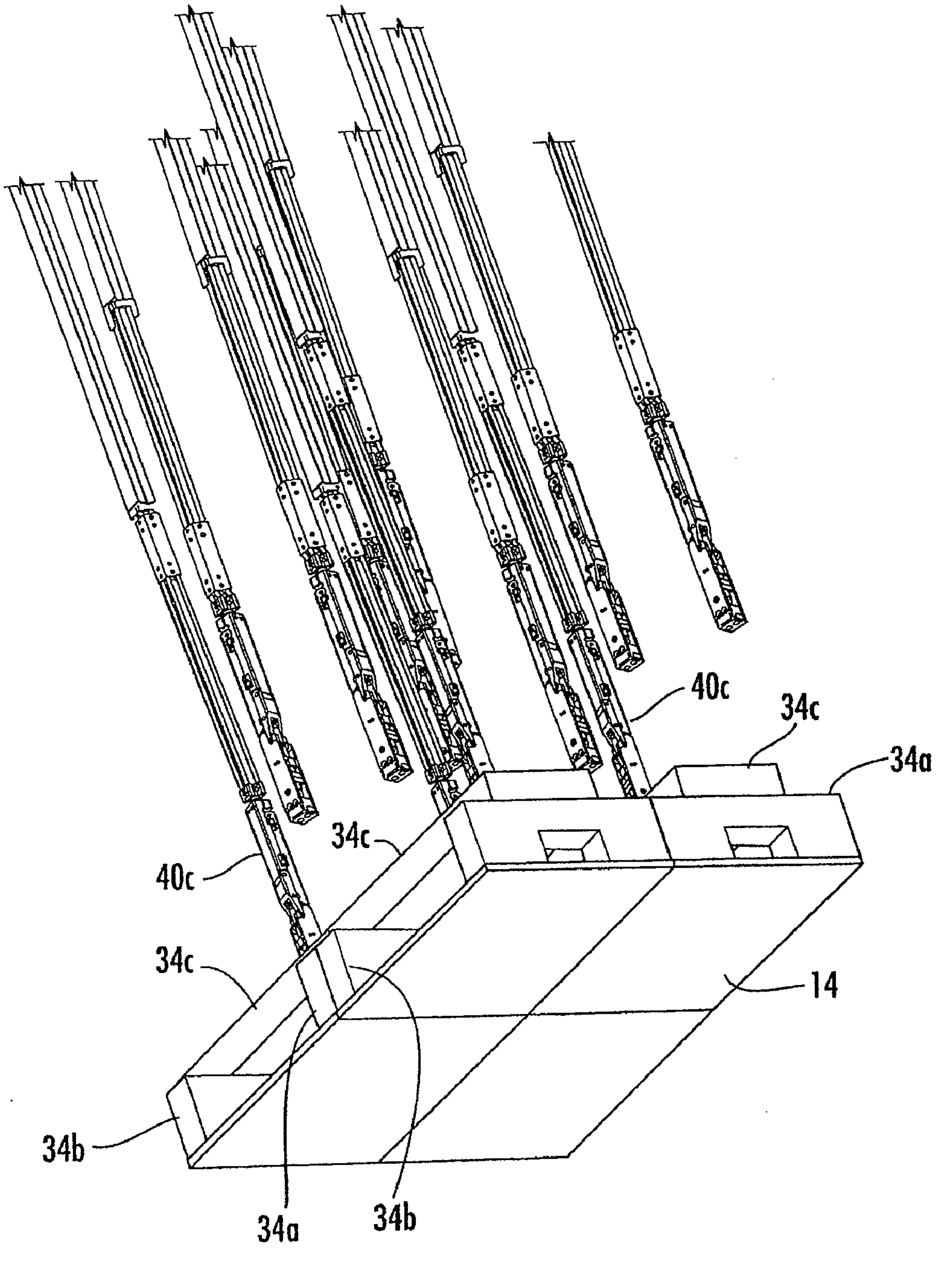
Figure 34:
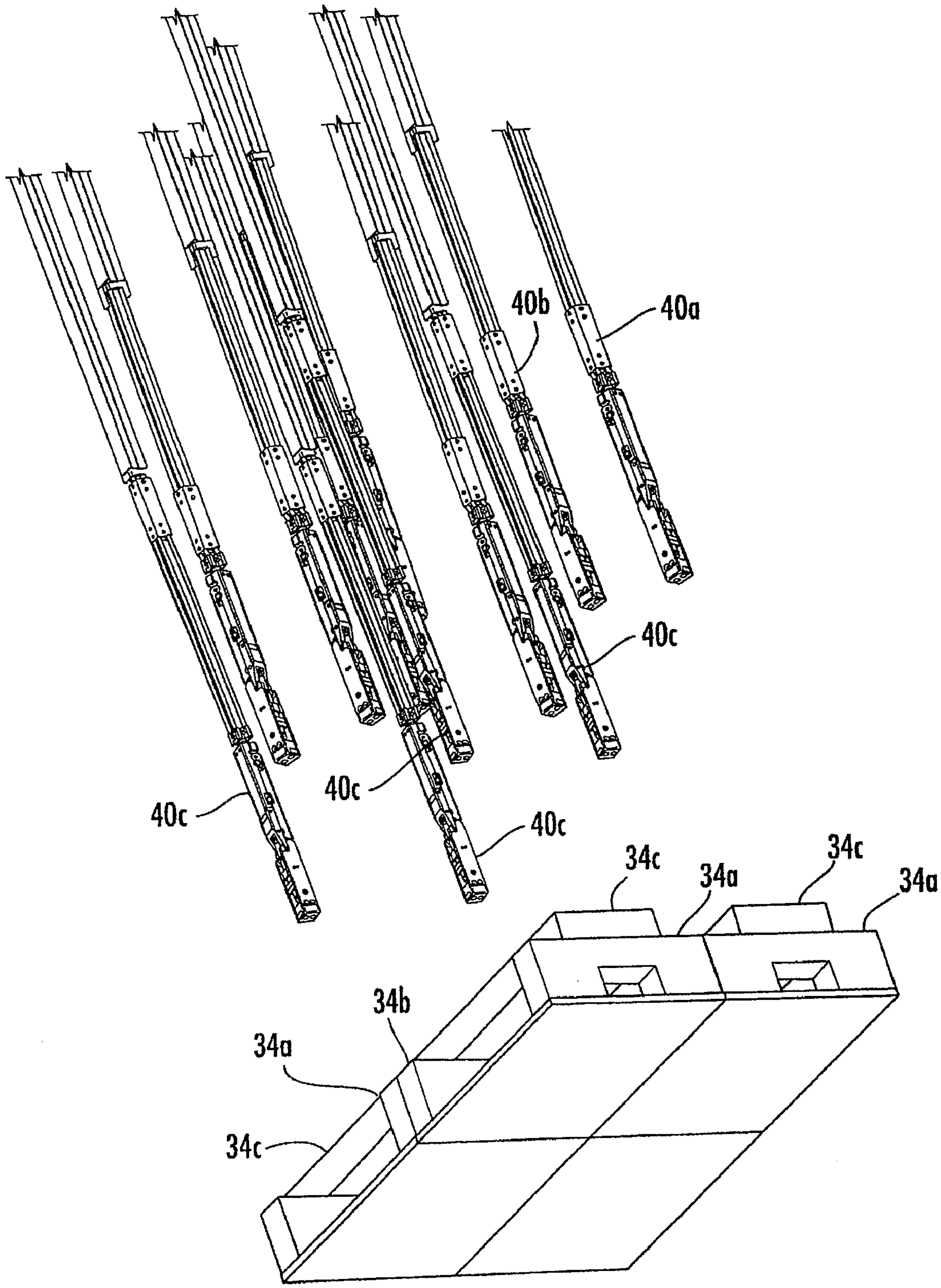
Figure 35:
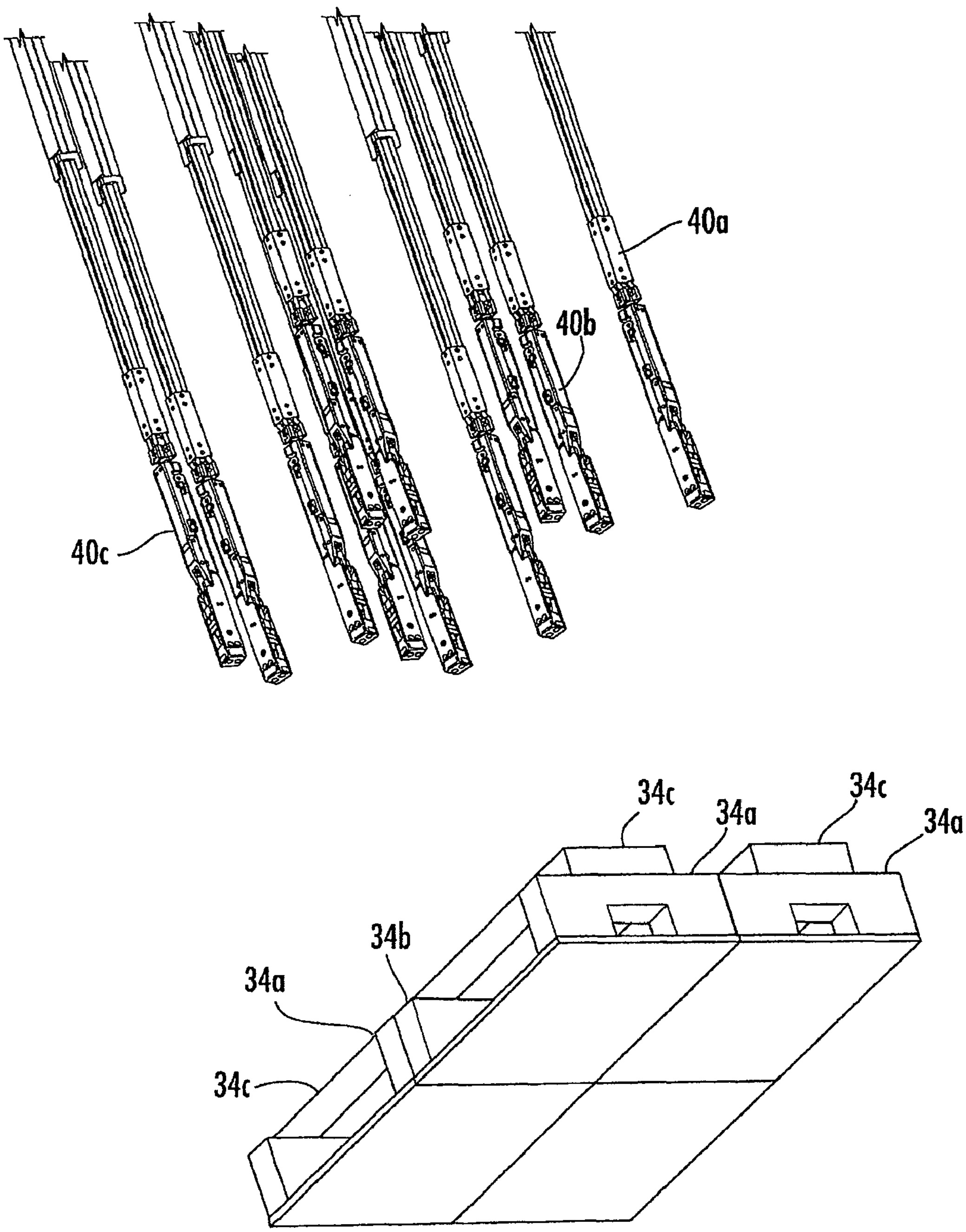

As shown in FIG. 32, the remaining third portion 34*c* of each section 32, which is rectangular, is advanced toward the support member 14, i.e., by extending the respective actuator mechanisms 40*c* and/or adjusting the support member 14 toward the rectangular portions 34*c*. The rectangular portion 34*c* of each section 32 is disposed on the c-shaped portions 34*c* of the respective section 32 in a desired configuration, as shown in FIG. 33. The desired placement of each rectangular portion 34*c* can be achieved by adjusting the actuator mechanisms 40*c* and/or the support member 14. In some cases, the actuator mechanisms 40*c* can be configured to move along the frame 12 of the machine 10 to adjust the positions of the actuator mechanisms 40*c* relative to the support member 14, or the support member 14 can be moved relative to the actuator mechanisms 40*c*. In either case, the rectangular portion 34*c* of each section 32 can be disposed on the c-shaped portions 34*c* of the respective section 32 in the second, desired configuration of the foam part 100. The actuator mechanisms 40*c* can then be disengaged from the rectangular portions 34c, and the actuator mechanisms 40 are retracted and/or the support member 14 is adjusted away from the actuator mechanisms 40*c*, so that the portions 34*c* are disposed on the support member 14, as shown in FIGS. 34-36, to thereby form four identical foam parts 100.

As illustrated in FIGS. 19-36, at least some of the actuator mechanisms 40 can be configured to adjust the positions of the respective engagement tools 36 at the same time so that the positions of at least some of the foam portions 34 are adjusted at the same time. In particular, as shown in FIGS. 20-25, the four actuator mechanisms 40*a* that are used to move the first portions 34*a* of the four sections 32 are moved simultaneously so that the four first portions 34a are moved simultaneously from the first configuration to the second, desired configuration. Further, the actuator mechanisms 40*a* are configured to adjust the respective engagement tools 36 to move the first portions 34*a* through similar motions. In particular, the actuator mechanisms 40*a* move the four first portions 34*a* through the same paths of motion at the same time, such that the first portions 34*a* are maintained substantially parallel to one another while being reoriented to the desired configuration. Similarly, as shown in FIGS. 26-31, the four actuator mechanisms 40*b* that are used to move the second portions 34*b* of the four sections 32 are moved simultaneously so that the four second portions 34*b* are moved simultaneously from the first configuration to the second, desired configuration, and the actuator mechanisms 40*b* adjust the respective engagement tools 36 to move the second portions 34*b* through the same or similar motions, e.g., so that the second portions 34*b* are maintained substantially parallel to one another while being reoriented to the desired configuration. As shown in FIGS. 32-36, the four actuator mechanisms 40*c* that are used to move the third, rectangular portions 34*c* of the four sections 32 are also moved simultaneously so that the four third portions 34*c* are moved simultaneously from the first configuration to the second, desired configuration, and the actuator mechanisms 40*c* adjust the respective engagement tools 36 to move the third portions 34*c* through the same or similar motions, e.g., so that the third portions 34*c* are maintained substantially parallel to one another while being reoriented to the desired configuration. The motions of the portions 34 of the various sections 32 can be predetermined and designed to avoid interference with one another. Further, the actuator mechanisms 40 can be structured and configured to avoid interference during simultaneous and/or similar motions thereof so that multiple foam parts 100 can be formed across the width of the foam sheet 16 and/or along the length of the sheet 16. In this way, multiple foam parts 100 can be formed simultaneously by the machine 10 and, in some cases, the machine 10 can simultaneously form a plurality of similar foam parts 100, i.e., foam parts 100 having identical or nearly identical sizes, shapes, and/or configurations. Thus, the output of the machine 10 can potentially be increased, and the time and cost for producing each foam part 100 can potentially be decreased.

The various portions 34 of each foam part 100 can be joined by adhesive, heat joining, or otherwise. The application of adhesive, heat, or the like can be made by moving the portions 34 into contact or proximity with the joining device 42 of the machine 10 and/or by moving the joining device 42 into contact or proximity with the portions 34. For example, the joining device 42 can be configured to be moved to a position between the support member 14 and the section 32 so that select surface areas of the portions 34 are treated for joining. In particular, the one or more joining devices 42 can be moved to a position proximate one or more of the portions 34 to apply heat or adhesive to at least some of the surfaces of the portions 34 to be joined, and then removed therefrom before the portions 34 are disposed in contact and joined, e.g., as the heated surfaces of the portions 34 cool in contact or an adhesive on the surfaces dries. Joining may also be accomplished by applying adhesive at the perimeter between portions 34 and shearing the portions 34 between each other to spread the adhesive and allow for bonding. As shown in FIG. 30, the joining device 42 can be disposed between the tops of the c-shaped portions 34*a*, 34*b* and the rectangular portions 34*c* to apply heat or adhesive to some or all of the portions 34. The joining device 42 can then be removed from the space between the c-shaped portions 34*a*, 34*b* and the rectangular portions 34c, as shown in FIG. 31, such that the rectangular portions 34*c* are joined to the tops of the c-shaped portions 34*a*, 34*b* when placed thereon and the portions 34 cool and/or an adhesive dries. The joining device(s) 42 can be selectively moved to positions proximate the various portions 34 by one or more actuators.

FIG. 37 illustrates the four foam parts 100 after forming according to the manufacturing operations illustrated in FIGS. 19-36, Each illustrated foam part 100 can be used as a foam insert or cushion and, in particular, and end cap that is configured to support a packaged device in a box or other container. That is, a first side 102 of the foam part 100 can be configured to correspond to the contour of the device, and the second side 104 of the foam part 100 can be disposed against an inside surface of the container so that the device is supported away from the surface of the container by the foam part 100. Two or more of the foam parts 100 can be provided for each device. For example, the foam parts 100 can be positioned on opposite ends of the device so that the device is supported between the foam parts 100.

In the method illustrated in FIGS. 19-36, each foam part 100 is formed by reorienting at least one foam portion 34 relative to another foam portion 34 from a first configuration (typically the planar configuration in which the portions 34 are cut) to a second, desired configuration in which the foam portions 34 are joined (e.g., as shown in FIG. 37). Further, at least one of the foam portions 34 is rotated relative to the other foam portion(s) 34 and, more particular, rotated to a nonparallel configuration. For example, the first and second c-shaped foam portions 34*a*, 34*b* shown in FIGS. 19-36 are rotated about an axis that is perpendicular to the longitudinal axes of the actuator mechanisms 40 so that each c-shaped foam portion 34*a*, 34*b* in its second configuration is nonparallel to the original plane of the sections 32, the base sheet 16, and the rectangular portions 34*c* that remain planar to the first configuration of the sections 32.

In other embodiments, foam parts can be formed with some or all of the foam portions 34 remaining parallel to the original plane of the section 32 and base sheet 16. In this regard, FIGS. 38-45 illustrate the successive operations for manufacturing a foam part 150 according to another embodiment of the present invention. For purposes of illustrative clarity, the machine 10 is not shown in FIGS. 38-45 and only a single section for forming a single foam part 150 is shown; however, it is appreciated that any number of foam parts 150 can be formed adjacently and simultaneously, e.g., using the machine 10 of FIG. 1 and/or actuator mechanisms 40 similar to those shown in the other figures.

Figure 38:
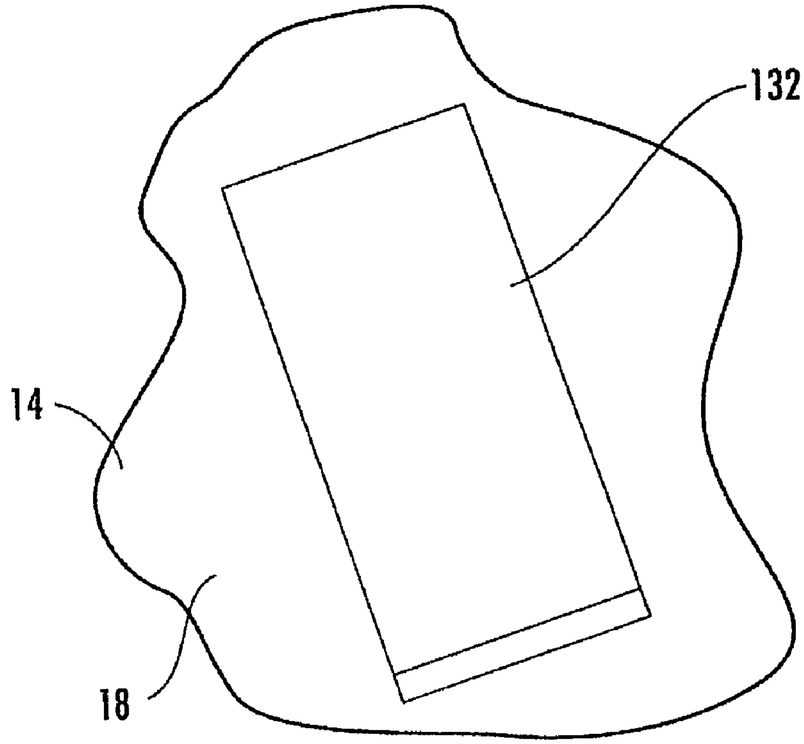
Figure 39:
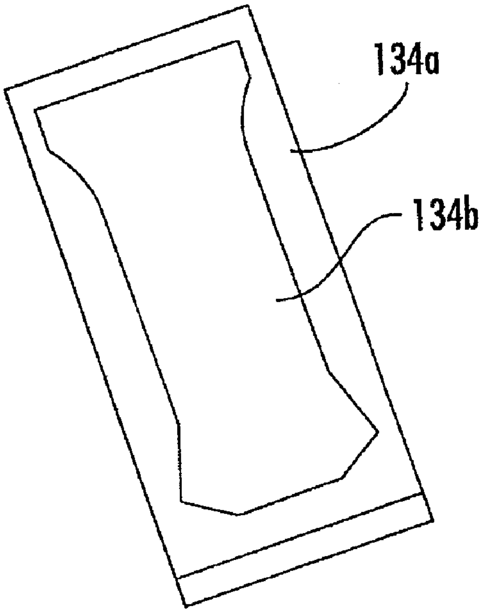

FIG. 38 illustrates a foam section 132 before being cut by the cutting device 30. The foam section 132 is typically part of a larger base sheet 16, as described above, with the base sheet 16 defining a plurality of the sections 132 so that multiple parts 150 can be formed at one time. In other words, the foam section 132 of FIG. 38 can be cut from a larger sheet 16 that defines multiple sections 132 across the width and/or length of the sheet 16. The foam section 132 is cut using the cutting device 30 to define multiple portions 134 including a first portion 134*a* and a second portion 134*b* in a first, planar configuration as shown in FIG. 39. In this case, the second portion 134*b* is defined in an aperture of the first portion 134*a*, and the first portion 134*a* defines the entire outer perimeter of the second portion 134*b*. That is, the second portion 134*b* is cut in a closed, polygonal shape from the first portion 134*a* so that the first portion 134*a* extends entirely around the second portion 134*b*. In other cases, the second portion 134*b* can extend to one or more of the edges of the section 132 so that the first portion 134*a* defines only a portion of the outer perimeter of the second portion 134*b*.

Figure 40:
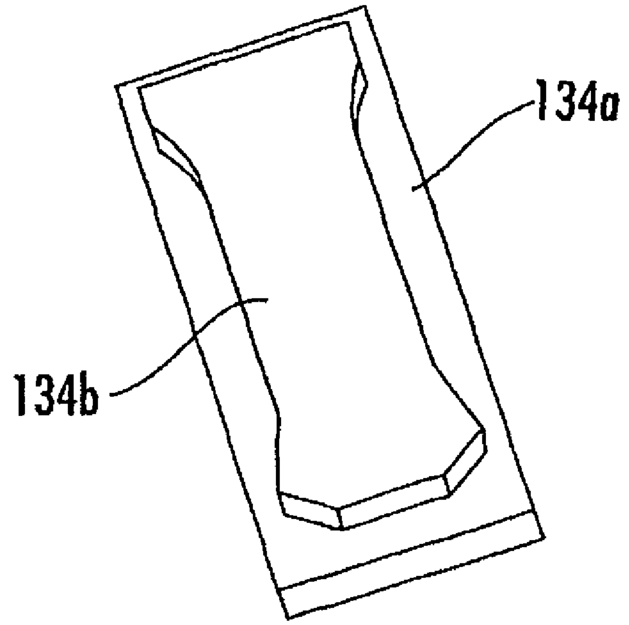

FIG. 40 illustrates the foam section 132 after the second portion 134*b* is reoriented relative to the first portion 134*a* to a second configuration and joined to the first portion 134*a*. In particular, the second portion 134*b* is offset from a plane defined by the first portion 134*a* and remains parallel to the plane of the first portion 134a. That is, the second portion 134*b* is lifted away from the support member 14 on which the first portion 134*a* rests. The reorientation of the second portion 134*b* can be performed by engaging one or more of the actuator mechanisms 40 to the second portion and actuating the actuator mechanisms 40 to adjust the second portion 134*b* to the desired configuration. One or more of the actuator mechanisms 40 can also be engaged to the first portion 134*a* to retain the first portion 134*a*, or the first portion 134*a* can be otherwise retained, e.g., by clamping or otherwise engaging the first portion to the support member 14 on which the first portion 134*a* can rest. Alternatively, the portions 134 of the foam section 132 can be reoriented in other ways, e.g., as discussed below in connection with FIGS. 44-49. The first and second foam portions 134*a*, 134*b* can be joined by the joining device 42, e.g., by heating the two portions 134*a*, 134*b* at their interface or disposing an adhesive at the interface of the 134*a*, 134*b*.

Figure 41:
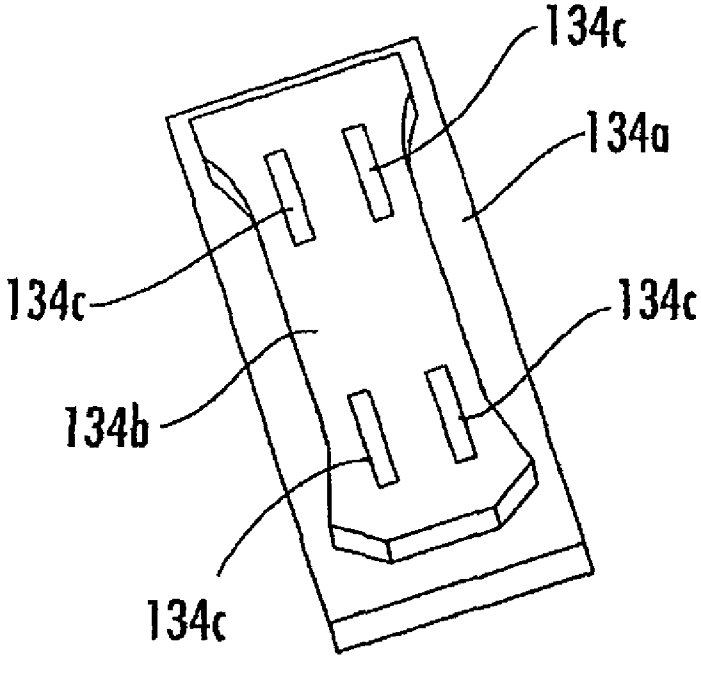

As illustrated in FIG. 41, the foam section 132 is further cut to define a plurality of third portions 134*c*. In particular, four apertures are cut in the second portion 134*b* so that each aperture defines one of the third portions 134*c* therein. The third portions 134*c* are cut by the cutting device 30. Although the third portions 134*c* are illustrated as being cut after the second portion 134*b* is reoriented relative to the first portion 134*a*, it is appreciated that the third portions 134*c* can alternatively be cut before the reorientation of the second portion 134*b*. For example, the third portions 134*c* can be cut during the same cutting operation as the second portion 134*b*, i.e., in FIG. 39. Further, it is appreciated that any number of the second portions 134*b* can be cut from the first portion 134*a* any number of the third portions 134*c* can be cut from the first portion 134*a* and/or the second portion 134*b*, and additional portions can be cut from any of the portions.

Figure 42:
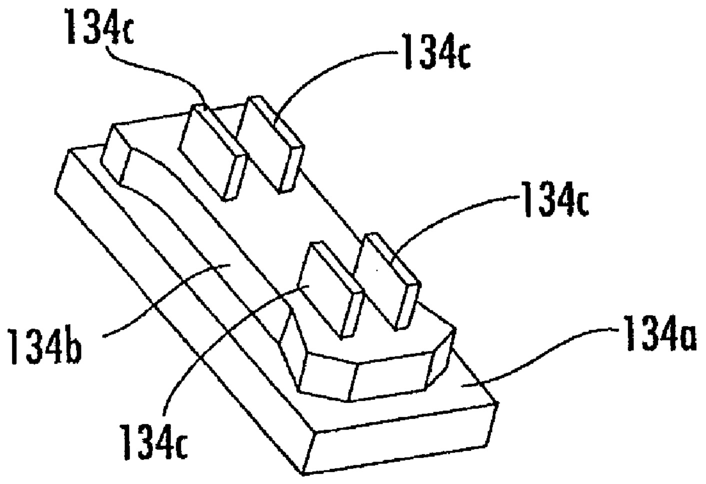

FIG. 42 illustrates the foam section 132 after the third portions 134*c* are reoriented to a desired configuration relative to the first and second portions 134*a*, 134*b* and joined to the second portion 134*b* in the desired configuration. In particular, each third portion 134*c* is offset from a plane defined by the second portion 134*b* and remains parallel to the plane of the first and second portions 134*a*, 134*b*. That is, the third portions 134*c* are lifted from the second portion 134*b* in a direction away from the support member 14 on which the first portion 134*a* rests. The reorientation of the third portions 134*c* can be performed by engaging one or more of the actuator mechanisms 40 to each third portion 134*c* and actuating the actuator mechanisms 40 to adjust the third portions 134*c* to the desired configuration, and the third portions 134*c* can be joined to the second portion 134*c* by heat or adhesive applied by the joining device 42. The third portions 134*c* can be reoriented in any desired manner, e.g., by offsetting some or all of the third portions 134*c* in a direction toward the support member 14, moving and/or rotating the third portions 134*c* in other directions, or the like.

Figure 43:
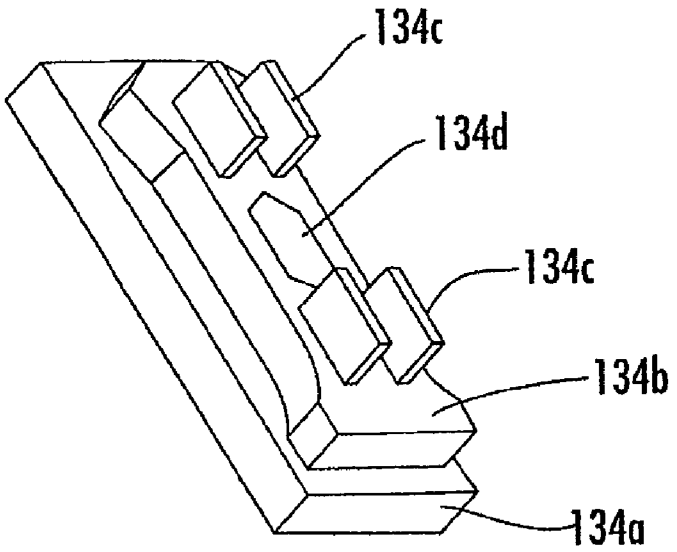
Figure 44:
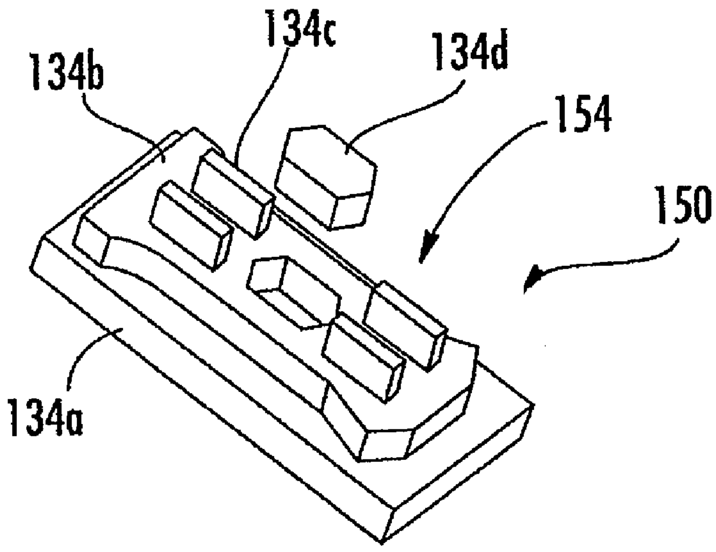
Figure 45:
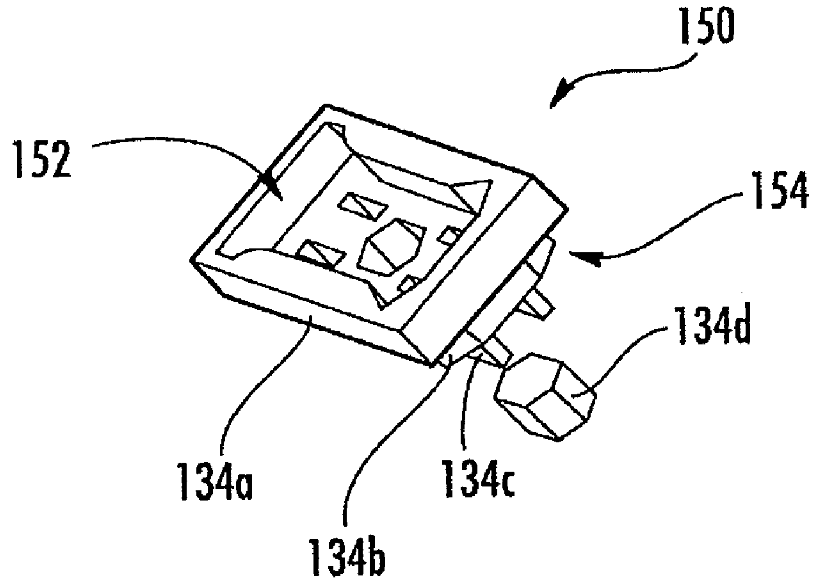

As illustrated in FIG. 43, the foam section 132 is further cut to define a fourth portion 134*d*. In particular, an additional aperture is cut by the cutting device 30 in the second portion 134*b* to define the fourth portion 134*d* therein. Any number of fourth portions 134*d* can be cut in any of the other portions 134*a*, 134*b*, 134*c*, and the fourth portion(s) 134*d* can be cut before or after the reorientation of any of the other portions. For example, the fourth portion(s) 134*d* can be cut during the same cutting operation as the second and/or third portions 134*b*, 134*c*. As shown in FIGS. 44 and 45, the fourth portion 134*d* is removed from the second portion 134*b* and discarded as scrap, and the finished foam part 150 is defined by the remaining first, second, and third portions 134*a*, 134*b*, 134*c* of the section 132. In other embodiments, the fourth portion 134*d* can be reoriented and joined to any of the other portions in a desired configuration to form the finished foam part 150. Further, it is appreciated that other portions can be cut and then reoriented and joined or removed from the part 150.

The amount of offset of each portion 134 can be determined according to the desired dimensions of the finished foam part 150. In some cases, the various portions 134 can be joined with one or more of the portions 134 disposed at least partially in the corresponding apertures of another portion 134. For example, as shown in the finished foam part 150 of FIGS. 44 and 45, the second portion 134*b* is parallel to the plane of the first portion 134*a* and offset from the plane of the first portion 134*a* by a smaller distance than the offset of the third portions 134*c* from the plane of the second portion 134*b*. The distance of offset of the second portion 134*b* is less than the thickness of the base sheet 16 so that the second portion 134*b* remains at least partially disposed within the plane of the first portion 134*a* (and within the aperture defined by the first portion 134*a*) when joined thereto. Alternatively, the second portion 134*b* could be offset by a lesser or greater distance to effect a different overall dimension of the finished foam part 150. Similarly, the third portions 134*c* can be offset from the second portion 134*b* by any predetermined distance. In some cases, some of the portions 134 can be extended entirely from the plane of another portion and entirely out of apertures from which the portions are extended. Further, while the second and third portions 134*b*, 134*c* are reoriented in the illustrated embodiment by adjusting the second and third portions 134*b*, 134*c* only in the direction perpendicular to the plane defined by the first portion 134*a*, the portions 134*b*, 134*c* can also be adjusted in other directions in other embodiments, e.g., to adjust the position of the portions in the finished part 150. In some cases, scrap material can be removed from one of the portions 134 so that the apertures defined by the portions 134 are larger than the offset portions disposed in the apertures, thereby providing room in the apertures for adjusting the position of the portions 134 therein.

The finished foam part 150 can be configured for a variety of applications. For example, in one embodiment, a first side 152 of the foam part 150 can define a cavity that is adapted to at least partially receive a device to be packaged. Thus, the number, size, shape, and/or position of the various portions 134 that are cut from the first section 132 and reoriented or removed can correspond to the predetermined shape of the device so that the foam part 150 corresponds to the contour of the packaged device. In some cases, the foam part 150 can be used to support multiple packaged devices, e.g., by at least partially receiving at least one of the devices in each of the cavities defined by the spaces defined by the reorientation of the third portions 134*c* from the second portion 134*b*.

Further, the number, size, shape, and/or position of some of the portions 134 can be provided according to a predetermined physical performance criteria, e.g., for protecting the packaged device. For example, the foam part 150 can provide a shock absorption characteristic for the packaged device, and the shock absorption characteristic can be determined at least in part 150 according to the number, size, shape, and/or position of the various foam portions of the part 150. In particular, if the packaged device is to be provided in a container with the device partially received in the cavity and with the second portion 134*b* disposed against the device and the third portions 134*c* disposed against the inner surface of the container, the shock absorption characteristic of the foam part 150 can be determined in part by the total of the third portions 134*c* since the third portions 134*c* will be most likely to absorb any shocks transmitted to the package and through the foam part 150. Thus, the total area of the third portions 134*c*, as defined by the area of the apertures cut in the second portion 134*b* in FIG. 41, and directed away from the packaged device can be determined according to the desired shock absorption characteristic. That is, the area can generally be increased to increase the stiffniess of the third portions 134*c* or decreased to decrease the stiffness of the third portions 134*c*.

It is appreciated that the offsetting of one or more portions 134 in the formation of the foam parts 150 can result in parts 150 that define a plurality of successive, parallel layers. The offsetting of the various portions 134 allows the different layers to be formed from a single base sheet 16, thereby providing a potential reduction in material relative to other methods in which multiple base sheets are cut and then stacked to form multi-layer structures. Further, the various portions 134 of the part 150 can be offset to define a telescopic shape, i.e., a shape in which one or more portions 134 is cut from the section 132 and offset in a direction perpendicular to the plane of the section 132. Such telescopic reorientation of the different portions 134 can result in a part 150 that is nestable with other identical parts 150. In other words, the first side 152 of the finished foam part 150 defines a female contour that corresponds to the male contour of the opposite side 154 of the part 150 so that multiple identical parts 150 can be stacked with the male contour of each part 150 received by the female contour of the adjacent part 150. Such nestability of the parts 150 can reduce the space required for storing, shipping, and otherwise handling the parts 150.

In some cases, the reorientation of one or more portion 134 of each section 132 can be performed using a mandrel, which can be used in combination with, or in alternative to, the actuator mechanisms 40. In this regard, FIGS. 46-49 illustrate the use of a mandrel 160 for reorienting the various portions of several sections 132 in the manufacture of foam parts such as the part 150 illustrated in FIGS. 44 and 45. The mandrel 160 is shown separately in FIG. 46. The illustrated mandrel 160 defines five mandrel sections 162, each section 162 corresponding to one of the sections 132 of the base sheet 16. Thus, the mandrel 160 can be used to simultaneously reorient the portions of five foam sections 132. In other embodiments, mandrels can be provided with any number of sections for reorienting any number and configuration of foam portions. For example, the mandrel 160 can define multiple mandrel sections 162 across the width of the base sheet 16 and/or along the length of the base sheet 16 so that one or more rows and/or columns of parts 150 can be reoriented simultaneously with the mandrel 160. The mandrel 160 may be located below or above the support member or table 14 in FIG. 1, and the action of moving the support member 14 with respect to the mandrel 160 can be used to form the parts.

Figure 46:
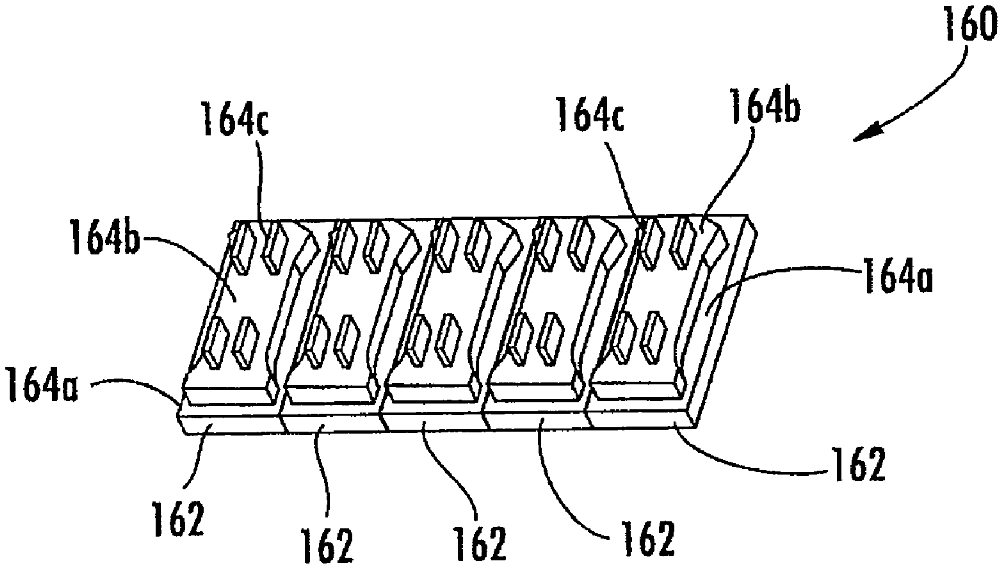

As illustrated in FIG. 46, each mandrel section 162 section defines first, second, and third portions that correspond to the first, second, and third portions **134*a*, 134*b*, 134*c* of the foam section 132. In particular, each section 162 of the mandrel 160 defines at least one first surface 164*a* that corresponds to the shape of the first foam portion 134*a*, at least one second surface 164*b* that corresponds to the shape of the second foam portion 134*b*, and at least one third surface 164*c* that corresponds to the shape of the third foam portion 134*c*. The first, second, and third surfaces 164*a*, 164*b*, 164*c* are offset from one another so that, when the foam sections 132 are disposed against the respective mandrel sections 162, the foam portions 134 are reoriented from a first, typically planar, configuration to a second, desired configuration. In the illustrated embodiment, the surfaces 164*a*, 164*b*, 164*c* of each mandrel section 162** are parallel to one another and offset in different planes.

Figure 47:
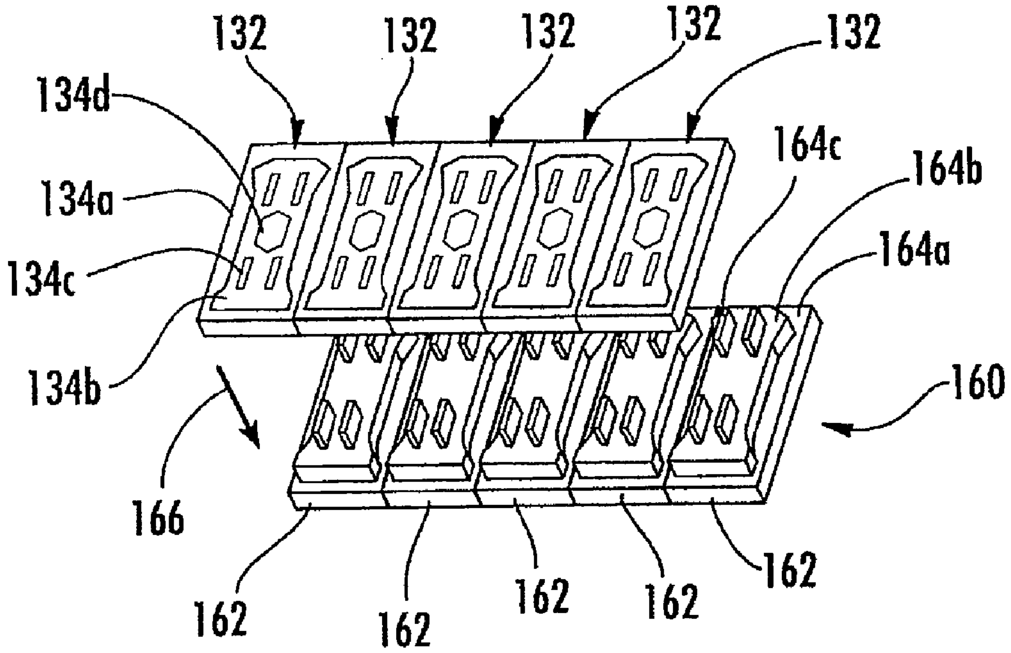
Figure 48:
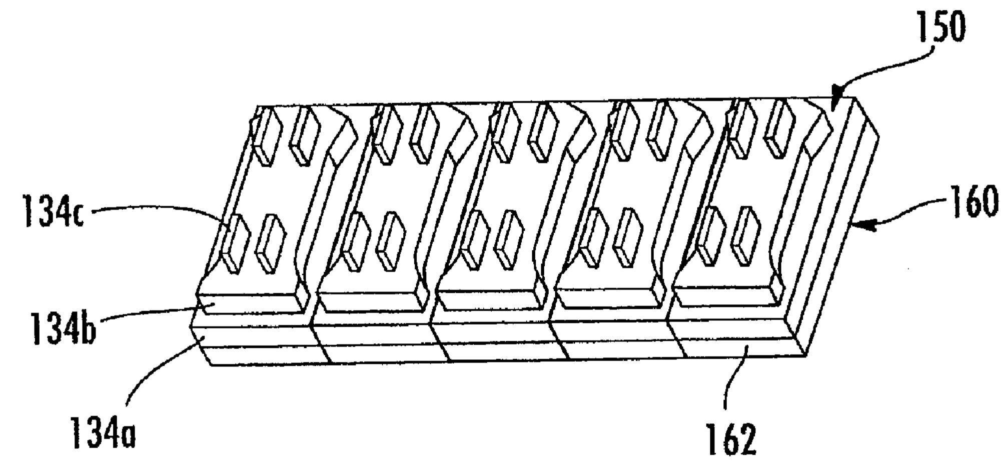

FIG. 47 illustrates five sections 132 of the base sheet 16 disposed proximate to the mandrel 160, each section 132 corresponding to one of the mandrel sections 162. The sections 132 of the base sheet 16 are cut, i.e., to define the first, second, third, and fourth portions **134*a*, 134*b*, 134*c*, 134*d* of each section 132. Thus, when the sections 132 of the base sheet 16 are moved against the mandrel 160, the portions 134 of each section 132 are offset to the desired configuration, as shown in FIG. 48. That is, the first portion 134*a* of each section 132 is disposed against the first surface 164*a* of the respective mandrel section 162, the second portion 134*b* is disposed against the second surface 164*b*, and the third portion 134*c* is disposed against the third surface 164*c*. With the various portions 134 disposed in the second, desired configuration, the portions 134 can be joined, e.g., by applying heat or adhesive at the interfacing surfaces of the portions 134**.

The reorientation of the portions 134 can be performed immediately after the cutting of the portions 134, e.g., in the same machine 10 in which the portions 134 are cut. In this regard, the mandrel 160 can be disposed in the machine 10 at a position proximate the support member 14, e.g., at a location parallel to the support member 14 so that the advancement of the base sheet 16 along its longitudinal direction 22 results in the cut sections 132 being disposed proximate the mandrel 160. In other cases, the reorientation of the portions 134 can be performed separately from the cutting, e.g., in a different operation at a different time and/or location. In any case, the sections 132 of the base sheet 16 can be adjusted against the mandrel 160 using the actuator mechanisms 40. That is, the actuator mechanisms 40 can be engaged to one or more of the cut portions 134 of the sections 132 of the base sheet 16 and adjusted to move the sections 132 toward the mandrel 160 in a direction 166. For purposes of illustrative clarity, the actuator mechanisms 40 are not illustrated in FIGS. 47-49.

Figure 49:
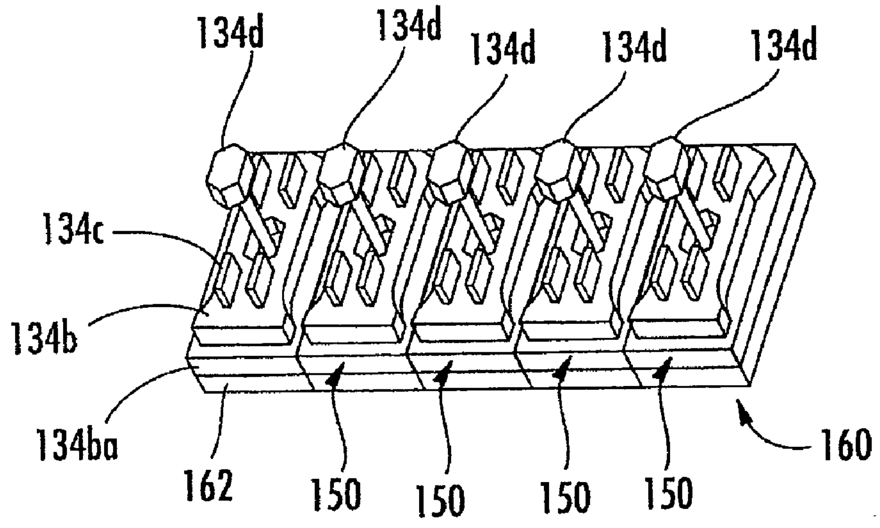

Before or after the joining of the portions 134, the fourth portion **134*d* can be removed from each section 132, e.g., and discarded, as shown in FIG. 49. For example, the fourth portions 134*d* can be removed by engaging an actuator mechanism 40 with each fourth portion 134*d* and retracting the mechanisms 40 from the mandrel 160, or the fourth portions 134*d* can be removed by other methods, e.g., manually, by an automatic adjustment of corresponding ejection devices of the mandrel 160, or the like. The finished parts 150 can be removed from the mandrel 160, and the mandrel 160 can be re-used to manufacture another group of parts 150. In this way, the portions 134 of multiple parts 150 can be reoriented at the same time and multiple parts 150 can be formed in each operative cycle of the mandrel 160**.

In some embodiments, the foam parts can be manufactured in an expandable or expanded configuration, in which the dimensions one or more of the foam portions can be adjusted. In this regard, FIG. 50 illustrates one section 32 cut from a base sheet 16. The section 32 is cut in a configuration similar to the configuration of the sections 32 described above in connection with the operations illustrated in FIGS. 19-36. Further, as shown in FIG. 50, a plurality of slits 170 are provided in the rectangular portion **34*c* such that the rectangular portion 34*c* can be expanded in length. In the embodiment illustrated in FIG. 50, the slits 170 are straight and cut in a series of parallel directions. In other cases, each slit can be nonlinear, e.g., to define a curve (FIG. 57) or combination of angled cuts (FIG. 56). In either case, the slits 170 can be cut by the cutting device 30 or otherwise and can be cut before the portions are reconfigured (as shown in FIGS. 50-52) or thereafter. In the illustrated embodiment, the slitted rectangular portion 34*c* is configured and joined with the c-shaped portions 34*a*, 34*b*, as shown in FIG. 51, and thereafter expanded to the configuration shown in FIG. 52, i.e., by applying a force on the rectangular portion to expanding the rectangular portion 34*c*. For example, in the embodiment illustrated in FIGS. 50 and 51, the slitted rectangular portion 34*c* is expanded by applying a force in a direction that is generally perpendicular to the direction of the slits 170. As the rectangular portion 34*c* is expanded, the slits 170 open to define apertures 172, and the length of the part 100 increases. In this way, the part 100 can be adapted to be expanded to a desired size, e.g., to correspond closely to the dimensions of a device to be packaged. In other cases where the slits are not linear, the slits can nevertheless be shaped and oriented to allow for expanding of the part by applying an expansion force in a particular direction. For example, each slit 170 can define a generally u- or v-shaped arrangement of angled cuts as shown in FIG. 56, or an arc as shown in FIG. 57, and the slits 170 can be arranged generally along different lines so that each line defines a series of the slits 170 arranged generally end-to-end at least partially across one of the portions 34. The slits 170 can be opened by a force applied in a direction 174 that is perpendicular to the lines along which the slits 170 are disposed. In some cases, the same part 100 can be used in the packaging of devices of different sizes, i.e., by expanded the part to different lengths corresponding to the different sizes of the devices. In addition, by forming the part 100 in an expandable configuration, the amount of material required for the part 100** is potentially reduced.

Further, the adjustment of the size of the foam parts can be performed during or after manufacture. In some cases, the parts can be manufactured, shipped, stored, or otherwise handled in an unexpanded configuration and subsequently expanded before use. For example, the parts 100 can be manufactured at a manufacturing facility, shipped to a user facility, stored temporarily at the user facility in the unexpanded configuration of FIG. 51, and then expanded before use at the user facility to the expanded configuration of FIG. 52. In this way, the size of the part 100 can be reduced for shipping, storage, and the like, thereby potentially reducing the shipping costs and storage space required for the part 100.

A variety of parts can be manufactured in expandable configurations, and one or more of the portions of each part can be provided with slits of various configurations to allow expandability of different portions of the parts in one or more directions. FIGS. 53-55 illustrate another section 132 of a base sheet 16 that is used to manufacture another exemplary part 150 having an expandable configuration. In this case, the section 132 is cut in a configuration similar to the configuration of the sections 132 described above in connection with the operations illustrated in FIGS. 38-49. However, instead of cutting and removing the fourth portion 134*d*, a plurality of slits 170 are provided across the first and second portions 134*a*, 134*b* of the section 132 as shown in FIG. 53 so that the first and second portions 134*a*, 134*b* can be expanded in length. As illustrated in FIG. 54, the slits 170 can be cut before the portions 134 are reconfigured. Then, after the second and third portions 134*b*, 134*c* are reoriented, the part 150 can be expanded at a select time to the configuration shown in FIG. 55, i.e., such that the first and second portions 134*a*, 134*b* are expanded together to increase the length of the part 150.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A machine for manufacturing a plurality of similar foam parts from a supply of foam sheet material, the machine comprising:

a support member configured to support a base sheet of the foam sheet material, with the base sheet extending in a longitudinal direction and defining a width in a transverse direction perpendicular to the longitudinal direction;

a cutting device configured to cut the base sheet on the support member into a plurality of sections defined across the width of the base sheet and cut each section into at least first and second portions for manufacturing a respective one of the foam parts, the cutting device configured to cut the first and second portions of each section while the portions are disposed in a first configuration;

a plurality of engagement tools disposed across the width of the base sheet, each tool configured to engage the second portion of a respective one of the sections in the first configuration;

a plurality of actuator mechanisms, each actuator mechanism configured to adjust a respective one of the engagement tools with the second portion of each section engaged by the respective engagement tool to thereby reorient the second portion of each section relative to the first portion such that the portions of each section are supported in a desired configuration different from the first configuration; and a joining device configured to join the first and second portions of each section in the desired configuration to thereby form the plurality of parts.

2. A machine according to claim 1 wherein the actuator mechanisms are configured to adjust the engagement tools at the same time such that each second portion is reoriented during the reorienting of the second portions of the other sections.

3. A machine according to claim 1 wherein the actuator mechanisms are configured to adjust the engagement tools to move through similar motions.

4. A machine according to claim 1 wherein the actuator mechanisms are configured to adjust the engagement tools to maintain the second portions substantially parallel while reorienting the second portions to the desired configuration of each section.

5. A machine according to claim 1 wherein each actuator mechanism comprises:

a first member defining an end extending from a frame of the machine;

a second member adjustably connected to the end of the first member and configured to be adjusted along a longitudinal direction defined by the first and second members; and a head member connected to the second member by two links, each link being rotatably connected to the second member and the head member such that the head member is configured to be rotated relative to the second member about an axis perpendicular to the longitudinal direction of the first and second members, wherein the respective engagement tool is adjustably mounted to the head member.

6. A machine according to claim 5 wherein for each of the actuator mechanisms, a rotary joint is provided such that the respective head member is configured to rotate about a longitudinal axis of the first and second members.

7. A machine according to claim 5 wherein, for each of the actuator mechanisms, the axis perpendicular to the longitudinal direction of the first and second members about which the head member is configured to rotate is offset from a longitudinal axis defined by the first and second members such that the engagement tool is configured to be disposed substantially along the longitudinal axis when the head member is rotated about the axis perpendicular to the longitudinal direction to each of two perpendicular positions of the head member.

8. A machine according to claim 1, further comprising a mandrel defining first and second surfaces corresponding to the first and second portions of each section in the second configuration, the first and second surfaces being parallel and offset in different planes.

9. A machine according to claim 1 wherein the actuator mechanisms are spaced in the transverse direction along the width of the base sheet and the support member in successive work areas along the width of the base sheet and the support member such that each actuator mechanism is configured to rotate the respective engagement tool within a respective one of the work areas.

10. A machine according to claim 1 wherein each engagement tool comprises a helical pin, and each actuator mechanism comprises an actuator configured to rotate the respective pin in a first direction and thereby advance the pin into a respective second portion to engage the second portion and to rotate the pin in a second opposite direction and thereby retract the pin from the respective second portion.

11. A machine according to claim 1 wherein each engagement tool comprises at least two pins, and each actuator mechanism comprises an actuator configured to advance the respective pins in nonparallel directions such that the pins are advanced into a respective second portion to engage the second portion and to retract the pins from the second portion.

12. A machine according to claim 1, further comprising a feed mechanism configured to adjust the base sheet in the longitudinal direction toward the engagement tools.

13. A machine for manufacturing a plurality of similar foam parts, the machine comprising:

a supply of foam sheet material;

a support member configured to support a base sheet of the foam sheet material, with the base sheet extending in a longitudinal direction and defining a width in a transverse direction perpendicular to the longitudinal direction;

a cutting device configured to cut the base sheet on the support member into a plurality of sections defined across the width of the base sheet and cut each section into at least first and second portions for manufacturing a respective one of the foam parts, the cutting device configured to cut the first and second portions of each section while the portions are disposed in a first configuration;

a plurality of engagement tools disposed across the width of the base sheet, each tool configured to engage the second portion of a respective one of the sections in the first configuration;

a plurality of actuator mechanisms, each actuator mechanism configured to adjust a respective one of the engagement tools with the second portion of each section engaged by the respective engagement tool to thereby reorient the second portion of each section relative to the first portion such that the portions of each section are supported in a desired configuration different from the first configuration; and a joining device configured to join the first and second portions of each section in the desired configuration to thereby form the plurality of parts.

* * * * *

UNITED STATES PATENT AND TRADEMARK OFFICE

CERTIFICATE OF CORRECTION

PATENT NO. : 7,963,020 B2
APPLICATION NO. : 11/846147
DATED : June 21, 2011
INVENTOR(S) : De Luca et al.

It is certified that error appears in the above-identified patent and that said Letters Patent is hereby corrected as shown below:

Column 18

Line 45, “stiffniess” should read --stiffness--

Signed and Sealed this
Fourteenth Day of February, 2012

David J. Kappos
*Director of the United States Patent and Trademark Office*